United States Patent
Katou et al.

(10) Patent No.: US 12,085,742 B2
(45) Date of Patent: Sep. 10, 2024

(54) ANISOTROPIC LIGHT ABSORPTION FILM AND LAMINATE

(71) Applicant: FUJIFILM Corporation, Tokyo (JP)

(72) Inventors: Yumi Katou, Kanagawa (JP); Shinichi Morishima, Kanagawa (JP); Wataru Hoshino, Kanagawa (JP); Jun Takeda, Kanagawa (JP); Kengo Saito, Kanagawa (JP); Yuzo Fujiki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 552 days.

(21) Appl. No.: 16/582,372

(22) Filed: Sep. 25, 2019

(65) Prior Publication Data

US 2020/0018879 A1 Jan. 16, 2020

Related U.S. Application Data

(63) Continuation of application No. PCT/JP2018/014906, filed on Apr. 9, 2018.

(30) Foreign Application Priority Data

Apr. 7, 2017 (JP) .................................. 2017-076930
Apr. 9, 2018 (JP) .................................. 2018-074480

(51) Int. Cl.
*G02B 5/22* (2006.01)
*C09B 31/043* (2006.01)
(Continued)

(52) U.S. Cl.
CPC .......... *G02B 5/3016* (2013.01); *C09B 31/043* (2013.01); *C09B 31/153* (2013.01);
(Continued)

(58) Field of Classification Search
CPC ...... G02B 5/3016; G02B 5/22; G02B 5/3083; C09B 67/0046; C09K 2323/03;
(Continued)

(56) References Cited

U.S. PATENT DOCUMENTS

2011/0177315 A1 7/2011 Iwahashi et al.
2013/0070899 A1 3/2013 Morishima et al.
(Continued)

FOREIGN PATENT DOCUMENTS

CN 102822704 A 12/2012
CN 102822705 A 12/2012
(Continued)

OTHER PUBLICATIONS

International Search Report issued in PCT/JP2018/014906 on Jun. 26, 2018.
(Continued)

*Primary Examiner* — Ruiyun Zhang
(74) *Attorney, Agent, or Firm* — Edwards Neils LLC; Jean C. Edwards, Esq.

(57) ABSTRACT

An object of the invention is to provide an anisotropic light absorption film having both a high alignment degree and high light resistance, and a laminate provided using the anisotropic light absorption film. An anisotropic light absorption film according to the embodiment of the invention is formed from a composition having a first dichroic azo dye, a second dichroic azo dye, and a compound represented by Formula (I) or a polymer thereof, the first dichroic azo dye has a solution absorption maximum wavelength of 400 nm or greater and less than 550 nm, the second dichroic azo dye has a solution absorption maximum wavelength of 550 nm or greater and 750 nm or less, and the film has an
(Continued)

arrangement structure of the first dichroic azo dye or an arrangement structure of the second dichroic azo dye therein.

22 Claims, 3 Drawing Sheets

(51) Int. Cl.
    *C09B 31/153*     (2006.01)
    *C09B 31/20*     (2006.01)
    *C09B 67/22*     (2006.01)
    *C09K 19/38*     (2006.01)
    *C09K 19/60*     (2006.01)
    *G02B 5/30*     (2006.01)
    *G02F 1/1335*     (2006.01)
    *G02F 1/1337*     (2006.01)

(52) U.S. Cl.
    CPC .......... *C09B 31/20* (2013.01); *C09B 67/0046* (2013.01); *C09K 19/3838* (2013.01); *C09K 19/601* (2013.01); *G02B 5/22* (2013.01); *G02B 5/3083* (2013.01); *G02F 1/133528* (2013.01); *G02F 1/133723* (2013.01); *C09K 2323/03* (2020.08); *C09K 2323/031* (2020.08); *G02F 2202/04* (2013.01)

(58) Field of Classification Search
    CPC ............ C09K 2323/031; C09K 19/601; G02F 1/133528; G02F 1/133723; G02F 2202/04
    USPC .............. 428/1.3, 1.31; 359/487.02; 349/117
    See application file for complete search history.

(56) References Cited

U.S. PATENT DOCUMENTS

| | | | |
|---|---|---|---|
| 2013/0107195 A1 | 5/2013 | Morishima et al. | |
| 2016/0274274 A1 | 9/2016 | Yoo et al. | |
| 2016/0340367 A1 | 11/2016 | Katoh et al. | |
| 2017/0269271 A1* | 9/2017 | Hatanaka | G02B 5/305 |
| 2017/0306237 A1* | 10/2017 | Morimoto | C09K 19/2007 |
| 2019/0101676 A1 | 4/2019 | Katou et al. | |
| 2019/0250457 A1* | 8/2019 | Nishimura | G02F 1/133634 |
| 2019/0322937 A1 | 10/2019 | Matsuyama et al. | |

FOREIGN PATENT DOCUMENTS

| | | | | |
|---|---|---|---|---|
| CN | 103336325 A | * | 10/2013 | ............. C09B 43/30 |
| CN | 106353848 A | | 1/2017 | |
| JP | 11-101964 A | | 4/1999 | |
| JP | 2002-207118 A | | 7/2002 | |
| JP | 2010-107975 A | | 5/2010 | |
| JP | 2010-168570 A | | 8/2010 | |
| JP | 2011-178946 A | | 9/2011 | |
| JP | 2011-215336 A | | 10/2011 | |
| JP | 2011-237513 A | | 11/2011 | |
| JP | 2013-209367 A | | 10/2013 | |
| JP | 2013-210624 A | | 10/2013 | |
| JP | 2016-004055 A | | 1/2016 | |
| JP | 2016-216637 A | | 12/2016 | |
| JP | 2017-504050 A | | 2/2017 | |
| KR | 20130098914 A | | 9/2013 | |
| WO | 2017/170036 A1 | | 10/2017 | |
| WO | 2018/124198 A1 | | 7/2018 | |

OTHER PUBLICATIONS

Written Opinion issued in PCT/JP2018/014906 on Jun. 26, 2018.
International Preliminary Report on Patentability completed by WIPO on Oct. 8, 2019 in connection with International Patent Application No. PCT/JP2018/014906.
Office Action, which was issued by the Japanese Patent Office on Jan. 11, 2022, in connection with Japanese Patent Application No. 2021-027572.
Office Action, which was issued by the Japanese Patent Office on Oct. 26, 2021, in connection with Japanese Patent Application No. 2019-511330.
Office Action, which was issued by the State Intellectual Property Office on Feb. 2, 2021, in connection with Chinese Patent Application No. 201880022150.9.
Office Action, which was issued by the Korean Intellectual Property Office on Apr. 30, 2021, in connection with Korean Patent Application No. 10-2019-7028689.
Office Action, which was issued by the Korean Intellectual Property Office on Aug. 28, 2020, in connection with Korean Patent Application No. 10-2019-7028689.
Office Action, which was issued by the Japanese Patent Office on Jun. 2, 2020, in connection with Japanese Patent Application No. 2019-511330.
Office Action, which was issued by the Korean Intellectual Property Office on Apr. 28, 2022, in connection with Korean Patent Application No. 10-2022-7003198.
Office Action, which was issued by the Korean Intellectual Property Office on Oct. 31, 2022, in connection with Korean Patent Application No. 10-2022-7003198.
Office Action, which was issued by the State Intellectual Property Office on Nov. 7, 2022, in connection with Chinese Patent Application No. 202111382226.9.
Office Action, which was issued by the Japanese Patent Office on Mar. 14, 2023, in connection with Japanese Patent Application No. 2022-119464.

* cited by examiner

ANISOTROPIC LIGHT ABSORPTION FILM AND LAMINATE

CROSS-REFERENCE TO RELATED APPLICATIONS

This application is a Continuation of PCT International Application No. PCT/JP2018/014906 filed on Apr. 9, 2018, which was published under PCT Article 21(2) in Japanese, and which claims priority under 35 U.S.C. § 119(a) to Japanese Patent Application No. 2017-076930 filed on Apr. 7, 2017 and Japanese Patent Application No. 2018-074480 filed on Apr. 9, 2018. The above applications are hereby expressly incorporated by reference, in their entirety, into the present application.

BACKGROUND OF THE INVENTION

1. Field of the Invention

The present invention relates to an anisotropic light absorption film and a laminate.

2. Description of the Related Art

In the past, devices which are operated by different principles for each function have been used in a case where an attenuation function, a polarization function, a scattering function, a shielding function, or the like is required in relation to irradiated light including laser light and natural light. Therefore, products corresponding to the above-described functions have been manufactured through different manufacturing processes for each function.

For example, in liquid crystal displays (LCDs), a linearly polarizing plate or a circularly polarizing plate is used to control optical activity and a birefringent property in display. In addition, in organic light emitting diodes (OLEDs), a circularly polarizing plate is used to prevent external light from being reflected.

Iodine has been widely used as a dichroic substance in these polarizing plates (polarizing elements). However, a polarizing element using an organic dye as a dichroic substance instead of iodine has also been examined.

For example, in JP2011-237513A, "a light absorption anisotropic film containing at least one kind of thermotropic liquid crystalline dichroic dye and at least one kind of thermotropic liquid crystalline polymer, in which the mass content of the thermotropic liquid crystalline dichroic dye in the light absorption anisotropic film is 30% or greater" is described (claim 1).

SUMMARY OF THE INVENTION

The inventors have examined the dichroic dye-containing anisotropic light absorption film described in JP2011-237513A, and found that depending on the kind of the dichroic dye contained in the composition used for forming the anisotropic light absorption film, the anisotropic light absorption film may have insufficient light resistance, or the alignment degree is reduced.

An object of the invention is to provide an anisotropic light absorption film having both a high alignment degree and high light resistance, and a laminate provided using the anisotropic light absorption film.

As a result of intensive studies by the inventors, the inventors have found that both a high alignment degree and high light resistance are achieved in a case where an anisotropic light absorption film formed from a composition having two kinds of dichroic azo dyes having a specific solution absorption maximum wavelength and a specific compound has an arrangement structure of at least one dichroic azo dye therein, and completed the invention.

That is, the inventors have found that the object can be achieved with the following configuration.

(1) An anisotropic light absorption film which is formed from a composition having a first dichroic azo dye, a second dichroic azo dye, and a compound represented by Formula (I) or a polymer thereof, in which the first dichroic azo dye has a solution absorption maximum wavelength of 400 nm or greater and less than 550 nm, the second dichroic azo dye has a solution absorption maximum wavelength of 550 nm or greater and 750 nm or less, and the film has an arrangement structure of the first dichroic azo dye or an arrangement structure of the second dichroic azo dye therein.

(2) The anisotropic light absorption film according to (1), in which a difference between the solution absorption maximum wavelength of at least one of the first or second dichroic azo dye and an absorption maximum wavelength of the anisotropic light absorption film is 10 nm to 100 nm, and a solid content ratio of a component providing a solution absorption maximum wavelength at 400 nm to 750 nm in the composition is 2 mass % to 20 mass %.

(3) The anisotropic light absorption film according to (1) or (2), in which a difference between the solution absorption maximum wavelength of the second dichroic azo dye and the absorption maximum wavelength of the anisotropic light absorption film is 10 nm to 100 nm.

(4) The anisotropic light absorption film according to any one of (1) to (3), in which the anisotropic light absorption film has at least two absorption maximum wavelengths, and the at least two absorption maximum wavelengths are 400 nm or greater and less than 550 nm, and 550 nm or greater and 750 nm or less, respectively.

(5) The anisotropic light absorption film according to any one of (1) to (4), in which the second dichroic azo dye forms a crystal structure in the film.

(6) The anisotropic light absorption film according to any one of (1) to (5), in which a half-width of a peak derived from the arrangement structure of the second dichroic azo dye in ¢ scanning is less than 10.0° in X-ray diffraction measurement in an in-plane direction of the anisotropic light absorption film.

(7) The anisotropic light absorption film according to any one of (1) to (6), in which a difference between a melting point T1 of the second dichroic azo dye and a transition temperature T2 corresponding to the second dichroic azo dye among transition temperatures of the composition containing the compound represented by Formula (I) or the polymer thereof and the second dichroic azo dye is 30° C. or less.

(8) The anisotropic light absorption film according to any one of (1) to (7), in which the second dichroic azo dye is represented by Formula (II).

(9) The anisotropic light absorption film according to any one of (1) to (8), in which a film thickness is 0.3 μm or greater and 5 μm or less.

(10) The anisotropic light absorption film according to any one of (1) to (9), in which a difference between a Log P value of at least one of the first or second dichroic azo dye in which a difference between the solution absorption maximum wavelength and an absorption maximum wavelength of the anisotropic light absorption film is 10 nm to 100 nm, and a Log P value of the compound represented by Formula (I) or the polymer thereof is 5 or greater and 8 or less.

(11) The anisotropic light absorption film according to any one of (1) to (10), in which the first dichroic azo dye is represented by Formula (III).

(12) The anisotropic light absorption film according to (11), in which the first dichroic azo dye represented by Formula (III) satisfies Formula (A).

(13) A laminate having: the anisotropic light absorption film according to any one of (1) to (12); and an alignment film.

(14) The laminate according to (13), in which the alignment film contains one or both of a polyamic acid and a polyimide compound.

(15) The laminate according to (13), in which the alignment film is a photo-alignment film containing a photoactive compound having an azo group as a photoactive group.

(16) A laminate having: the anisotropic light absorption film according to any one of (1) to (12); and a substrate.

(17) A laminate having: the laminate according to any one of (13) to (15); and a substrate, in which the substrate is disposed on a side of the alignment film opposite to the anisotropic light absorption film.

According to the invention, it is possible to provide an anisotropic light absorption film having both a high alignment degree and high light resistance, and a laminate provided using the anisotropic light absorption film.

DESCRIPTION OF THE PREFERRED EMBODIMENTS

Figure 1A:
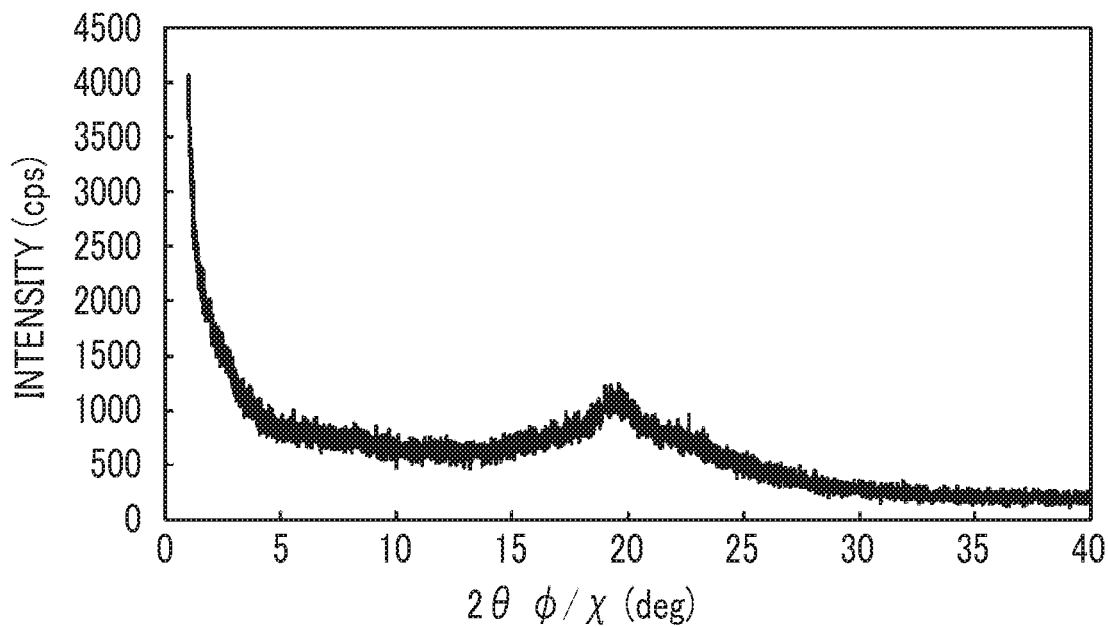
FIG. 1A is an XRD spectrum (azimuthal angle: 30°) of a film 2 in Example 13.

Hereinafter, the invention will be described.

The following description of constituent requirements is based on typical embodiments of the invention, but the invention is not limited thereto.

In this specification, a numerical value range expressed using "to" means a range including numerical values before and after "to" as a lower limit value and an upper limit value.

In this specification, the term parallel or orthogonal does not mean parallel or orthogonal in a strict sense, but means a range of ±5° from parallel or orthogonal.

In this specification, a liquid crystalline composition or a liquid crystalline compound also includes those which no longer exhibit liquid crystallinity due to curing or the like in the concept thereof.

In this specification, the term "(meth) acrylate" is a notation representing "acrylate" or "methacrylate", the term "(meth)acrylic" is a notation representing "acrylic" or "methacrylic", and the term "(meth)acryloyl" is a notation representing "acryloyl" or "methacryloyl".

First, the definition of parameters used in the invention will be described.

<<Absorption Maximum Wavelength of Anisotropic Light Absorption Film>>

In the invention, an absorption maximum wavelength of an anisotropic light absorption film represents a value measured by the following method.

An absorption spectrum in an absorption axis direction in a visible region is measured using a multi-channel spectrometer QE65000 manufactured by Ocean Optics, Inc. in a state in which a polarizer is inserted on the light source side of a microscope ECLIPSE E600 POL manufactured by Nikon Inc. A wavelength of a peak is defined as an absorption maximum wavelength in the invention. In a case where a plurality of peaks were measured, each peak was defined as an absorption maximum wavelength in the invention. The absorption spectrum was measured in a state in which the anisotropic light absorption film was laminated with a substrate or an alignment film, and was calculated by subtracting a spectrum of the substrate or the alignment film only.

<<Solution Absorption Maximum Wavelength of Dichroic Azo Dye>>

In the invention, a solution absorption maximum wavelength of a dichroic azo dye represents a value measured by the following method.

An absorption maximum wavelength in chloroform or an alternative solvent was measured by a spectrophotometer UV-2550 (manufactured by Shimadzu Corporation).

<<Calculation of Log P Value>>

The Log P value is an index indicating the hydrophilic property and the hydrophobic property of a chemical structure, and may be referred to as the hydrophilic-hydrophobic parameter. The Log P value can be calculated using software such as ChemBioDraw Ultra or HSPiP (Ver. 4.1.07). In addition, the Log P value can be obtained experimentally by the method in OECD Guidelines for the Testing of Chemicals, Sections 1, Test No. 117, etc. In the invention, the value calculated by inputting a structural formula of a compound to HSPiP (Ver. 4.1.07) is employed as a Log P value unless otherwise noted.

<<Calculation of Aspect Ratio of Dichroic Azo Dye>>

In the invention, an aspect ratio of a dichroic azo dye is defined by a ratio (L/D) of a length (L) of a minimum-diameter cylinder which is in contact with molecules to a diameter (I)) of the cylinder. Structure optimization calculation was performed by a density functional method (b31yp/6-31g (d)) using Gaussian 09 (US, Gaussian, Inc.), and then an aspect ratio of the optimization structure was calculated using Winmostar (X-Ability Co., Ltd.). The symbol L corresponds to Ld to be described later, and the symbol D corresponds to L1 to be described later.

[Anisotropic Light Absorption Film]

An anisotropic light absorption film according to the embodiment of the invention (hereinafter, also referred to as "film according to the embodiment of the invention") is formed from a composition having a first dichroic azo dye, a second dichroic azo dye, and a compound represented by Formula (I) or a polymer thereof.

Here, a solution absorption maximum wavelength of the first dichroic azo dye is 400 nm or greater and less than 550 nm, and a solution absorption maximum wavelength of the second dichroic azo dye is 550 nm or greater and 750 nm or less.

The film according to the embodiment of the invention has an arrangement structure of the first dichroic azo dye or an arrangement structure of the second dichroic azo dye therein.

The solid content ratio of the components (that is, the first dichroic azo dye and the second dichroic azo dye) providing a solution absorption maximum wavelength at 400 nm to 750 nm in the composition is preferably 2 mass % to 20 mass % since the effects of the invention are further enhanced. In this specification, the term "solid content ratio" refers to the mass % in a case where the total solid content (the components other than the solvent) is 100 mass %.

[Dichroic Azo Dye]

The dichroic azo dye used in the invention is not particularly limited as long as it has a specific solution absorption maximum wavelength. Specific examples thereof include those described in paragraphs [0067] to [0071] of JP2013-228706A, paragraphs [0008] to [0026] of JP2013-227532A, paragraphs [0008] to [0015] of JP2013-209367A, paragraphs [0045] to [0058] of JP2013-014883A, paragraphs [0012] to [0029] of JP2013-109090A, paragraphs [0009] to [0017] of JP2013-101328A, paragraphs [0051] to [0065] of JP2013-037353A, paragraphs [0049] to [0073] of JP2012-063387A, paragraphs [0016] to [0018] of JP1999-305036A (JP-H11-305036A), paragraphs [0009] to [0011] of JP2001-133630A, paragraphs [0030] to [0169] of JP2011-215337A, paragraphs [0021] to [0075] of JP2010-106242A, paragraphs [0011] to [0025] of JP2010-215846A, paragraphs [0017] to [0069] of JP2011-048311A, paragraphs [0013] to [0133] of JP2011-213610A, paragraphs [0074] to [0246] of JP2011-237513A, paragraphs [0022] to [0080] of JP2015-001425, paragraphs [0005] to [0051] of JP2016-006502, paragraphs [0005] to [0041] of WO2016/060173A, paragraphs [0008] to [0062] of WO2016/136561A, paragraphs [0014] to [0033] of JP2016-044909, paragraphs [0014] to [0033] of JP2016-044910, paragraphs [0013] to [0037] of JP2016-095907, and paragraphs [0014] to [0034] of JP2017-045296.

<First Dichroic Azo Dye>

The first dichroic azo dye used in the invention is a dichroic azo dye having a solution absorption maximum wavelength of 400 nm or greater and less than 550 nm. The first dichroic azo dye is preferably a dichroic azo dye represented by Formula (III) from the viewpoint of achieving a higher alignment degree.

In Formula (III), n represents an integer of 2 to 5, and repeating unit structures of -(A$_1$-N=N)— repeated two or more times may be the same or different.

At least one of $Q_1$ or $Q_2$ represents a radically polymerizable group, and the other represents hydrogen, an alkyl group having 1 to 20 carbon atoms, an alkoxy group having 1 to 20 carbon atoms, an alkyl ester having 1 to 20 carbon atoms, or an amine group.

$A_1$ and $A_2$ may be the same or different, and each of them represents a substituted or unsubstituted arylene having 6 to 40 carbon atoms, or a substituted or unsubstituted heteroarylene having 4 to 30 carbon atoms.

$B_1$ and $B_2$ may be the same or different, and each of them represents a divalent functional group having a combination of one or more selected from the group consisting of a single bond, —(C=O)O—, —O(C=O)—, a substituted or unsubstituted alkylene having 1 to 20 carbon atoms, a substituted or unsubstituted arylene having 6 to 40 carbon atoms, a substituted or unsubstituted heteroarylene having 4 to 30 carbon atoms, a substituted or unsubstituted alkylene oxide having 1 to 20 carbon atoms, —O—, —S—, —NR1-, and —PR1-.

R1 represents hydrogen or an alkyl group having 1 to 20 carbon atoms.

The first dichroic azo dye represented by Formula (III) preferably satisfies Formula (A) since the effects of the invention are further enhanced.

Ld/L1>3.2 (n is 2 in Formula (III)) Ld/L1>3.6 (n is 3 in Formula (III)) Ld/L1>4.0 (n is 4 in Formula (III))　　　Formula (A)

In Formula (A), Ld represents a molecular length of a molecular major axis of the first dichroic azo dye, and L1 represents a molecular length in a direction orthogonal to the molecular major axis of the dichroic azo dye.

The concentration of the first dichroic azo dye (with respect to the whole composition including the solvent) in the composition is not particularly limited, and preferably 0.01 to 5 mass % since the effects of the invention are further enhanced.

The solid content ratio of the first dichroic azo dye in the composition is not particularly limited, and preferably 1 to 10 mass % since the effects of the invention are further enhanced.

The content of the first dichroic azo dye in the composition is not particularly limited, and preferably 0.3 to 10 parts by mass with respect to 100 parts by mass of the compound represented by Formula (I) to be described later or the polymer thereof since the effects of the invention are further enhanced.

<Second Dichroic Azo Dye>

The second dichroic azo dye used in the invention is a dichroic azo dye having a solution absorption maximum wavelength of 550 nm or greater and 750 nm or less. The second dichroic azo dye is preferably a dichroic azo dye represented by Formula (II) from the viewpoint of achieving a higher alignment degree.

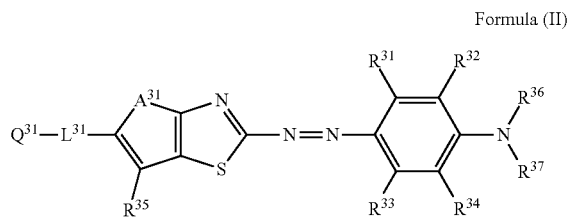

In Formula (II), $R^{31}$ to $R^{35}$ each independently represent a hydrogen atom or a substituent; $R^{36}$ and $R^{37}$ each independently represent a hydrogen atom or an alkyl group which may have a substituent; $Q^{31}$ represents an aromatic hydrocarbon group, an aromatic heterocyclic group, or a cyclohexane ring group which may have a substituent; $L^{31}$ represents a divalent linking group; and $A^{31}$ represents an oxygen atom or a sulfur atom. $R^{36}$, $R^{37}$, and $Q^{31}$ may have a radically polymerizable group.

Preferably, $R^{36}$ and $R^{37}$ each independently represent an alkyl group (particularly, an alkyl group having 1 to 10 carbon atoms) which may have a substituent since the effects of the invention are further enhanced.

The substituent is not particularly limited, and preferably a (meth)acryloyloxy group or an acyloxy group (R—CO—O—*: R represents an alkyl group (particularly, having 1 to 10 carbon atoms)) since the effects of the invention are further enhanced.

$Q^{31}$ is preferably an aromatic hydrocarbon group, an aromatic heterocyclic group, or a cyclohexane ring group having a substituent since the effects of the invention are further enhanced.

The substituent is not particularly limited, and preferably a group represented by Q-L-* since the effects of the invention are further enhanced.

Here, Q represents a hydrogen atom, an alkyl group which may have a substituent (particularly, an alkyl group having 1 to 20 carbon atoms), a (meth)acryloyloxy group, or an acyloxy group (R—CO—O—*: R represents an alkyl group (particularly, having 1 to 10 carbon atoms)), L represents a divalent linking group, and * represents a bonding position.

Examples of L include a single bond, a divalent aliphatic hydrocarbon group (for example, an alkylene group, preferably having 1 to 20 carbon atoms), a divalent aromatic hydrocarbon group (for example, an arylene group, preferably having 6 to 12 carbon atoms), an alkyleneoxy group, —O—, —S—, —SO$_2$—, —SO$_3$—, —N(R)— (R: alkyl group), —CO—, —NH—, —COO—, —CONR—, —Si(R)(R')— (R and R' each represent an alkyl group (particularly, having 1 to 10 carbon atoms)), and combinations thereof.

The carbon atom of the alkyl group may be substituted by —O—, —CO—, —C(O)—O—, —O—C(O)—, —Si(CH$_3$)$_2$—O—Si(CH$_3$)$_2$—, —N(R)—, —N(R)—CO—, —CO—N(R)—, —N(R)—C(O)—O—, —O—C(O)—N(R)—, —N(R)—C(O)—N(R')—, —CH=CH—, —C≡C—, —N=N—, —C(R)=N—, —C(R)=CH—C(O)— or, —O—C(O)—O— (R and R' each represent an alkyl group (particularly, having 1 to 10 carbon atoms)).

The hydrogen atom bonded to the carbon atom of the alkyl group may be substituted by a halogen atom, a nitro group, a cyano group, —N(R)(R')—, an amino group, —C(R)=C(R')—NO$_2$, —C(R)=C(R')—CN, or —C(R)=C(CN)$_2$ (R and R' each represent an alkyl group (particularly, having 1 to 10 carbon atoms)).

The concentration of the second dichroic azo dye (with respect to the whole composition including the solvent) in the composition is not particularly limited, and preferably 0.1 to 10 mass % since the effects of the invention are further enhanced.

The solid content ratio of the second dichroic azo dye in the composition is not particularly limited, and preferably 1 to 20 mass % since the effects of the invention are further enhanced.

The content of the second dichroic azo dye in the composition is not particularly limited, and preferably 5 to 20 parts by mass with respect to 100 parts by mass of the compound represented by Formula (I) to be described later or the polymer thereof since the effects of the invention are further enhanced.

[Compound Represented by Formula (I) or Polymer Thereof]

The composition used for the film according to the embodiment of the invention contains a compound represented by Formula (I) or a polymer thereof (hereinafter, also collectively referred to as "compound of Formula (I)").

Q5-B5-A5-B6-A6-B8-Q6    Formula (I):

In Formula (I), at least one of Q5 or Q6 represents a radically polymerizable group, and the other represents a hydrogen atom, an alkyl group having 1 to 20 carbon atoms, a cycloalkyl group having 3 to 12 carbon atoms, an aryl group having 6 to 40 carbon atoms, an alkoxy group having 1 to 20 carbon atoms, an alkyl ester having 1 to 20 carbon atoms, —CN, —NO$_2$, a halogen atom, or an amine group substituted or unsubstituted by one or two alkyl groups having 1 to 6 carbon atoms.

A5 and A6 may be the same or different, and each of them represents a substituted or unsubstituted arylene group having 6 to 40 carbon atoms, a substituted or unsubstituted heteroarylene group having 4 to 30 carbon atoms, or a substituted or unsubstituted cyclohexyl group having 6 to 40 carbon atoms.

B5, B6, and B8 may be the same or different, and each of them represents a divalent functional group having a combination of one or more selected from the group consisting of a single bond, —(C=O)O—, —O(C=O)—, a substituted or unsubstituted alkylene group having 1 to 20 carbon atoms, a substituted or unsubstituted arylene group having 6 to 40 carbon atoms, a substituted or unsubstituted heteroarylene group having 4 to 30 carbon atoms, a substituted or unsubstituted cyclohexyl group having 6 to 40 carbon atoms, a substituted or unsubstituted alkylene oxide group having 1 to 20 carbon atoms, —O—, —S—, —NR3-, and -PR3-. R3 represents a hydrogen atom or an alkyl group having 1 to 20 carbon atoms.

Examples of the polymer liquid crystalline compound include thermotropic liquid crystalline polymers described in JP2011-237513A and dichroic dye polymers having thermotropic liquid crystallinity described in JP2016-004055A.

The polymer liquid crystalline compound may have a crosslinkable group (for example, an acryloyl group and a methacryloyl group) at a terminal.

<Polymer of Compound Represented by Formula (I)>

Preferable examples of the polymer of the compound represented by Formula (I) include polymer liquid crystal compounds (hereinafter, also referred to as "specific compound") including a repeating unit represented by Formula (1) (hereinafter, also referred to as "repeating unit (1)") since the effects of the invention are further enhanced.

In Formula (1), P1 represents a main chain of the repeating unit, L1 represents a single bond or a divalent linking group, SP1 represents a spacer group, M1 represents a mesogenic group, and T1 represents a terminal group.

Specific examples of the main chain of the repeating unit represented by P1 include groups represented by Formulae (P1-A) to (P1-D). Among these, groups represented by Formula (P1-A) are preferable from the viewpoint of diversity of monomers as raw materials and ease of handling.

In Formulae (P1-A) to (P1-D), "*" represents a bonding position to L1 in Formula (1). In formula (P1-A), R1 represents a hydrogen atom or a methyl group. In Formula (P1-D), R2 represents an alkyl group.

The group represented by Formula (P1-A) is preferably a unit of a partial structure of a poly(meth)acrylic acid ester obtained by polymerizing a (meth)acrylic acid ester since the effects of the invention are further enhanced.

The group represented by Formula (P1-B) is preferably an ethylene glycol unit in polyethylene glycol obtained by polymerizing ethylene glycol since the effects of the invention are further enhanced.

The group represented by Formula (P1-C) is preferably a propylene glycol unit obtained by polymerizing propylene glycol since the effects of the invention are further enhanced.

The group represented by Formula (P1-D) is preferably a siloxane unit of polysiloxane obtained by polycondensing silanol since the effects of the invention are further enhanced. L1 is a single bond or a divalent linking group.

Examples of the divalent linking group represented by L1 include —C(O)O—, —OC(O)—, —O—, —S—, —C(O)NR$^3$—, —NR$^3$C(O)—, —SO$_2$—, and —NR$^3$R$^4$—. In the formula, R$^3$ and R$^4$ each independently represent a hydrogen atom or an alkyl group having 1 to 6 carbon atoms which may have a substituent (for example, a substituent W to be described later).

In a case where P1 is a group represented by Formula (P1-A), L1 is preferably a group represented by —C(O)O— since the effects of the invention are further enhanced.

In a case where P1 is a group represented by any one of Formula (P1-B), (P1-C), or (P1-D), L1 is preferably a single bond since the effects of the invention are further enhanced.

The spacer group represented by SP1 preferably includes at least one selected from the group consisting of an oxyethylene structure, an oxypropylene structure, a polysiloxane structure, and a fluorinated alkylene structure from the viewpoint of easy exhibition of liquid crystallinity, raw material availability, and the like.

Here, the oxyethylene structure represented by SP1 is preferably a group represented by *—(CH$_2$—CH$_2$O)$_{n1}$—*. In the formula, n1 represents an integer of 1 to 20, and * represents a bonding position to L1 or M1 in Formula (1). n1 is preferably an integer of 2 to 10, more preferably an integer of 2 to 4, and most preferably 3 since the effects of the invention are further enhanced.

The oxypropylene structure represented by SP1 is preferably a group represented by *—(CH(CH$_3$)—CH$_2$O)$_{n2}$—* since the effects of the invention are further enhanced. In the formula, n2 represents an integer of 1 to 3, and * represents a bonding position to L1 or M1.

The polysiloxane structure represented by SP1 is preferably a group represented by *—(Si(CH$_3$)$_2$—O)$_{n3}$—* since the effects of the invention are further enhanced. In the formula, n3 represents an integer of 6 to 10, and * represents a bonding position to L1 or M1.

The fluorinated alkylene structure represented by SP1 is preferably a group represented by *—(CF$_2$—CF$_2$)$_{n4}$—* since the effects of the invention are further enhanced. In the formula, n4 represents an integer of 6 to 10, and * represents a bonding position to L1 or M1.

The mesogenic group represented by M1 is a group showing the main skeleton of liquid crystal molecules contributing to the formation of liquid crystal. The liquid crystal molecules exhibit liquid crystallinity in an intermediate state (mesophase) between a crystalline state and an isotropic liquid state. The mesogenic group is not particularly limited, and for example, the description on pages 7 to 16 of "Flussige Kristalle in Tabellen II" (VEB Deutsche Verlag fur Grundstoff Industrie, Leipzig, 1984) and the description in Chapter 3 of Liquid Crystal Handbook (Maruzen, 2000) edited by Liquid Crystal Handbook Editing Committee can be referred to.

The mesogenic group is preferably a group having at least one cyclic structure selected from the group consisting of an aromatic hydrocarbon group, a heterocyclic group, and an alicyclic group.

The mesogenic group preferably has an aromatic hydrocarbon group, more preferably has 2 to 4 aromatic hydrocarbon groups, and even more preferably has 3 aromatic hydrocarbon groups since the effects of the invention are further enhanced.

The mesogenic group is preferably a group represented by Formula (M1-A) or (M1-B), and more preferably a group represented by Formula (M1-B) from the viewpoint of exhibition of liquid crystallinity, adjustment of a liquid crystal phase transition temperature, raw material availability, synthesis suitability, and a further enhancement in the effects of the invention.

(M1-A)

(M1-B)

In Formula (M1-A), A1 represents a divalent group selected from the group consisting of an aromatic hydrocarbon group, a heterocyclic group, and an alicyclic group. These groups may be substituted by a substituent such as an alkyl group, a fluorinated alkyl group, an alkoxy group, or a substituent W to be described later.

The divalent group represented by A1 is preferably a 4- to 6-membered ring. The divalent group represented by A1 may be monocyclic or condensed.

* represents a bonding position to SP1 or T1.

Examples of the divalent aromatic hydrocarbon group represented by A1 include a phenylene group, a naphthylene group, a fluorene-diyl group, an anthracene-diyl group, and a tetracene-diyl group, and from the viewpoint of diversity of the design of a mesogenic skeleton and raw material availability, a phenylene group or a naphthylene group is preferable, and a phenylene group is more preferable.

The divalent heterocyclic group represented by A1 may be aromatic or non-aromatic, and is preferably a divalent aromatic heterocyclic group from the viewpoint of a further improvement in the alignment degree.

Examples of the atoms other than the carbon atom of the divalent aromatic heterocyclic group include a nitrogen atom, a sulfur atom, and an oxygen atom. In a case where the aromatic heterocyclic group has a plurality of ring-constituting atoms other than the carbon atom, these may be the same or different.

Specific examples of the divalent aromatic heterocyclic group include a pyridylene group (pyridine-diyl group), a pyridazine-diyl group, an imidazole-diyl group, a thienylene (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimide-diyl group, a thienothiazole-diyl group, a thiazolothiazole-diyl group, a thienothiophene-diyl group, and a thienooxazole-diyl group.

Specific examples of the divalent alicyclic group represented by A1 include a cyclopentylene group and a cyclohexylene group.

In Formula (M1-A), a1 represents an integer of 1 to 10. In a case where a1 is 2 or greater, a plurality of A1's may be the same or different.

In Formula (M1-B), A2 and A3 each independently represent a divalent group selected from the group consisting of an aromatic hydrocarbon group, a heterocyclic group, and an alicyclic group. Since specific examples and preferable aspects of A2 and A3 are the same as those of A1 of Formula (M1-A), the description thereof will be omitted.

In Formula (M1-B), a2 represents an integer of 1 to 10. In a case where a2 is 2 or greater, a plurality of A2's may be the same or different, a plurality of A3's may be the same or different, and a plurality of LA1's may be the same or different. a2 is preferably an integer of 2 or greater, and more preferably 2 since the effects of the invention are further enhanced.

In Formula (M1-B), in a case where a2 is 1, LA1 is a divalent linking group. In a case where a2 is 2 or greater, a plurality of LA1's each independently represent a single bond or a divalent linking group, and at least one of the plurality of LA1's is a divalent linking group. In a case where a2 is 2, it is preferable that one of two LA1's is a divalent linking group and the other is a single bond since the effects of the invention are further enhanced.

Examples of the divalent linking group represented by LA1 in Formula (M1-B) include —O—, —(CH$_2$)$_g$—, —(CF$_2$)$_g$—, —Si(CH$_3$)$_2$—, —(Si(CH$_3$)$_2$O)$_g$—, —(OSi(CH$_3$)$_2$)$_g$— (g represents an integer of 1 to 10), —N(Z)—, —C(Z)=C(Z')—, —C(Z)=N—, —N=C(Z)—, —C(Z)$_2$—C(Z')$_2$—, —C(O)—, —OC(O)—, —C(O)O—, —O—C(O)O—, —N(Z)C(O)—, —C(O)N(Z)—, —C(Z)=C(Z')—C(O)O—, —O—C(O)—C(Z)=C(Z')—, —C(Z)=N—, —N=C(Z)—, —C(Z)—C(Z')—C(O)N(Z")—, —N(Z")—C(O)—C(Z)—C(Z')—, —C(Z)=C(Z')—C(O)—S—, —S—C(O)—C(Z)=C(Z')—, —C(Z)=N—N—C(Z')— (Z,Z',Z" each independently represent hydrogen, an alkyl group having 1 to 4 carbon atoms, a cycloalkyl group, an aryl group, a cyano group, or a halogen atom), —C≡C—, —N=N—, —S—, —S(O)—, —S(O)(O)—, —(O)S(O)O—, —O(O)S(O)O—, —SC(O)—, and —C(O)S—. Among these, —C(O)O— is preferable since the effects of the invention are further enhanced. LA1 may be a group formed by combining two or more of the above groups.

Specific examples of M1 include the following structures. In the following specific examples, "Ac" represents an acetyl group (the same hereinafter).

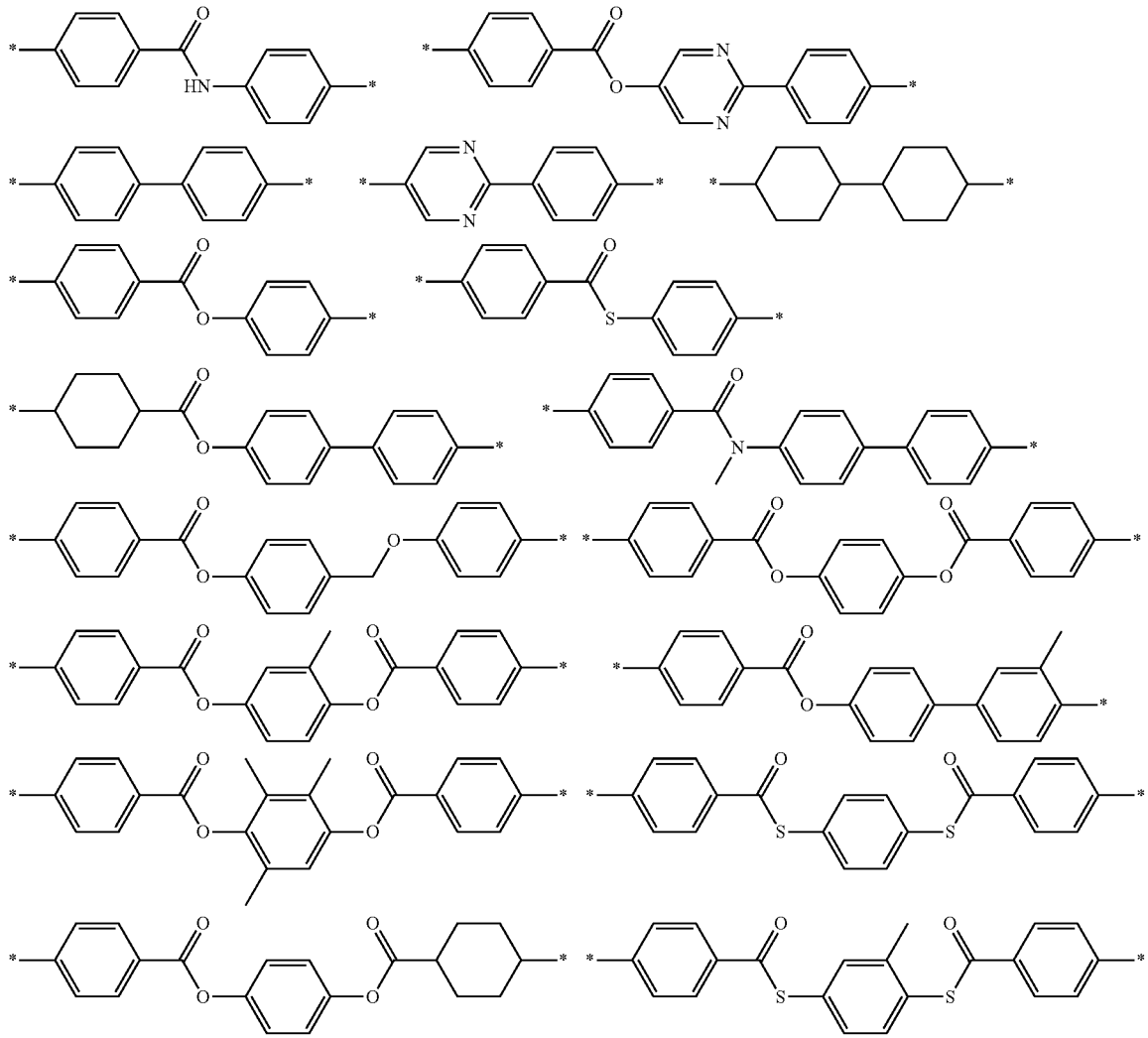

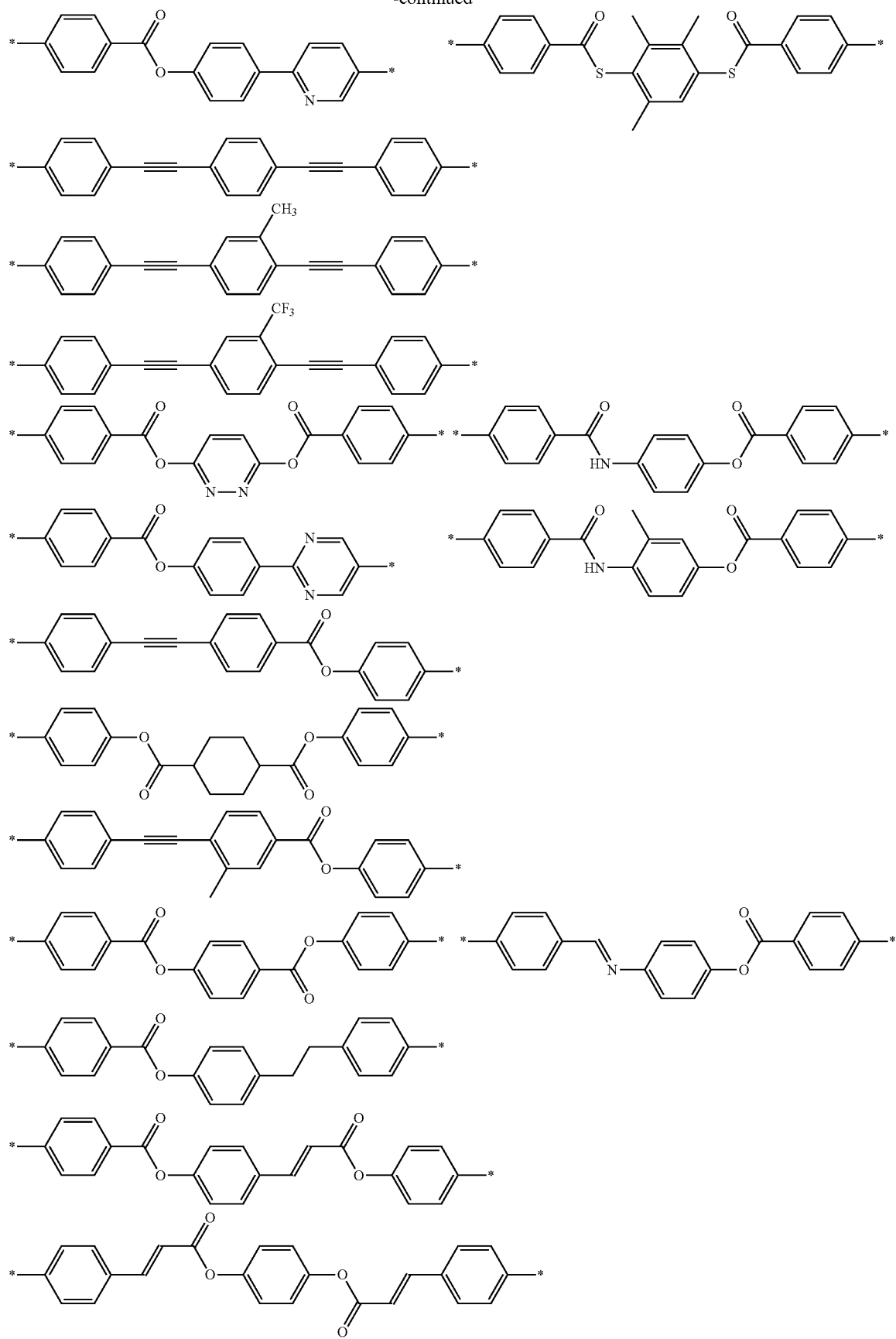

-continued
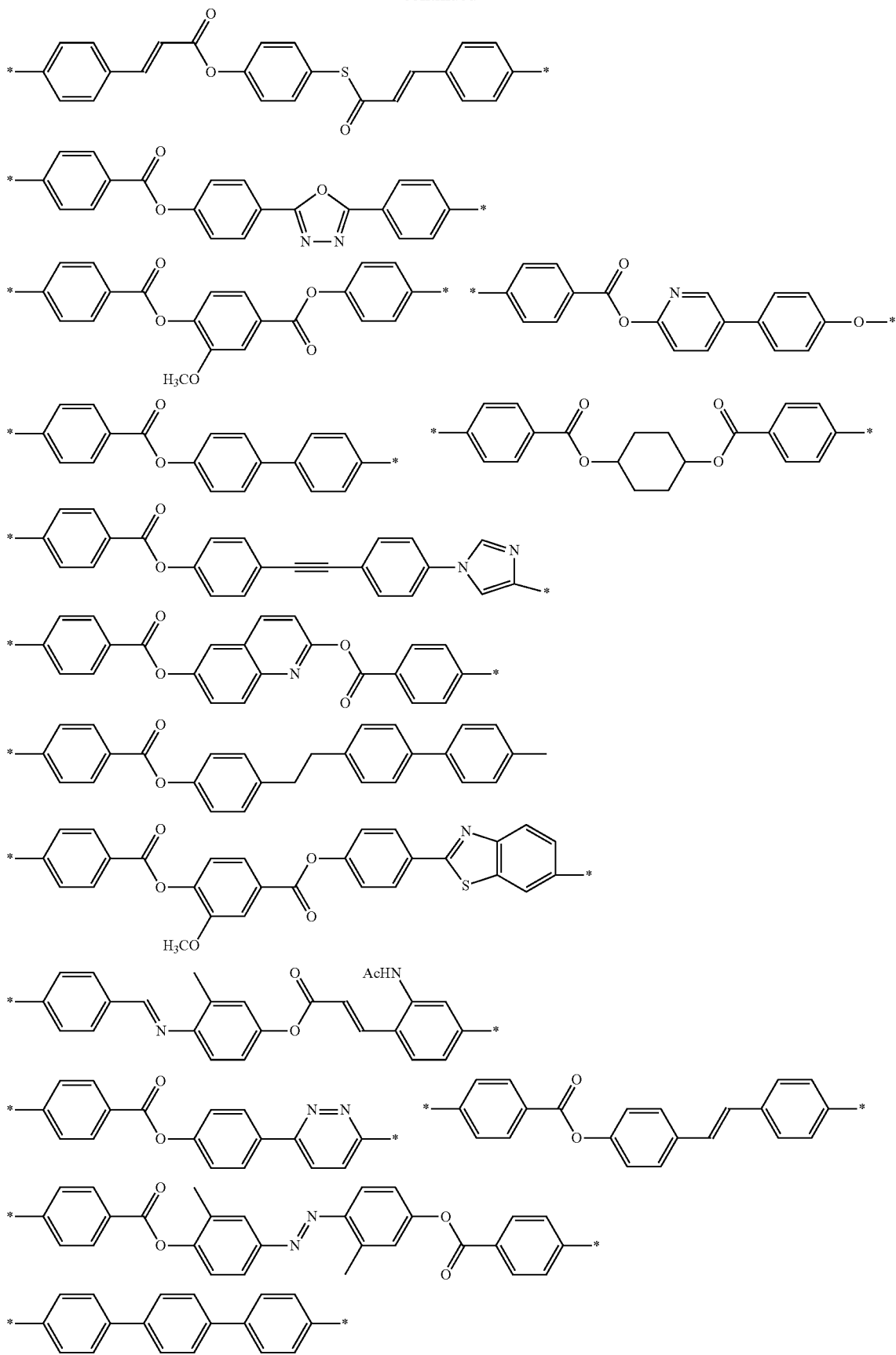

-continued
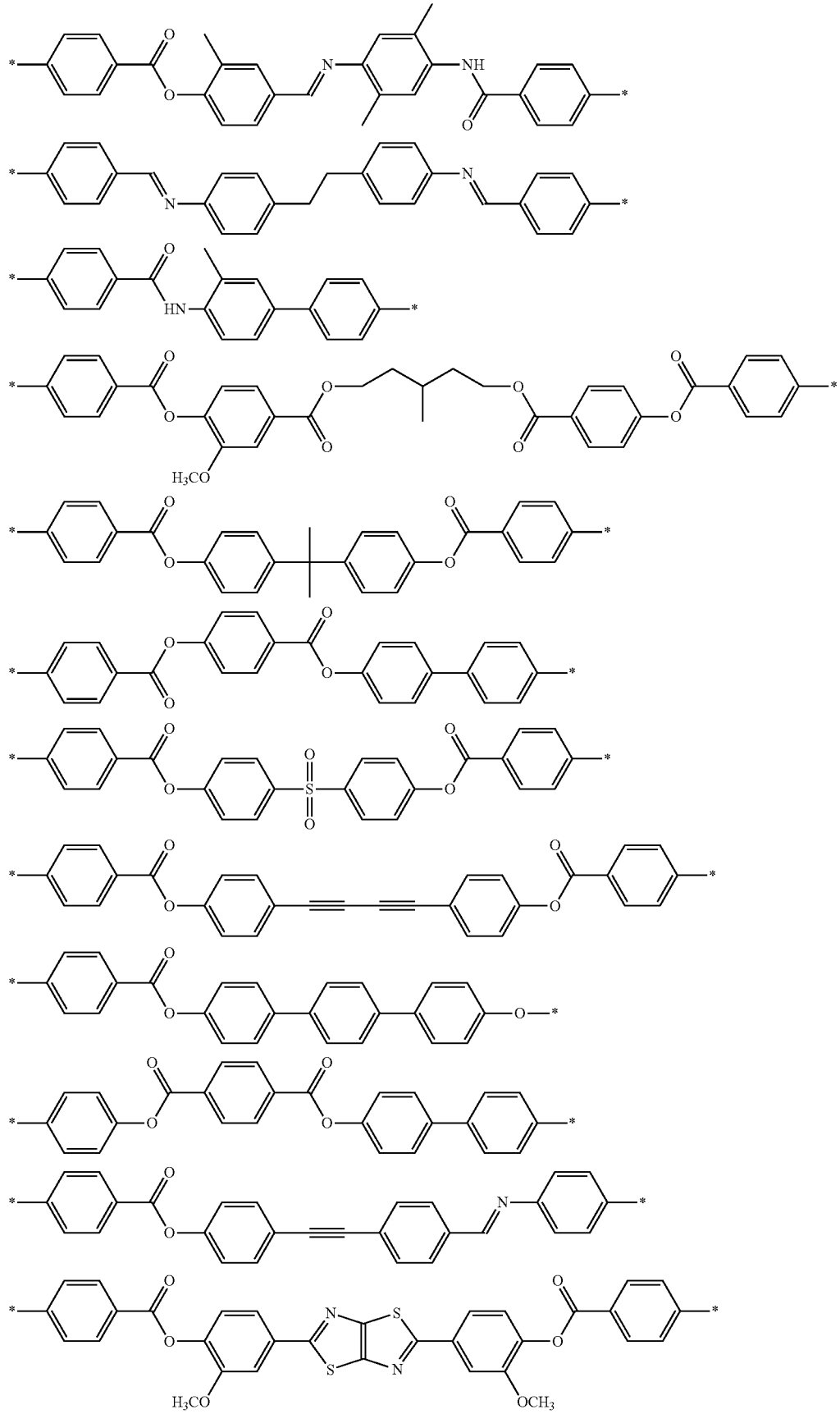

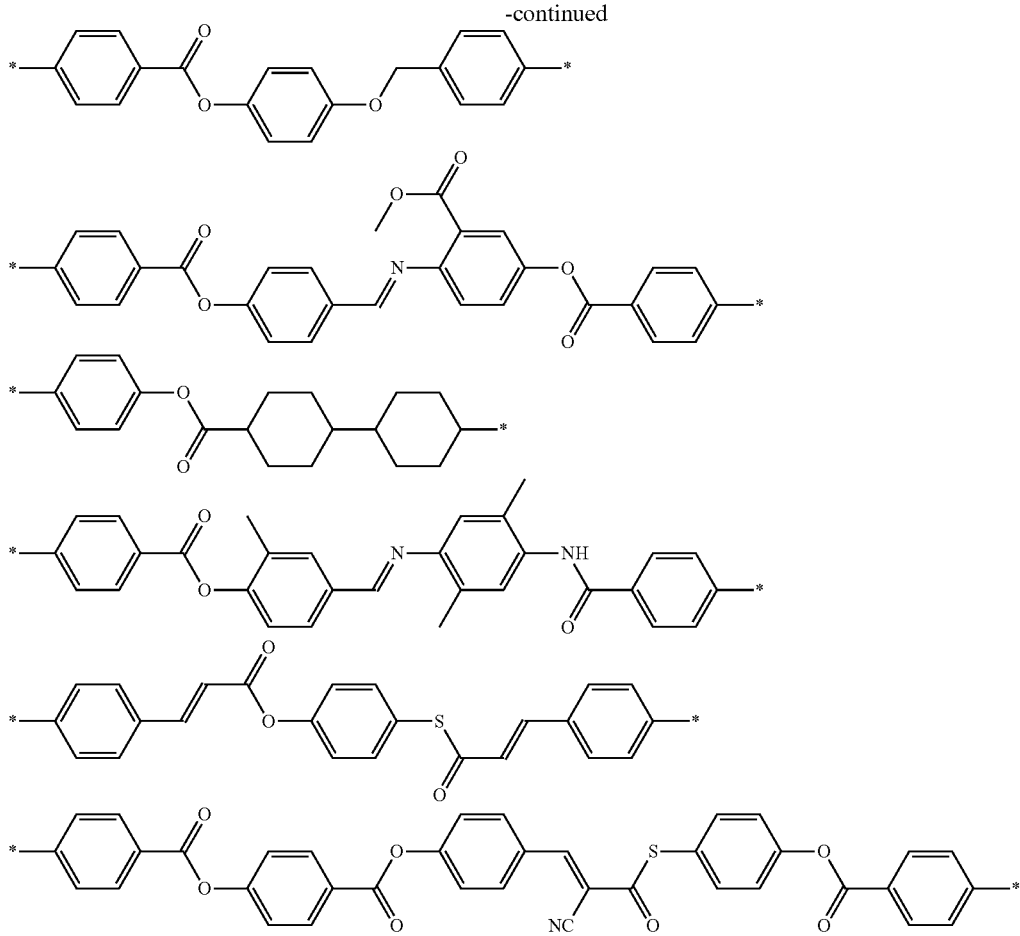

Examples of the terminal group represented by T1 include a hydrogen atom, a halogen atom, a cyano group, a nitro group, a hydroxy group, an alkyl group having 1 to 10 carbon atoms, an alkoxy group having 1 to 10 carbon atoms, an alkylthio group having 1 to 10 carbon atoms, an alkoxycarbonyloxy group having 1 to 10 carbon atoms, an alkoxycarbonyl group having 1 to 10 carbon atoms (ROC(O)—: R is an alkyl group), an acyloxy group having 1 to 10 carbon atoms, an acylamino group having 1 to 10 carbon atoms, an alkoxycarbonylamino group having 1 to 10 carbon atoms, a sulfonylamino group having 1 to 10 carbon atoms, a sulfamoyl group having 1 to 10 carbon atoms, a carbamoyl group having 1 to 10 carbon atoms, a sulfinyl group having 1 to 10 carbon atoms, a ureido group having 1 to 10 carbon atoms, and a (meth)acryloyloxy group-containing group. Examples of the (meth)acryloyloxy group-containing group include a group represented by -L-A (L represents a single bond or a linking group. Specific examples of the linking group are the same as those described for L1 and SP1. A represents a (meth)acryloyloxy group).

T1 is preferably an alkoxy group having 1 to 10 carbon atoms, more preferably an alkoxy group having 1 to 5 carbon atoms, and even more preferably a methoxy group since the effects of the invention are further enhanced. These terminal groups may be further substituted by the above groups or the polymerizable groups described in JP2010-244038A.

The number of atoms in the main chain of T1 is preferably 1 to 20, more preferably 1 to 15, even more preferably 1 to 10, and particularly preferably 1 to 7 since the effects of the invention are further enhanced. In a case where the number of atoms in the main chain of T1 is 20 or less, the alignment degree of a polarizer is further improved. Here, the "main chain" of T1 means the longest molecular chain bonded to M1, and hydrogen atoms are not counted as the number of atoms in the main chain of T1. For example, in a case where T1 is an n-butyl group, the main chain has 4 atoms, and in a case where T1 is a sec-butyl group, the main chain has 3 atoms.

The content of the repeating unit (1) is preferably 20 to 100 mass %, more preferably 30 to 99.9 mass %, and even more preferably 40 to 99.0 mass % with respect to a total of 100 mass % of the repeating units of the specific compound since the effects of the invention are further enhanced.

In the invention, the content of each repeating unit contained in the polymer liquid crystal compound is calculated based on the amount (mass) of each monomer used for obtaining each repeating unit.

The specific compound may contain only one kind of repeating unit (1) or two or more kinds of repeating units (1). Among these, two kinds of repeating units (1) may be contained in the specific compound since the effects of the invention are further enhanced.

In a case where the specific compound contains two kinds of repeating units (1), the terminal group represented by T1 in one repeating unit (repeating unit A) is preferably an alkoxy group, and the terminal group represented by T1 in the other repeating unit (repeating unit B) is preferably a group other than an alkoxy group since the effects of the invention are further enhanced.

The terminal group represented by T1 in the repeating unit B is preferably an alkoxycarbonyl group, a cyano group, or a (meth)acryloyloxy group-containing group, and more preferably an alkoxycarbonyl group or a cyano group since the effects of the invention are further enhanced.

The ratio (A/B) of the content of the repeating unit A in the specific compound to the content of the repeating unit B in the specific compound is preferably 50/50 to 95/5, more preferably 60/40 to 93/7, and even more preferably 70/30 to 90/10 since the effects of the invention are further enhanced.

Specific examples of the specific compound include polymer liquid crystal compounds represented by the following structural formulae, and polymer liquid crystal compounds in which the following structural formulae (repeating units) are appropriately combined. In the following structural formulae, R represents a hydrogen atom or a methyl group. Me represents a methyl group (the same hereinafter).

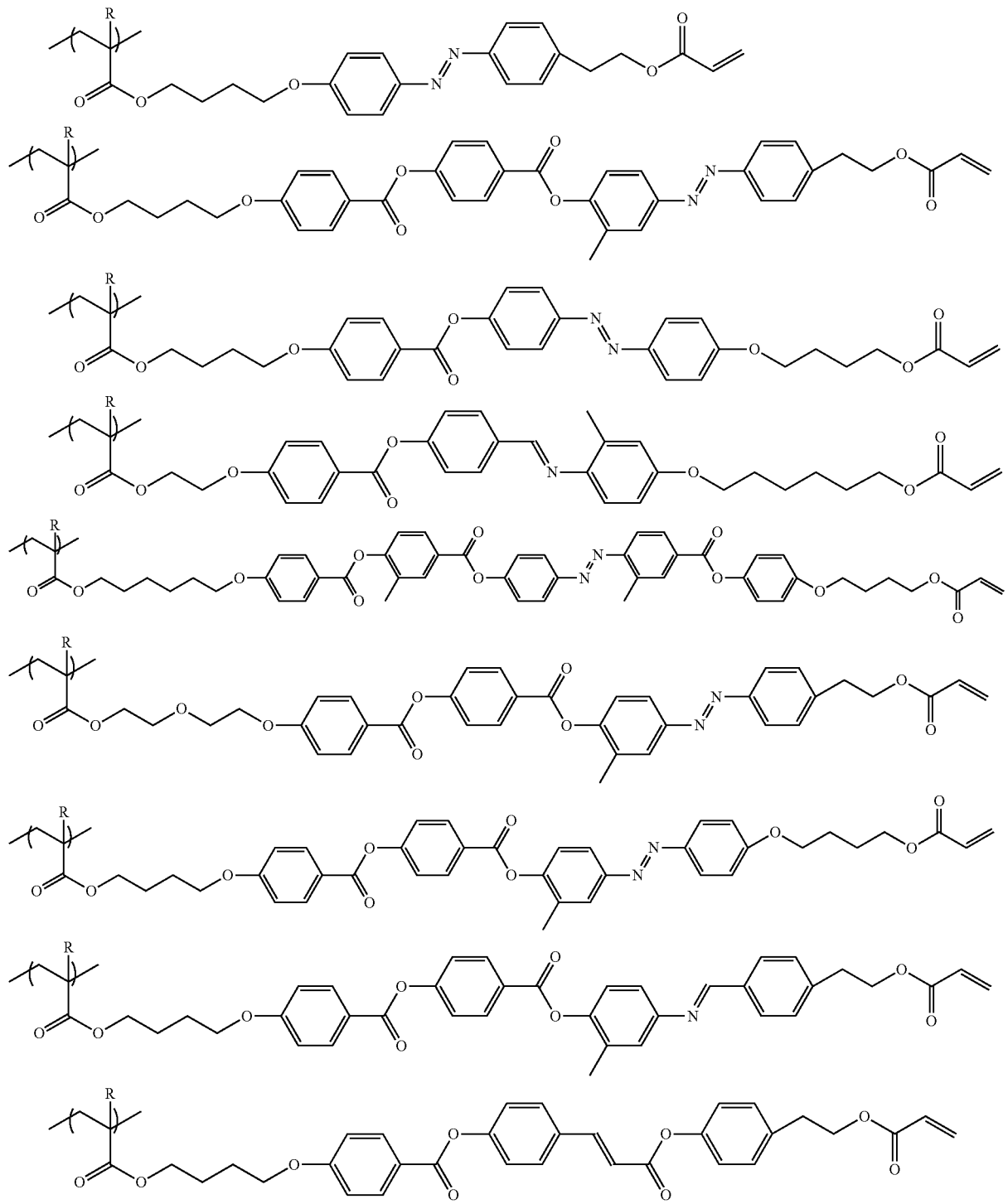

-continued
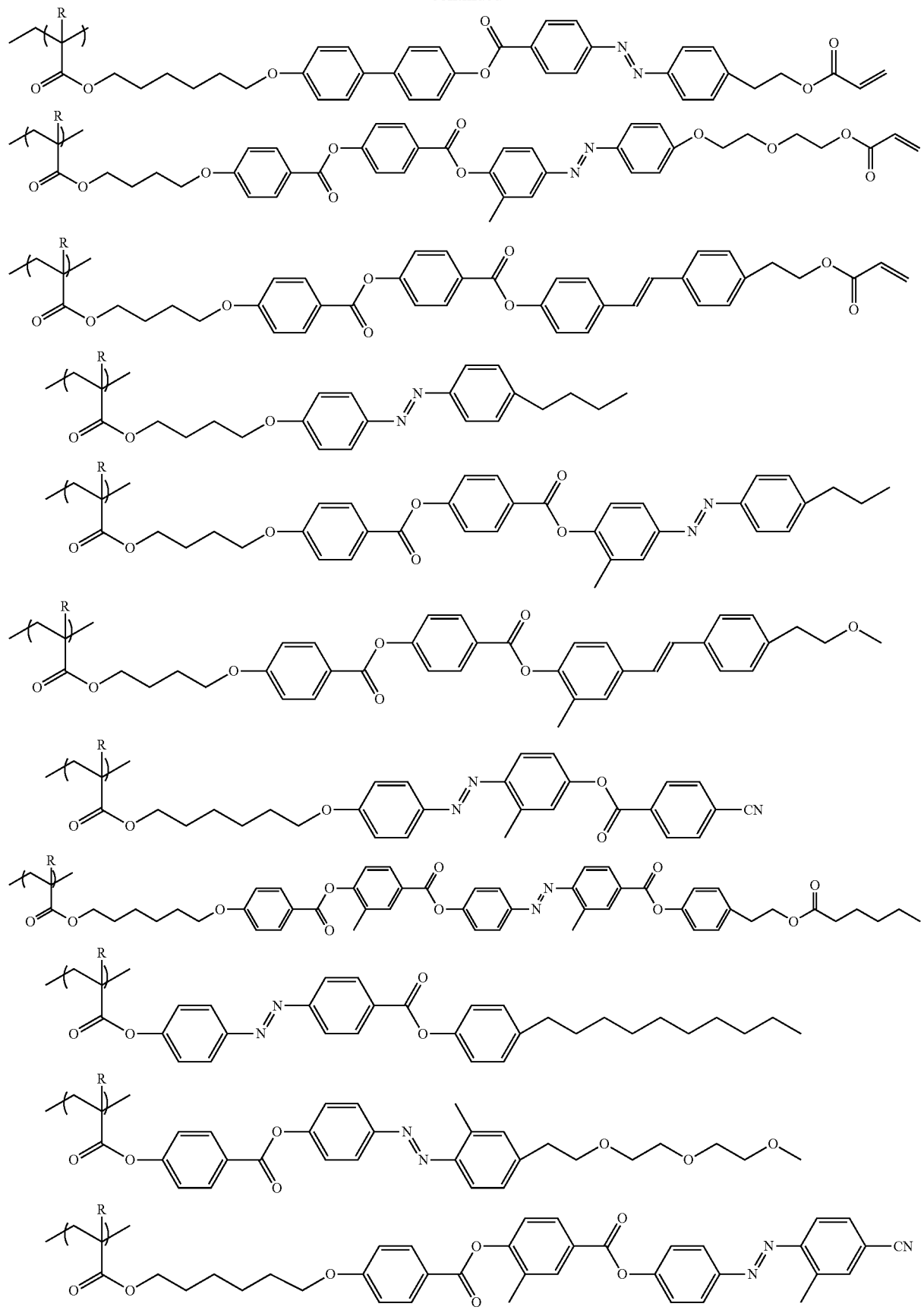

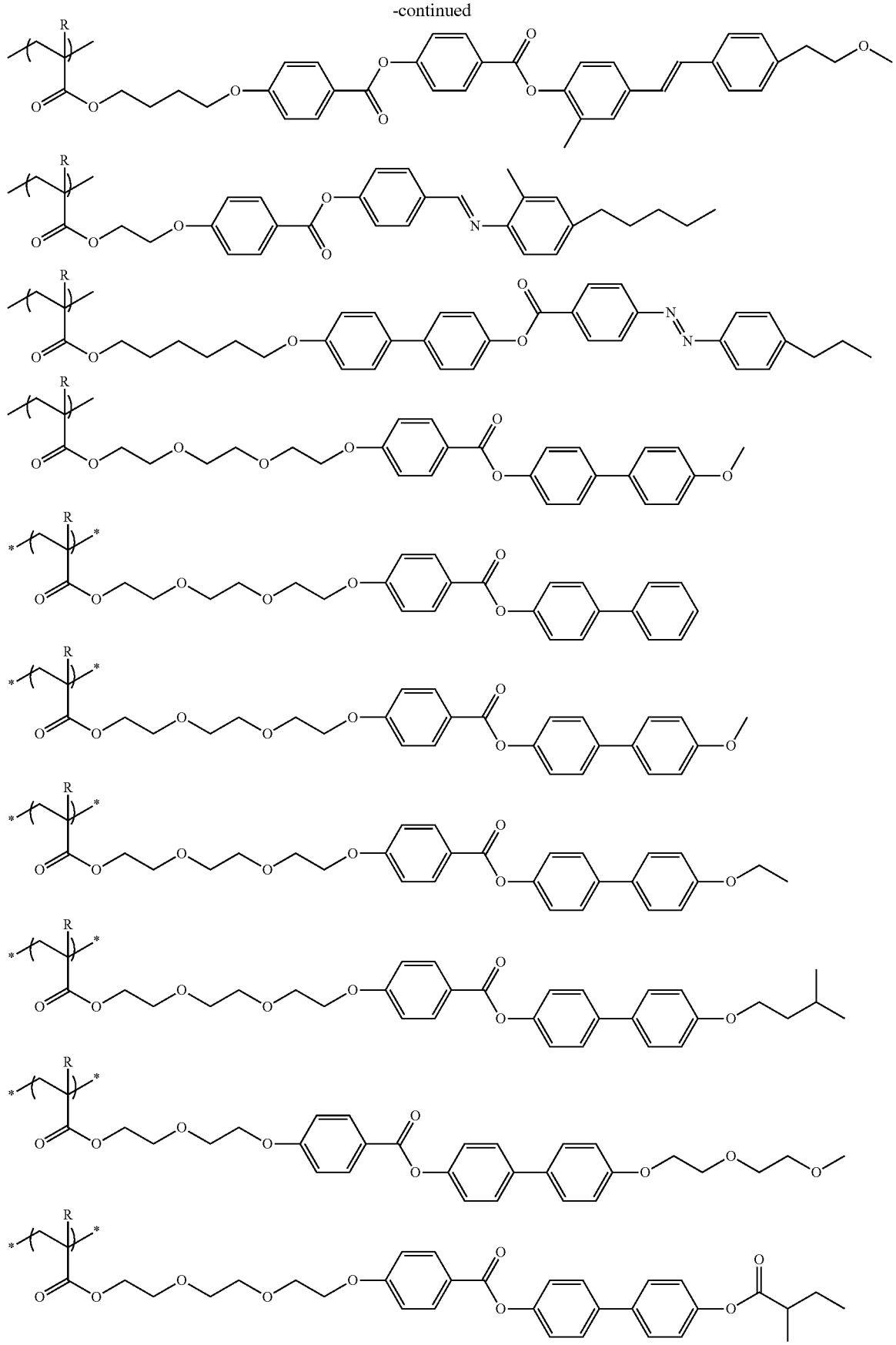

-continued
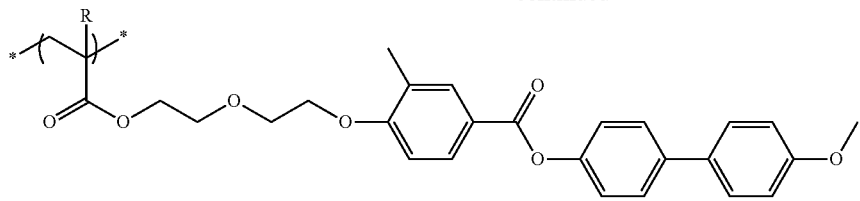
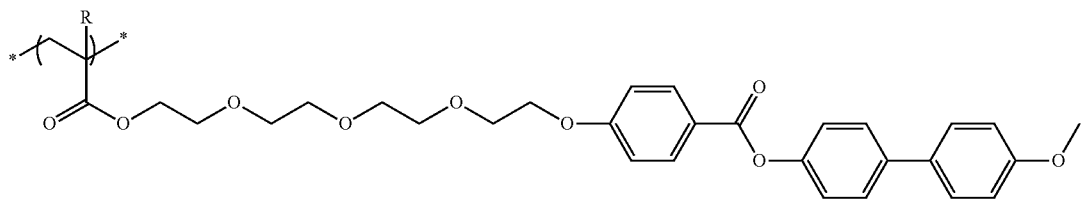
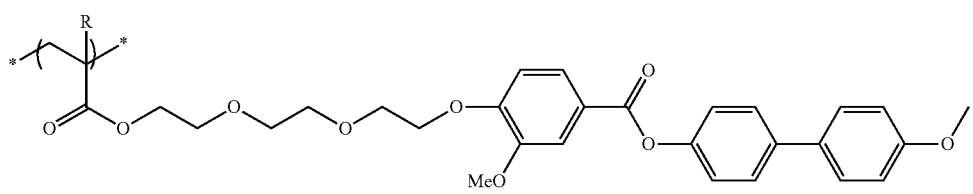
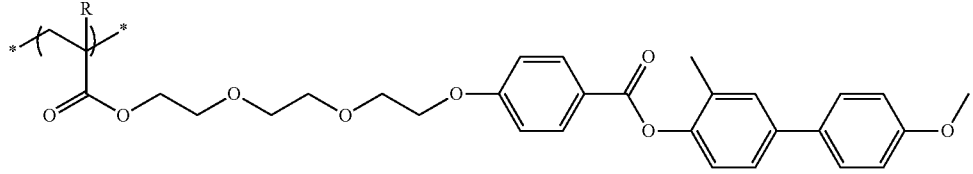
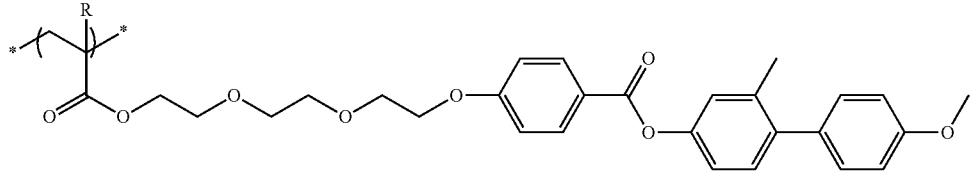
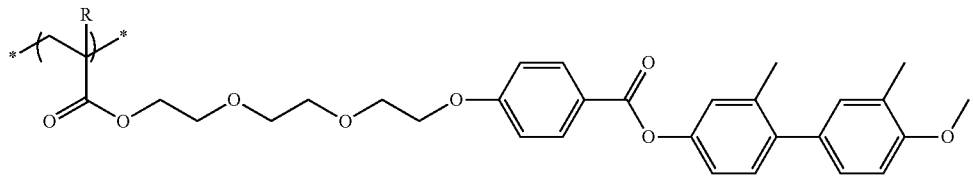
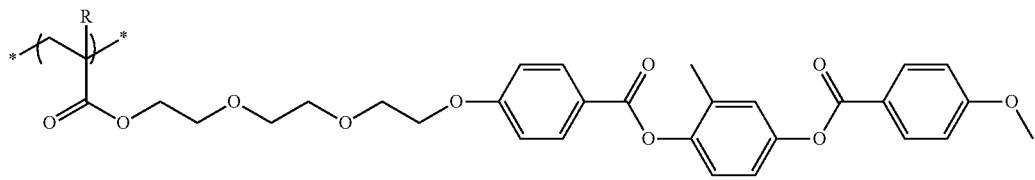
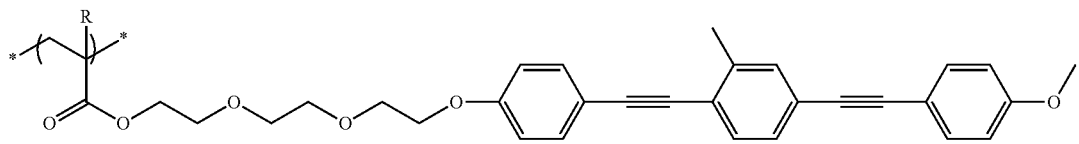
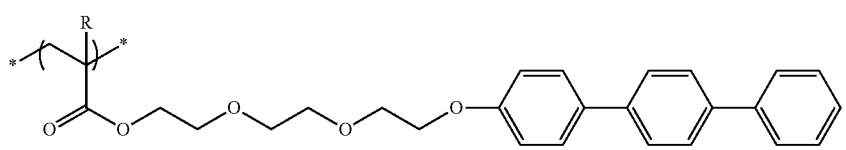

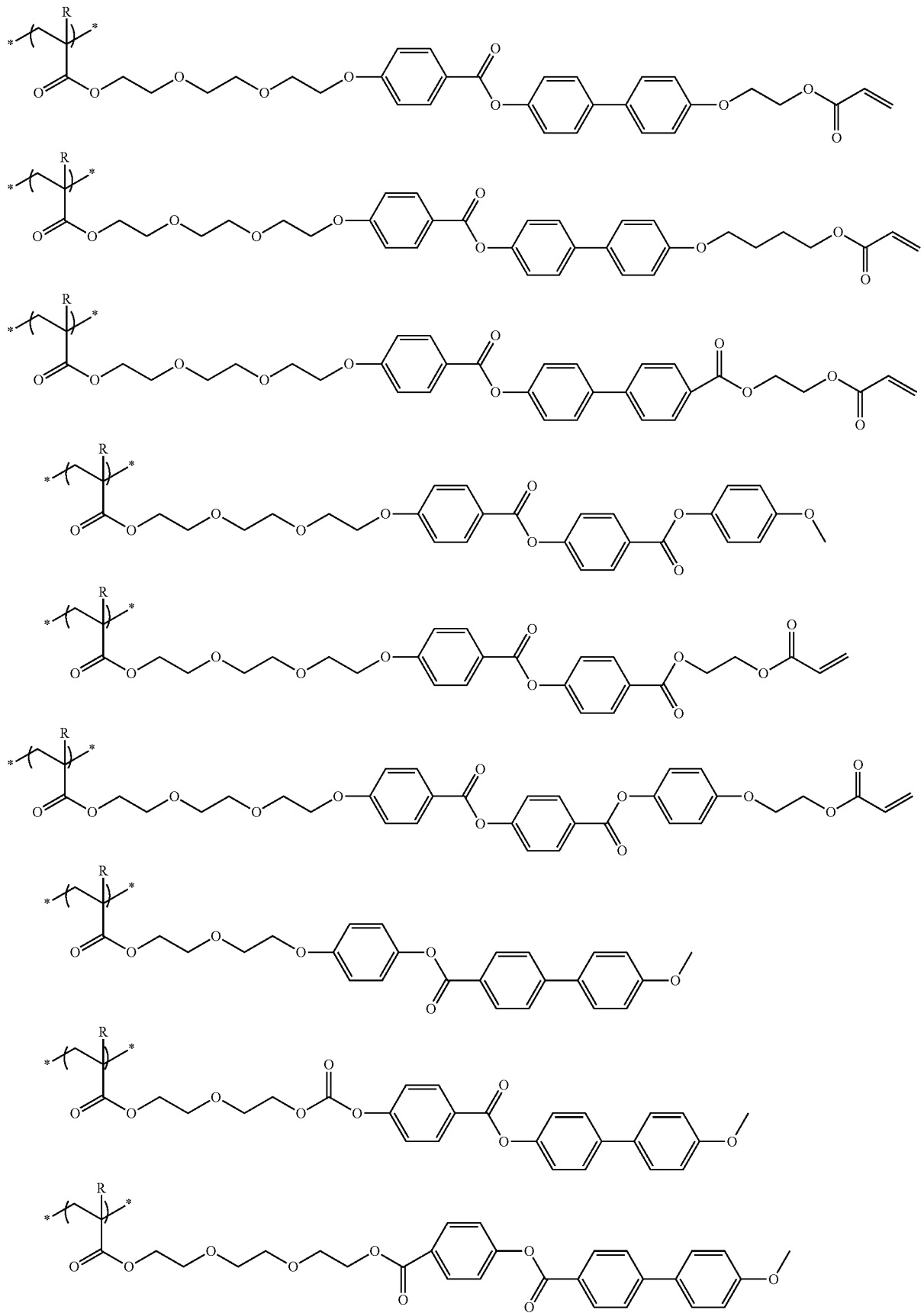

-continued

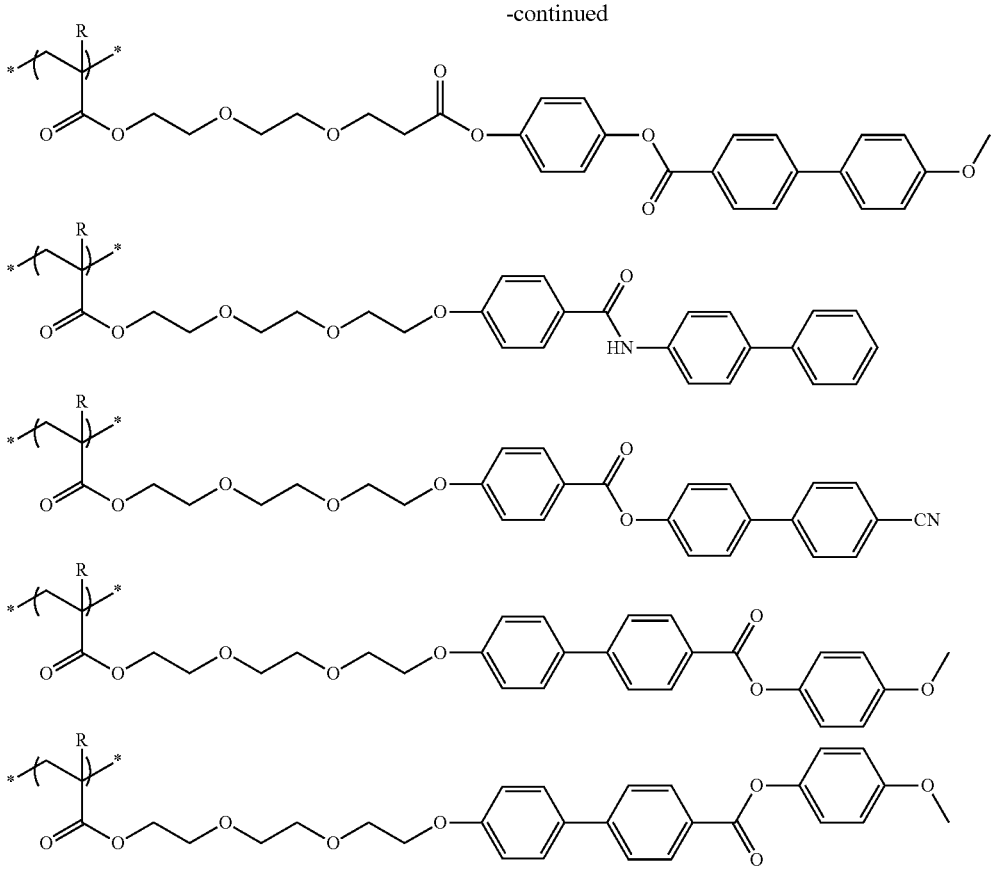

(Weight-Average Molecular Weight)

A weight-average molecular weight (Mw) of the polymer of the compound represented by Formula (I) is preferably 1,000 to 500,000, and more preferably 2,000 to 300,000 since the effects of the invention are further enhanced. In a case where Mw of the polymer of the compound represented by Formula (I) is within the above range, handling of the polymer of the compound represented by Formula (I) is facilitated.

Particularly, from the viewpoint of suppression of cracks during coating, the weight-average molecular weight (Mw) of the polymer of the compound represented by Formula (I) is preferably 10,000 or greater, and more preferably 10,000 to 300,000.

From the viewpoint of the temperature latitude of the alignment degree, the weight-average molecular weight (Mw) of the polymer of the compound represented by Formula (I) is preferably less than 10,000, and more preferably 2,000 or greater and less than 10,000.

Here, in the invention, the weight-average molecular weight and the number average molecular weight are values measured by gel permeation chromatography (GPC).

Solvent (eluant): N-methylpyrrolidone
Device Name: TOSOH HLC-8220GPC
Column: Three columns (TOSOH TSKgelSuperAWM-H (6 mm×15 cm)) are connected and used.
Column Temperature: 25° C.
Sample Concentration: 0.1 mass %
Flow Rate: 0.35 mL/min
Calibration Curve: Using a calibration curve obtained using 7 TSK standard polystyrene samples manufactured by TOSOH Corporation Mw=2,800,000 to 1,050 (Mw/Mn=1.03 to 1.06)

The concentration of the compound of Formula (I) (with respect to the whole composition including the solvent) in the composition is not particularly limited, and preferably 0.5 to 20 mass %, more preferably 1 to 17 mass %, and even more preferably 2 to 15 mass % since the effects of the invention are further enhanced.

The solid content ratio of the compound of Formula (I) in the composition is not particularly limited, and preferably 1 to 99 mass %, more preferably 50 to 95 mass %, and even more preferably 70 to 93 mass % since the effects of the invention are further enhanced.

[Other Components]

In the composition used in the invention, additives and the like may be appropriately used in addition to the above-described components. Examples thereof include a polymerization initiator, an interface improver, and a solvent.

<Polymerization Initiator>

The composition used in the invention preferably contains a polymerization initiator since the effects of the invention are further enhanced.

The polymerization initiator is not particularly limited, and a photosensitive compound, that is, a photopolymerization initiator is preferable.

As the photopolymerization initiator, various kinds of compounds can be used with no particular limitation. Examples of the photopolymerization initiator include α-carbonyl compounds (the specifications of U.S. Pat. Nos. 2,367,661A and 2,367,670A), acyloin ethers (the specification of U.S. Pat. No. 2,448,828A), aromatic acyloin compounds substituted by α-hydrocarbon (the specification of U.S. Pat. No. 2,722,512A), polynuclear quinone compounds (the specifications of U.S. Pat. Nos. 3,046,127A and 2,951,758A), combinations of triarylimidazole dimers and p-aminophenyl ketones (the specification of U.S. Pat. No. 3,549,367A), acridine and phenazine compounds (the specifications of JP1985-105667A (JP-S60-105667A) and U.S. Pat. No. 4,239,850A), oxadiazole compounds (the specification of U.S. Pat. No. 4,212,970A), and acylphosphine oxide compounds (JP1988-040799B (JP-S63-040799B), JP1993-029234B (JP-H5-029234B), JP1998-095788A (JP-H10-095788A), and JP1998-029997A (JP-H10-029997A)).

A commercially available product can also be used as the photopolymerization initiator, and examples thereof include IRGACURE (hereinafter, also abbreviated as "Irg") 184, IRGACURE 907, IRGACURE 369, IRGACURE 651, IRGACURE 819, IRGACURE OXE-01, and IRGACURE OXE-02 manufactured by BASF SE.

<Solvent>

From the viewpoint of workability and the like, the composition used in the invention preferably contains a solvent (solvent).

Examples of the solvent include organic solvents such as ketones (for example, acetone, 2-butanone, methyl isobutyl ketone, cyclopentanone, and cyclohexanone), ethers (for example, dioxane, tetrahydrofuran, tetrahydropyran, dioxolan, tetrahydrofurfuryl alcohol, and cyclopentyl methyl ether), aliphatic hydrocarbons (for example, hexane), alicyclic hydrocarbons (for example, cyclohexane), aromatic hydrocarbons (for example, benzene, toluene, xylene, and trimethylbenzene), halogenated carbons (for example, dichloromethane, trichloromethane (chloroform), dichloroethane, dichlorobenzene, and chlorotoluene), esters (for example, methyl acetate, ethyl acetate, butyl acetate, and diethyl carbonate), alcohols (for example, ethanol, isopropanol, butanol, and cyclohexanol), cellosolves (for example, methyl cellosolve, ethyl cellosolve, and 1,2-dimethoxyethane), cellosolve acetates, sulfoxides (for example, dimethyl sulfoxide), amides (for example, dimethylformamide, dimethylacetamide, N-methylpyrrolidone, N-ethylpyrrolidone, and 1,3-dimethyl-2-imidazolidinone), and heterocyclic compounds (for example, pyridine), and water. These solvents may be used alone or in combination of two or more kinds thereof.

Among these solvents, organic solvents are preferably used, and halogenated carbons or ketones are more preferably used since the effects of the invention are further enhanced.

In a case where the composition used in the invention contains a solvent, the content of the solvent is preferably 70 to 99.5 mass %, more preferably 80 to 99 mass %, and even more preferably 85 to 98 mass % with respect to the total mass of the composition since the effects of the invention are further enhanced.

<Interface Improver>

The composition used in the invention preferably contains an interface improver. Due to the interface improver contained, the smoothness of the coating surface is improved, and the alignment degree is further improved or cissing and unevenness are suppressed. Thus, the in-plane uniformity improvement effect is anticipated.

As the interface improver, a material making the dichroic azo dye, and the compound represented by Formula (I) or the polymer thereof horizontal on the coating surface side is preferable, and the compounds (horizontal alignment agents) described in paragraphs to of JP2011-237513A can be used.

In a case where the composition used in the invention contains an interface improver, the content of the interface improver is preferably 0.001 to 5 parts by mass, and more preferably 0.01 to 3 parts by mass with respect to a total of 100 parts by mass of the dichroic azo dye and the compound represented by Formula (I) or the polymer thereof in the composition.

[Absorption Maximum Wavelength]

The film according to the embodiment of the invention usually has one or more absorption maximum wavelengths ($\lambda$max).

A difference ($\Delta\lambda$max) between the solution absorption maximum wavelength of at least one of the first or second dichroic azo dye described above and the absorption maximum wavelength of the film according to the embodiment of the invention is preferably 10 nm to 100 nm since the effects of the invention are further enhanced. The difference ($\Delta\lambda$max) between the solution absorption maximum wavelength of the second dichroic azo dye described above and the absorption maximum wavelength of the film according to the embodiment of the invention is preferably 10 nm to 100 nm since the effects of the invention are further enhanced.

Since the effects of the invention are further enhanced, it is preferable that the film according to the embodiment of the invention has at least two absorption maximum wavelengths, and it is more preferable that the at least two absorption maximum wavelengths are preferably 400 nm or greater and less than 550 nm, and 550 nm or greater and 750 nm or less, respectively. In a case where the film according to the embodiment of the invention has at least two absorption maximum wavelengths, $\Delta\lambda$max is the difference between the solution absorption maximum wavelength of the dichroic azo dye and the absorption maximum wavelength of the film according to the embodiment of the invention closer thereto.

[Film Thickness]

The anisotropic light absorption film according to the embodiment of the invention preferably has a film thickness of 0.3 $\mu$m to 5 $\mu$m, and more preferably 0.3 $\mu$m to 3 $\mu$m since the effects of the invention are further enhanced. The lower limit of the film thickness is more preferably 0.8 $\mu$m or greater since the effects of the invention are further enhanced. The upper limit of the film thickness is more preferably 3 $\mu$m or less since the effects of the invention are further enhanced.

[Log P Value]

In the anisotropic light absorption film according to the embodiment of the invention, a difference ($\Delta$Log P) between a Log P value of at least one of the first or second dichroic azo dye (particularly, the second dichroic azo dye) in which the difference between the solution absorption maximum wavelength and the absorption maximum wavelength of the anisotropic light absorption film (in a case where the anisotropic light absorption film has at least two absorption maximum wavelengths, the difference between the solution absorption maximum wavelength and the absorption maximum wavelength of the anisotropic light absorption film closer thereto) is 10 nm to 100 nm, and a Log P value of the compound represented by Formula (I) or the polymer thereof (compound of Formula (I)) is preferably 5 or greater and 8 or less from the viewpoint of easy control of the difference between the solution absorption maximum wavelength and the absorption maximum wavelength of the anisotropic light absorption film. In a case where the compound of Formula (I) and the dichroic azo dye, whose Log P values have a specific relationship as above, are used, it is thought that the compatibility between the compound of Formula (I) and the dichroic azo dye is reduced, and the dichroic azo dyes are arranged in the anisotropic light absorption film.

Controlling the compatibility between the compound of Formula (I) and the dichroic azo dye is also influenced by the concentration of the dichroic azo dye in the composition. In a case where the solid content of the composition is 100 parts by mass and the concentration of the dichroic azo dye is less than 10 parts by mass, the difference of the Log P value is preferably 6 or greater. In a case where the concentration of the dichroic azo dye is 10 parts by mass or greater, the difference of the Log P value is preferably 5 or greater.

[DSC]

The decrease in the compatibility between the compound of Formula (I) and the dichroic azo dye (particularly, the second dichroic azo dye) as described above can be confirmed by the following method using a differential scanning calorimeter (DSC).

The dichroic azo dye is cast on a glass, heated to a melting point of the dichroic azo dye or higher, and then cooled to room temperature. About 5 mg of a sample (sample 1) scraped from the cast film of the dichroic azo dye obtained is put in an aluminum pan, covered, and set in a differential scanning calorimeter (DSC).

After that, calorimetric measurement is performed while the temperature is raised at a rate of 10° C./min. A melting point (T1) of the sample 1 (dichroic azo dye) is confirmed from the obtained spectrum. Next, calorimetric measurement of a sample (sample 2) obtained by casting the composition containing the compound of Formula (I) and the dichroic azo dye on a glass is performed similarly to confirm a transition temperature (T2) corresponding to the dichroic azo dye of the sample 2. In a case where the dichroic azo dye and the compound of Formula (I) are compatible with each other, a relationship of T1>T2 is generally satisfied, and it is judged that the smaller the difference between T1 and T2, the lower the compatibility between the compound of Formula (I) and the dichroic azo dye.

The difference between T1 and T2 is preferably 30° C. or less, and more preferably 20° C. or less since the effects of the invention are further enhanced.

[Arrangement Structure]

As described above, the anisotropic light absorption film according to the embodiment of the invention (the film according to the embodiment of the invention) has the arrangement structure (crystal structure) of the first dichroic azo dye described above or the arrangement structure (crystal structure) of the second dichroic azo dye described above therein. The film according to the embodiment of the invention may have both the arrangement structure of the first dichroic azo dye described above and the arrangement structure of the second dichroic azo dye described above therein. The film according to the embodiment of the invention preferably has at least the arrangement structure of the second dichroic azo dye described above therein since the effects of the invention are further enhanced.

The arrangement structure of the dichroic azo dye may be an arrangement structure of the dichroic azo dye after the reaction (for example, after the reaction of the radically polymerizable group).

The fact that the film according to the embodiment of the invention has the above-described arrangement structure therein can be confirmed by comparison of the X-ray diffraction (XRD) spectra of the following films 1 to 4.

Film 1: The film formed from a composition having a first dichroic azo dye, a second dichroic azo dye, and a compound of Formula (I) (the film according to the embodiment of the invention)

Film 2: The film formed from a composition having only a compound of Formula (I)

Film 3: The film formed from a composition having a first dichroic azo dye and a compound of Formula (I)

Film 4: The film formed from a composition having a second dichroic azo dye and a compound of Formula (I)

<Production of Film>

The films 1 to 4 are produced by similar methods. For example, the concentrations and coating conditions of coating liquids are adjusted to make the areas and film thicknesses of the films the same.

The methods of producing the films 1 to 4 are not particularly limited as long as these are similar. In a case where the film 1 contains an interface improver, the films 2 to 4 contain the same amount of interface improver as the film 1.

<XRD Measurement>

The films 1 to 4 are subjected to XRD measurement under similar conditions (for example, the film thickness, the measurement area, and the measurement conditions are adjusted).

For example, XRD measurement is performed as follows.

The films 1 to 4 are subjected to X-ray diffraction measurement using an X-ray diffractometer for thin film evaluation (manufactured by RIGAKU Corporation, trade name: "SmartLab", in-plane optical system). In the following description, the X-ray diffraction analysis performed using an in-plane method is also referred to as "in-plane XRD". The in-plane XRD is performed by irradiating a surface of a polarizer layer with X-rays under the following conditions using a thin film X-ray diffractometer. A direction in which the compound of Formula (I) and the dichroic azo dye are aligned in a major axis direction is defined as an azimuthal angle (φ) of 0°, and in-plane XRD in all directions is performed in increments of 15°. The direction in the plane of the substrate in which the peak intensity is maximum is determined through $ scanning performed with respect to the observed peak. The spectra of the in-plane measurement in the obtained direction are used to perform XRD spectrum comparison to be described later. A value standardized as a film thickness corresponding to the X-ray penetration length at an X-ray incidence angle of 0.2° is used as the peak intensity.

A measurement example of the XRD measurement will be shown below.

A film having a size of 40 mm×40 mm is cut out, and a surface of the polarizer layer is irradiated with X-rays using an X-ray diffractometer for thin film evaluation (manufactured by RIGAKU Corporation, trade name: "SmartLab") under the following conditions to perform the in-plane XRD.

Using Cu-ray source (CuKα, output: 45 kV, 200 mA)

X-ray incidence angle of 0.2°

Optical system to be used: parallel optical system (cross beam optics (CBO), parallel beam (PB))

Incidence side: incidence slit of 0.2 mm, incident parallel slit of 0.5 degrees (degrees) in in-plane parallel slit collimator (PSC), longitudinal restriction slit of 10 mm Receiving side: receiving slit of 20 mm, receiving parallel slit of 0.5 degrees in in-plane parallel slit analyzer (PSA)

Conditions for 2θχ/ϕ Scanning: 0.008 degrees/step, 2.0 degrees/min from 1 to 40 degrees Conditions for ϕ Scanning: 0.5 degrees/step, 9.6 degrees/min from −120 to 120 degrees A direction in which the compound of Formula (I) and the dichroic azo dye are aligned in a major axis direction is defined as an azimuthal angle (ϕ) of 0°, and in-plane measurement (2θχ/ϕ scanning) in all directions is performed in increments of 15°. The direction in the plane of the substrate in which the peak intensity is maximum is determined through ϕ scanning performed with respect to the observed peak. Both the measurements are performed using CuKα at an incidence angle of 0.20°. A period length is obtained from the following diffraction angle-distance relationship using the peak obtained from the measurement of the alignment direction (the direction determined as described above). In addition, a peak intensity standardized as a film thickness corresponding to the X-ray penetration length at an X-ray incidence angle of 0.2° is calculated (cps notation).

$$d=\lambda/(2\times\sin\theta) \text{ (}d\text{: distance, }\lambda\text{: incident X-ray wavelength (}CuK\alpha\text{; 1.54 Å))}$$

As described above, the production conditions for the films 1 to 4 are matched with one another and the measurement conditions for XRD for the films 1 to 4 are matched with one another, and thus it is possible to compare XRD spectrum peaks.

<XRD Spectrum Comparison>

A peak derived from the crystal structure of the compound of Formula (I) is usually observed in the XRD spectrum of the film 2 (compound of Formula (I) only).

In the comparison between the XRD spectrum of the film 2 (compound of Formula (I) only) and the XRD spectrum of the film 3 (first dichroic azo dye+compound of Formula (I)), in a case where a peak other than the peak observed in the XRD spectrum of the film 2 is shown in the XRD spectrum of the film 3, the peak (hereinafter, referred to as "peak 1") can be said to be a peak derived from the arrangement structure (crystal structure) of the first dichroic azo dye.

Similarly, in the comparison between the XRD spectrum of the film 2 (compound of Formula (I) only) and the XRD spectrum of the film 4 (second dichroic azo dye+compound of Formula (I)), in a case where a peak other than the peak observed in the XRD spectrum of the film 2 is shown in the XRD spectrum of the film 4, the peak (hereinafter, referred to as "peak 2") can be said to be a peak derived from the arrangement structure (crystal structure) of the second dichroic azo dye.

In a case where the XRD measurement is performed on the film 1 (first dichroic azo dye+second dichroic azo dye+compound of Formula (I)) and the peak 1 described above is observed in the XRD spectrum, it can be said that the film 1 has the arrangement structure of the first dichroic azo dye described above therein.

In a case where the peak 2 described above is observed in the XRD spectrum of the film 1, it can be said that the film 1 has the arrangement structure of the second dichroic azo dye described above therein.

In a case where a peak other than the peak observed in the XRD spectrum of the film 2 is not shown in the XRD spectrum of the film 1, or in a case where a peak other than the peak observed in the XRD spectrum of the film 2 is shown in the XRD spectrum of the film 1, but it does not correspond to any of the peak 1 and the peak 2 described above, it can be said that the film 1 has neither the arrangement structure of the first dichroic azo dye described above nor the arrangement structure of the second dichroic azo dye described above therein.

Specific description thereof will be given using Example 13 to be described later as an example.

In Example 13, a polymer liquid crystal compound P-7 is used as a compound of Formula (I), a dichroic azo dye Y-1 is used as a first dichroic azo dye, and a dichroic azo dye C-1 is used as a second dichroic azo dye.

Figure 1B:
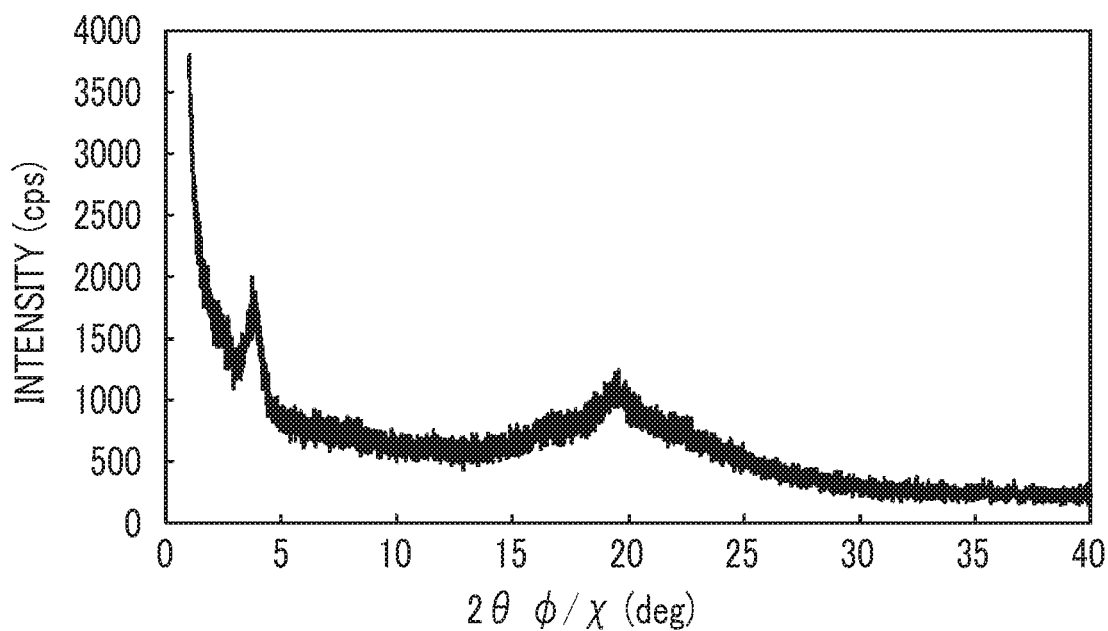
FIG. 1B is an XRD spectrum (azimuthal angle: 30°) of a film 4 in Example 13.

First, in the comparison between the XRD spectrum (FIG. 1A) of the film 2 (polymer liquid crystal compound P-7 only) and the XRD spectrum (FIG. 1B) of the film 4 (dichroic azo dye C-1+polymer liquid crystal compound P-7), a peak 2 (2θ: 3.7°, half-width: 8.3°) other than the peak observed in the XRD spectrum of the film 2 is shown in the XRD spectrum of the film 4 (azimuthal angle: 30°). The peak 2 is a peak derived from the arrangement structure of the dichroic azo dye C-1 (second dichroic azo dye).

Next, in the measurement of the XRD spectrum of the film 1 (dichroic azo dye Y-1+dichroic azo dye C-1+polymer liquid crystal compound P-7), the peak 2 described above is observed in the XRD spectrum of the film 1 (the same as FIG. 1B) (azimuthal angle: 30°).

Accordingly, it can be said that the anisotropic light absorption film of Example 13 has the arrangement structure (crystal structure) of the dichroic azo dye C-1 (second dichroic azo dye) therein.

Figure 2A:
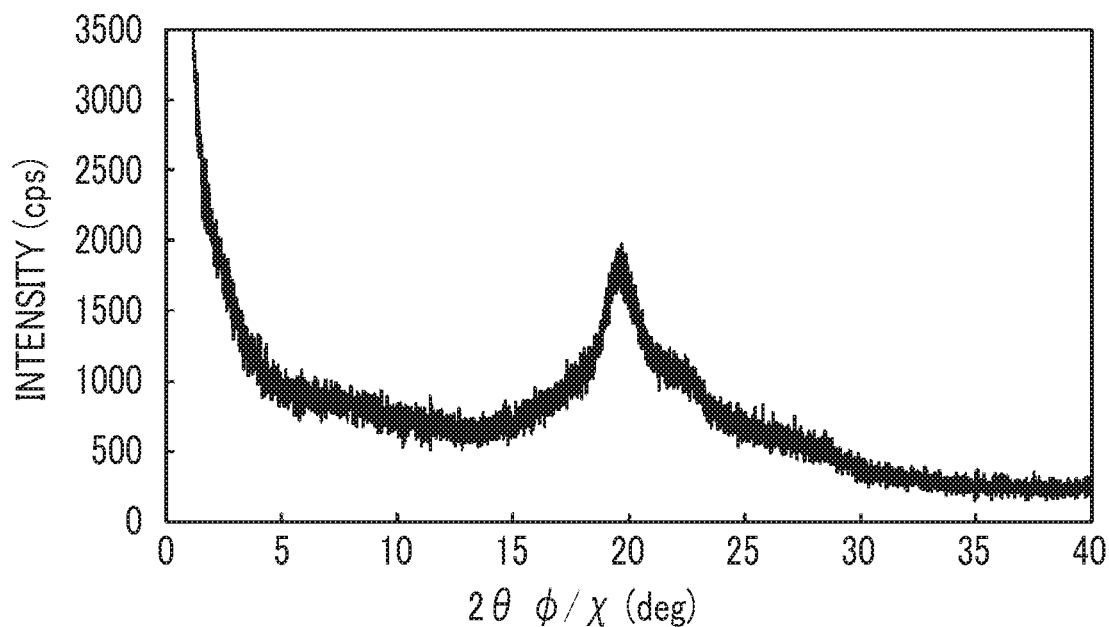
FIG. 2A is an XRD spectrum (azimuthal angle: 10°) of a film 2 in Example 20.
Figure 2B:
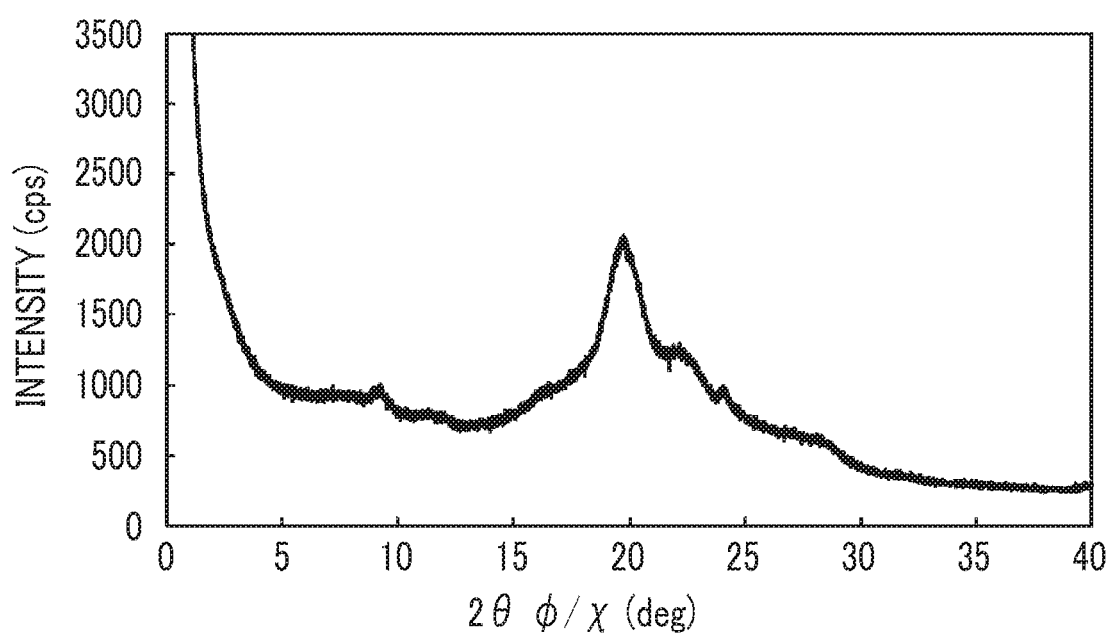
FIG. 2B is an XRD spectrum (azimuthal angle: 10°) of a film 4 in Example 20.

Similarly, regarding Example 20 to be described later, in the comparison between the XRD spectrum (FIG. 2A) of the film 2 (polymer liquid crystal compound P-7 only) and the XRD spectrum (FIG. 2B) of the film 4 (dichroic azo dye C-6+polymer liquid crystal compound P-7), a peak 2 (2θ: 9.3°, half-width: 5.0°) other than the peak observed in the XRD spectrum of the film 2 is shown in the XRD spectrum of the film 4 (azimuthal angle: 10°). The peak 2 is a peak derived from the arrangement structure of the dichroic azo dye C-6 (second dichroic azo dye).

Next, regarding Example 20 to be described later, in the measurement of the XRD spectrum of the film 1 (dichroic azo dye Y-1+dichroic azo dye C-6+polymer liquid crystal compound P-7), the peak 2 described above is observed in the XRD spectrum of the film 1 (the same as FIG. 2B) (azimuthal angle: 10°).

Accordingly, it can be said that the anisotropic light absorption film of Example 20 has the arrangement structure (crystal structure) of the dichroic azo dye C-6 (second dichroic azo dye) therein.

The half-width of the peak derived from the arrangement structure (crystal structure) of the dichroic azo dye in ϕ scanning is preferably less than 10.0° since the effects of the invention are further enhanced. The fact that the half-width in ϕ scanning is small means that the crystal structure has high crystallinity, and a higher alignment degree Can be achieved.

[Laminate]

Figure 3:
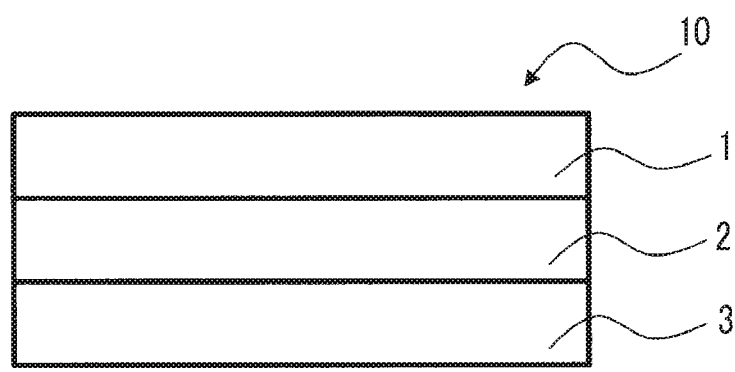
FIG. 3 is a schematic cross-sectional view showing an embodiment of a laminate according to the embodiment of the invention.

A laminate 10 according to the embodiment of the invention has an anisotropic light absorption film 1 according to the embodiment of the invention, and an alignment film 2 or a substrate 3 as shown in FIG. 3.

[Alignment Film]

The alignment film used in the invention is not particularly limited as long as it is an alignment film capable of aligning the dichroic azo dye, or the compound represented by Formula (I) or the polymer thereof used in the invention. The alignment film can be provided by means of a rubbing treatment on the film surface with an organic compound (preferably a polymer), oblique vapor deposition of an inorganic compound, forming a layer having microgrooves, or accumulation of an organic compound (for example, ω-tricosanoic acid, dioctadecylmethylammonium chloride or methyl stearate) by the Langmure-Blogette method (LB film). Furthermore, there have been known alignment films having an aligning function imparted thereto by applying an electrical field, applying a magnetic field, or light irradiation. The alignment film used in the invention may be an alignment film containing one or both of a polyamic acid and a polyimide compound, or a photo-alignment film containing a photoactive compound having an azo group as a photoactive group.

<Photo-Alignment Film>

The photo-alignment material used for the photo-alignment film containing a photoactive compound having an azo group as a photoactive group is described in many literatures. In the invention, preferable examples thereof include azo compounds described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B, aromatic ester compounds described in JP2002-229039A, maleimide and/or alkenyl-substituted nadimide compounds having photo-alignment units described in JP2002-265541A and JP2002-317013A, photocrosslinkable silane derivatives described in JP4205195B and JP4205198B, and photocrosslinkable polyimides, polyamides, and esters described in JP2003-520878A, JP2004-529220A, and JP4162850B. Azo compounds, photocrosslinkable polyimides, polyamides, and esters are more preferable.

To a photo-alignment film formed from the above-described material, linearly polarized light or unpolarized light is applied to manufacture a photo-alignment film.

In this specification, the "linearly polarized light irradiation" and the "unpolarized light irradiation" are operations for causing a photoreaction to the photo-alignment material. The wavelength of the light used varies depending on the photo-alignment material used and is not particularly limited as long as the wavelength is a wavelength necessary for the photoreaction. The peak wavelength of the light used for light irradiation is preferably 200 nm to 700 nm, and ultraviolet light having a light peak wavelength of 400 nm or less is more preferable.

The light source used for light irradiation is a usually used light source, and examples thereof include lamps such as a tungsten lamp, a halogen lamp, a xenon lamp, a xenon flash lamp, a mercury lamp, a mercury/xenon lamp, and a carbon arc lamp, various lasers [for example, a semiconductor laser, a helium/neon laser, an argon ion laser, a helium/cadmium laser, and an YAG (yttrium/aluminum/garnet) laser], light emitting diodes, and cathode ray tubes.

As means for obtaining linearly polarized light, a method using a polarizing plate (for example, an iodine polarizing plate, a dichroic dye polarizing plate, or a wire grid polarizing plate), a method using a prism-based element (for example, a GLAN-THOMSON prism) or a reflective polarizer using a BREWSTER angle, or a method using light emitted from a polarized laser light source can be employed. Only light having a necessary wavelength may be selectively applied by using a filter, a wavelength conversion element, or the like.

In a case where linearly polarized light is used as light for irradiation, a method of irradiating the alignment film with light from an upper surface or a rear surface in a direction vertical or oblique to the alignment film surface is employed. Although the incidence angle of the light varies depending on the photo-alignment material, the incidence angle is preferably 0° to 90° (vertical), and more preferably 40° to 90°.

In a case where unpolarized light is used, the alignment film is irradiated with unpolarized light from an oblique direction. The incidence angle of the light is preferably 10° to 80°, more preferably 20° to 60°, and even more preferably 30° to 50°.

The irradiation time is preferably 1 minute to 60 minutes, and more preferably 1 minute to 10 minutes.

In a case where patterning is required, a method of performing light irradiation using a photomask as many times as necessary for pattern formation, or a pattern writing method using laser beam scanning can be employed.

[Substrate]

The substrate used in the invention is not particularly limited as long as it is a substrate used as a substrate for producing a usual optical film or the like. Flexibility or peelability may be optionally imparted thereto. The above-described alignment film may be provided on the substrate, and the anisotropic light absorption layer according to the embodiment of the invention may be provided thereon such that the substrate may be disposed on a side of the alignment film opposite to the anisotropic light absorption film.

Examples thereof include a glass and a polymer film. The light transmittance of the substrate is preferably 80% or greater.

In a case where a polymer film is used as the substrate, an optically isotropic polymer film is preferably used. As specific examples and preferable aspects of the polymer, those described in a paragraph of JP2002-022942A can be applied. In addition, even a conventionally known polymer such as polycarbonate or polysulfone in which birefringence is likely to be developed can also be used by reducing the developability through the molecular modification described in WO2000/026705A.

EXAMPLES

Hereinafter, the invention will be described in detail based on examples. Materials, reagents, substance amounts and proportions thereof, operations and so on shown in the following examples can be properly varied so far as they do not deviate from the gist of the invention. Accordingly, the invention is not limited to the following examples.

Synthesis Example

<Polymer Liquid Crystal Compound P-1>

A polymer liquid crystal compound P-1 was synthesized according to the following Steps 1 to 3.

(Step 1)

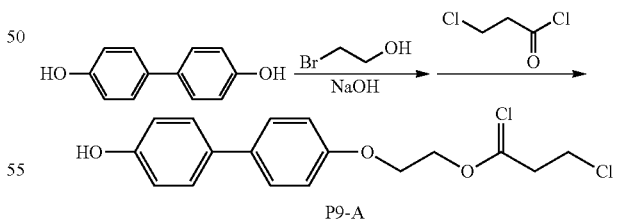

P9-A

Sodium hydroxide (34.2 g) was dissolved in 1 L of water, and 4,4'-dihydroxybiphenyl (40.6 g) and bromoethanol (37.2 g) were added under a nitrogen atmosphere. The mixture was stirred for 10 hours at 95° C.

Then, the reaction system was cooled to room temperature and adjusted to be acidic by adding a concentrated hydrochloric acid. After that, filtering and drying were performed to obtain a white solid containing a compound P9-A.

The obtained white solid was dissolved in 400 ml of dimethylacetamide (DMAc), and 3-chloropropionyl chloride (62.0 g) was added dropwise under ice cooling. Stirring was performed for 5 hours. The reaction was stopped by adding methanol (40 mL), and then water and ethyl acetate were added.

The solvent was removed from the organic layer washed by a liquid separating operation by a rotary evaporator, and chloroform was added to the obtained concentrate. After the precipitated solid was removed by filtering, the solvent was removed by a rotary evaporator, and purification was performed by column chromatography using ethyl acetate/chloroform to obtain 20.3 g of a compound P9-A (yield: 29%) as a white solid.

$^1$H-NMR (solvent: DMSO-$d_6$)δ (ppm): 2.80-2.90 (t, 2H), 3.75-3.85 (t, 2H), 4.15-4.25 (m, 2H), 4.35-4.45 (m, 2H), 6.75-6.85 (m, 2H), 6.90-7.00 (m, 2H), 7.30-7.50 (m, 4H), 9.40 (brs, 1H)
(Step 2)

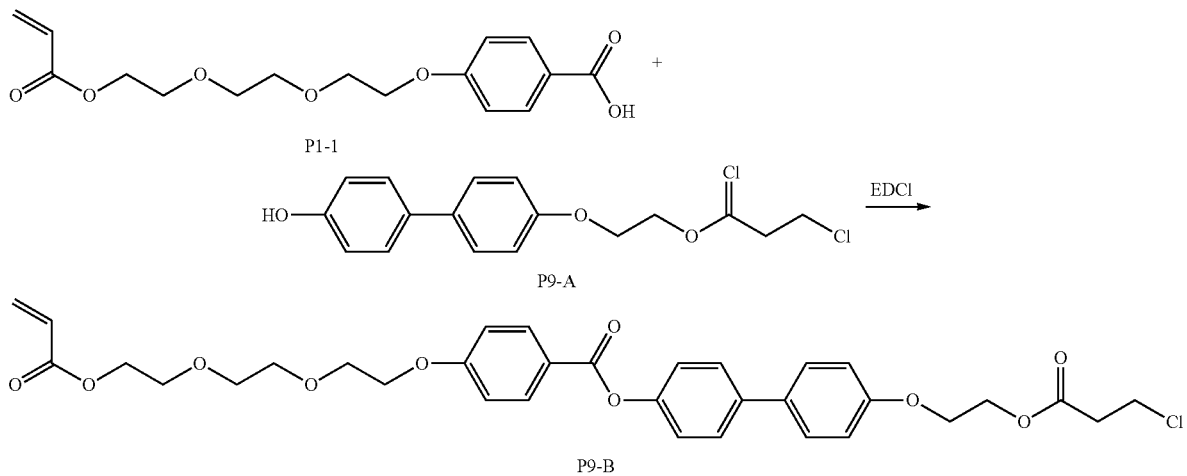

4.0 g of the compound P9-A, 8.08 g of the compound P1-1 prepared in Synthesis Example 1, and 100 mL of dichloromethane were mixed and stirred at room temperature. To the mixture, 152 mg of N,N-dimethylaminopyridine and 9.56 g of 1-(3-dimethylaminopropyl)-3-ethylcarbodiimide hydrochloride (EDCI) were added and stirred for 12 hours at room temperature.

Thereafter, the solvent was removed by a rotary evaporator, and filtering was performed by adding 120 mL of methanol and 120 mL of a 1 M hydrochloric acid solution to obtain a white solid. Liquid separation was performed by adding ethyl acetate and water to the obtained white solid, and the collected organic layer was washed with a 1 N hydrochloric acid solution and saturated saline. Then, drying was performed with anhydrous sodium sulfate. The sodium sulfate was filtered off to remove the solvent by a rotary evaporator, and purification by silica gel chromatography was performed to obtain 5.4 g of a compound P9-B (yield: 69%).

$^1$H-NMR (solvent: CDCl$_3$)δ (ppm): 2.87 (t, 2H), 3.68-3.82 (m, 8H), 3.90 (t, 2H), 4.18-4.28 (m, 4H), 4.28-4.38 (m, 2H), 4.46-4.54 (m, 2H), 5.84 (dd, 1H), 6.16 (dd, 1H), 6.43 (dd, 1H), 6.90-7.05 (m, 4H), 7.20-7.30 (m, 2H), 7.48-7.65 (m, 4H), 8.10-8.20 (m, 2H)
(Step 3)

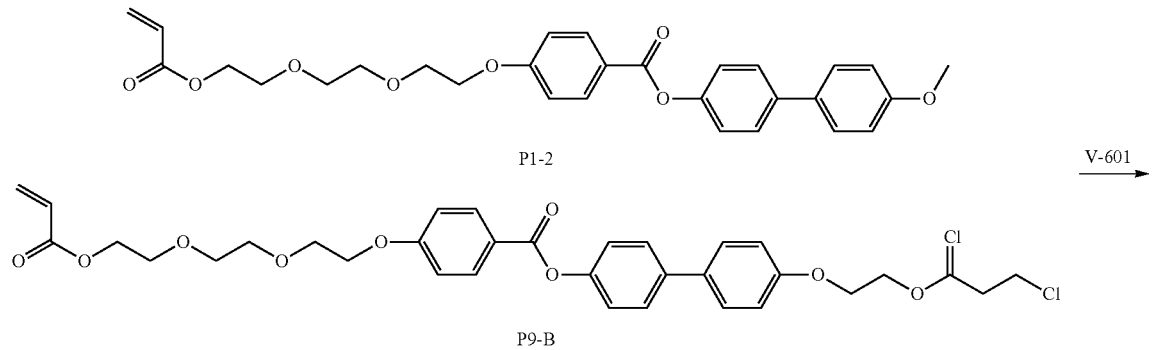

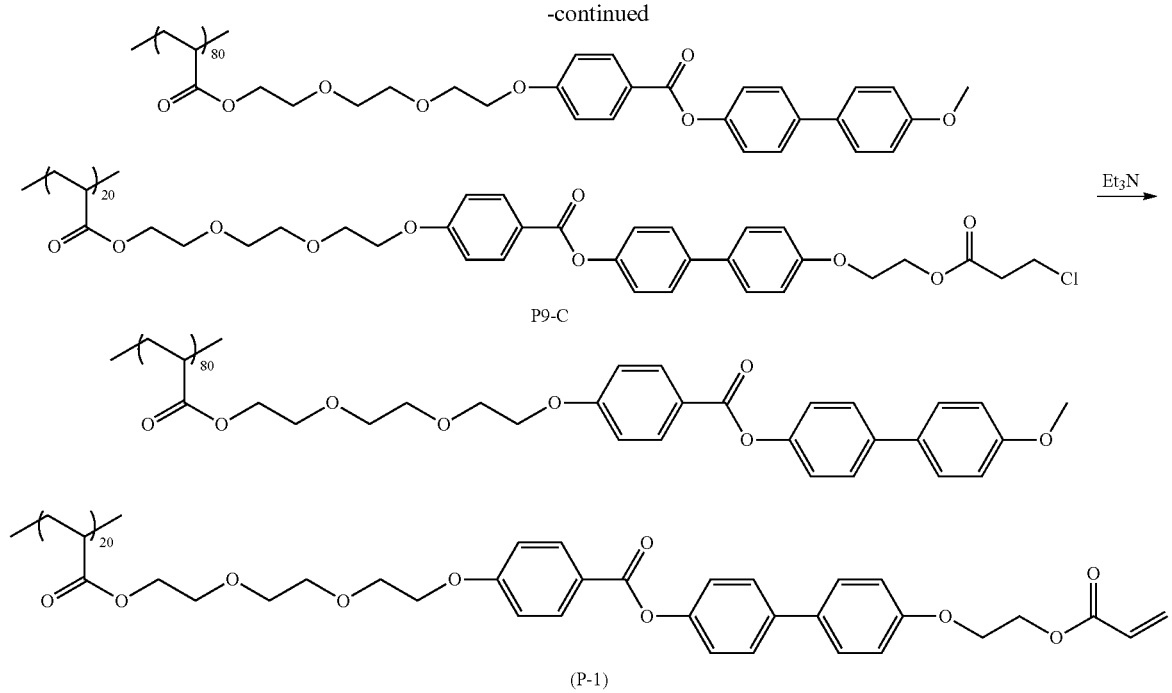

(P-1)

A DMAc solution (3.3 mL) of the compound P1-2 (0.8 g) and the compound P9-B (0.2 g) was heated to an internal temperature of 80° C. under a nitrogen stream. A DMAc solution (0.5 mL) of 2,2'-azobis(2-methylpropionic acid) dimethyl (0.054 mmol, 0.012 g) was added thereto, and stirring was performed for 2 hours at 80° C. Thereafter, disappearance of the polymerizable group was confirmed by ¹H-NMR spectrum measurement, and the solution was cooled to room temperature. Methanol was added for filtering, and the residues were washed with methanol to obtain 0.90 g of a compound P9-C as a white solid. Dibutylhydroxytoluene (BHT) (50 mg) and triethylamine (0.7 mL) were added to a chloroform solution (7 mL) of the obtained compound P9-C and heated to an internal temperature of 50° C. After stirring for 9 hours at 50° C., disappearance of the raw material was confirmed by ¹H-NMR spectrum measurement, and the solution was cooled to room temperature. Methanol was added thereto for filtering, and the residues were washed with methanol to obtain 0.8 g of a polymer liquid crystal compound P-1 as a white solid. In a case where the obtained polymer liquid crystal compound P-1 was analyzed by gel permeation chromatography (GPC), a weight-average molecular weight (Mw) was 17,000 (in terms of polystyrene).

<Polymer Liquid Crystal Compounds Other than P-1 and Polymerizable Liquid Crystal Compounds>

Polymer liquid crystal compounds other than P-1 and polymerizable liquid crystal compounds to be described later were synthesized using a method similar to the method of obtaining the polymer liquid crystal compound P-1 or a known method.

<Yellow Azo Dye Y-1>

First, 4-hydroxybutyl acrylate (20 g) and mesyl chloride (16.8 g, MsCl) were dissolved in ethyl acetate (90 mL), and then triethylamine (16.4 g, NEt₃) was added dropwise while cooling in an ice bath. After that, the mixture was stirred for 2 hours at room temperature, and then 1N HCl was added thereto and liquid separation was performed. The obtained organic layer was subjected to distilling-off under reduced pressure to obtain a compound X (30 g) having the following structure.

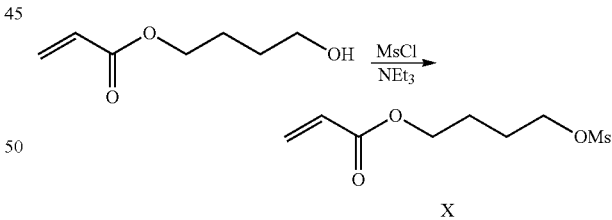

A yellow azo dye Y-1 was synthesized according to the following route.

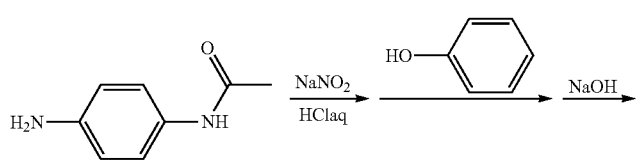

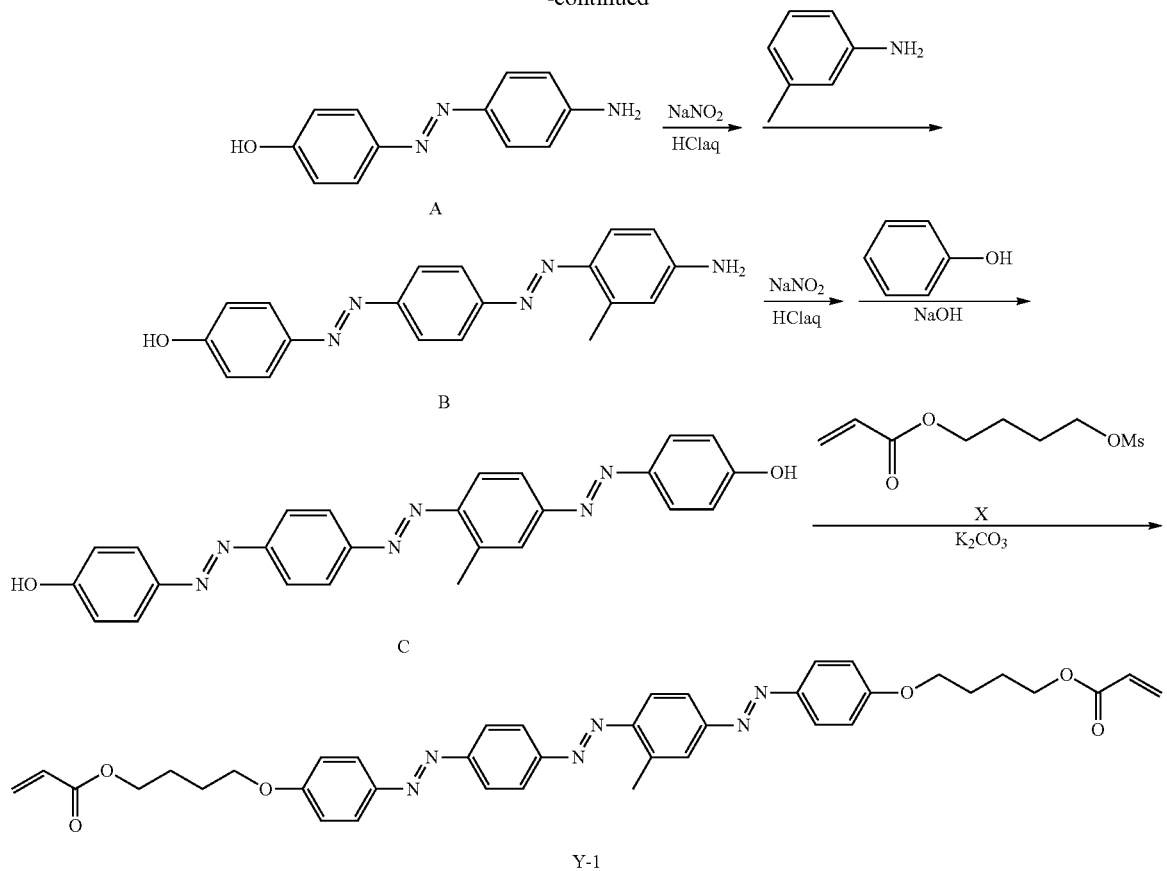

First, a compound A (10 g) was synthesized according to the literature (Chem. Eur. J. 2004. 10. 2011).

The compound A (10 g) was dissolved in water (300 mL) and a hydrochloric acid (17 mL), and the mixture was cooled in an ice bath. Sodium nitrite (3.3 g) was added thereto, and the mixture was stirred for 30 minutes. An amidosulfuric acid (0.5 g) was added, and then m-toluidine (5.1 g) was added and stirred for 1 hour at room temperature. The solid obtained by neutralization with a hydrochloric acid after the stirring was collected by suction filtration to obtain a compound B (3.2 g).

The compound B (1 g) was dissolved in a THF solution consisting of tetrahydrofuran (30 mL, THF), water (10 mL), and a hydrochloric acid (1.6 mL), and cooled in an ice bath, and sodium nitrite (0.3 g) was added thereto. The mixture was stirred for 30 minutes, and then an amidosulfuric acid (0.5 g) was added. Separately, phenol (0.4 g) was dissolved in potassium carbonate (2.76 g) and water (50 mL), and cooled in an ice bath. Then, the above THE solution was added dropwise thereto, and the mixture was stirred for 1 hour at room temperature. After the stirring, water (200 mL) was added, and a compound C (1.7 g) obtained was suction-filtered.

The compound C (0.6 g), a compound X (0.8 g), and potassium carbonate (0.95 g) were dissolved in DMAc (30 mL, dimethylacetamide) and stirred for 3.5 hours at 90° C. After the stirring, water (300 mL) was added, and a solid obtained was suction-filtered to obtain a yellow azo dye Y-1 (0.3 g).

<Yellow Azo Dye Other Than Y-1 and Cyan Azo Dyes>

Yellow azo dyes other than Y-1 and cyan azo dyes to be described later were synthesized using a method similar to the method of obtaining the yellow azo dye Y-1 or a known method.

Example 1

41.6 parts by mass of butoxyethanol, 41.6 parts by mass of dipropylene glycol monomethyl, and 15.8 parts by mass of pure water were added to 1 part by mass of a photo-alignment material E-1 having the following structure, and the obtained solution was filtered under pressure with a 0.45 μm membrane filter. The obtained photo-alignment film coating liquid was applied to a polyethylene terephthalate substrate, and dried for 1 minute at 60° C. The obtained coating film was irradiated with linearly polarized ultraviolet rays (illuminance: 4.5 mW, irradiation dose: 300 mJ/cm$^2$) using a polarized ultraviolet exposure device to produce an alignment film 1.

E-1

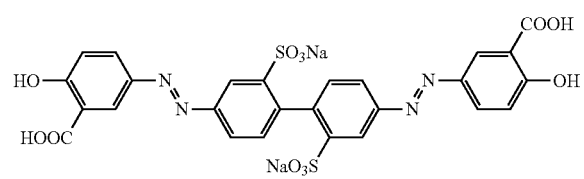

The following dichroic azo dye composition 1 was applied or spin-coated to the obtained alignment film 1 using a bar #15 to form a coating film 1.

The coating film 1 was heated for 90 seconds at 140° C., and cooled to room temperature. Next, the coating film 1 was heated for 60 seconds at 70° C., and cooled again to room temperature.

Then, the coating film was irradiated with light under an irradiation condition of an illuminance of 28 mW/cm² using a high-pressure mercury lamp for 60 seconds to produce an anisotropic light absorption film 1 on the alignment film 1. In this manner, a laminate 1 was produced. The alignment film 1 had a film thickness of 45 nm, and the anisotropic light absorption film 1 had a film thickness of 2 μm.

solvent, the compound of Formula (I), or the dichroic azo dye was changed as shown in the following Tables 1A and 1B in the dichroic azo dye composition 1 of Example 1. Laminates 2 to 12 of Examples 2 to 12 and laminates 13 to 17 of Comparative Examples 1 to 5 were produced in this manner.

Two kinds of compounds of Formula (I) were used for the compositions used for producing the anisotropic light absorption films of Examples 10 and 11 (the quantitative ratio in Tables 1A and 1B represents a mass ratio). Only the second dichroic azo dye was used as a dichroic azo dye in Comparative Example 5.

<Compound of Formula (I)>

| Composition of Dichroic Azo Dye Composition 1 | |
|---|---|
| Yellow Azo Dye Y-1 (first dichroic azo dye) | 7.1 parts by mass |
| Cyan Azo Dye C-1 (second dichroic azo dye) | 9.1 parts by mass |
| Polymer Liquid Crystal Compound P-1 (compound of Formula (I)) | 101.1 parts by mass |
| Polymerization Initiator IRGACURE 819 (manufactured by BASF SE) | 1.0 part by mass |
| Interface Improver F-1 | 0.3 parts by mass |
| Cyclopentanone | 617.0 parts by mass |
| Tetrahydrofuran (THF) | 264.4 parts by mass |

Yellow Azo Dye Y-1

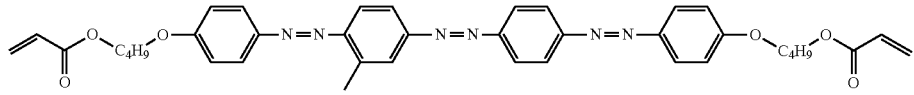

Cyan Azo Dye C-1

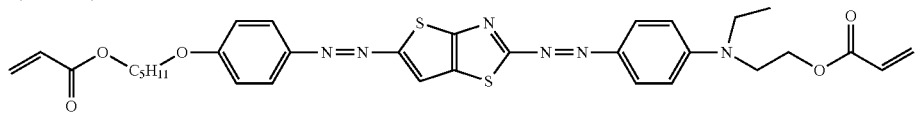

Polymer Liquid Crystal Compound P-1

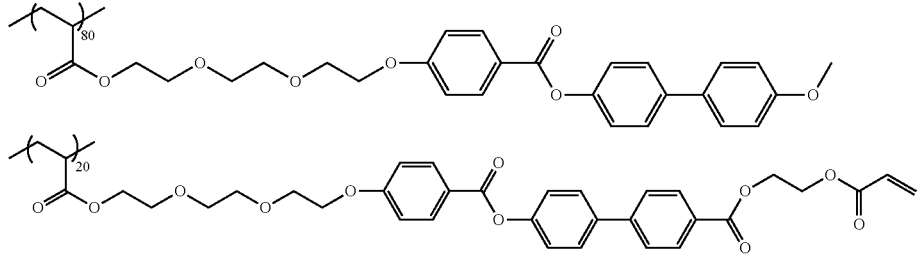

Interface Improver F-1

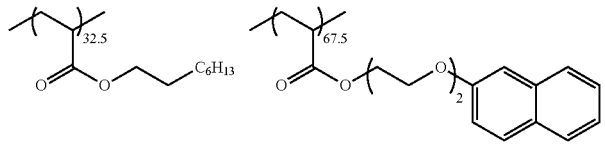

Examples 2 to 12 and Comparative Examples 1 to 5

An anisotropic light absorption film was produced on the alignment film 1 in the same manner as in Example 1, except that the kind or the concentration (solid content ratio) of the The compounds of Formula (I) in Tables 1A and 1B will be collectively shown below.

Each of the following P-1 to P-5 is a compound represented by Formula (I) or a polymer thereof described above, and therefore corresponds to the above-described "compound of Formula (I)".

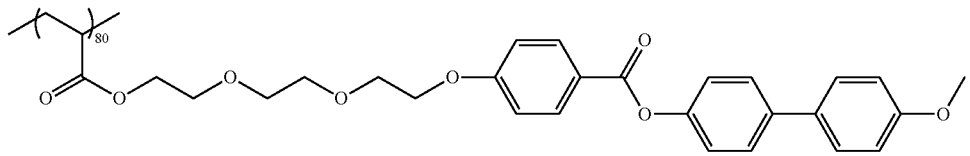

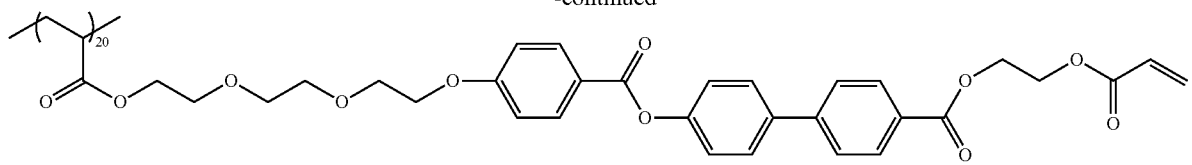

Polymer Liquid Crystal Compound P-1

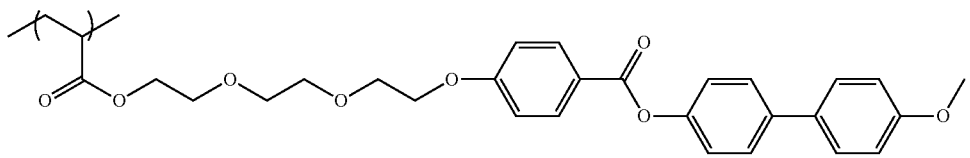

Polymer Liquid Crystal Compound P-2

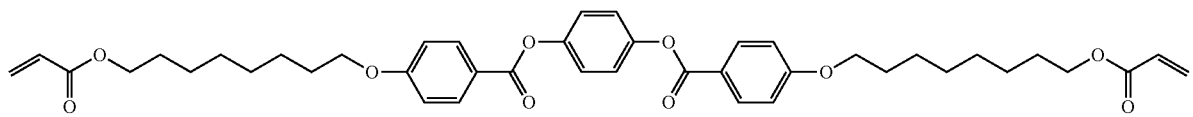 [SMILES: C=CC(=O)OCCCCCCCCOc1ccc(C(=O)Oc2ccc(OC(=O)c3ccc(OCCCCCCCCOC(=O)C=C)cc3)cc2)cc1]

Polymerizable Liquid Crystal Compound P-3

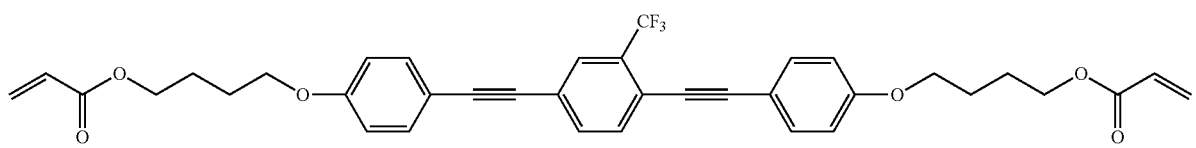 [SMILES: C=CC(=O)OCCCCOc1ccc(C#Cc2ccc(C#Cc3ccc(OCCCCOC(=O)C=C)cc3)c(C(F)(F)F)c2)cc1]

Polymerizable Liquid Crystal Compound P-4

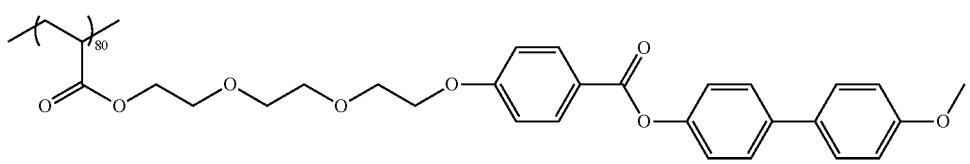

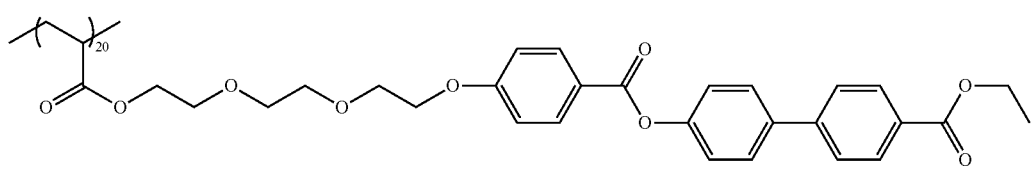

Polymer Liquid Crystal Compound P-5

<Dichroic Azo Dye>

The dichroic azo dyes in Tables 1A and 1B will be collectively shown below.

Each of the following yellow azo dyes Y-1 to Y-5 has a solution absorption maximum wavelength of 400 nm or greater and less than 550 nm as shown in the following Tables 1A and 1B, and corresponds to the above-described first dichroic azo dye. Each of the following cyan azo dyes C-1 to C-5 has a solution absorption maximum wavelength of 550 nm or greater and 750 nm or less as shown in the following Tables 1A and 1B, and corresponds to the above-described second dichroic azo dye.

51 52
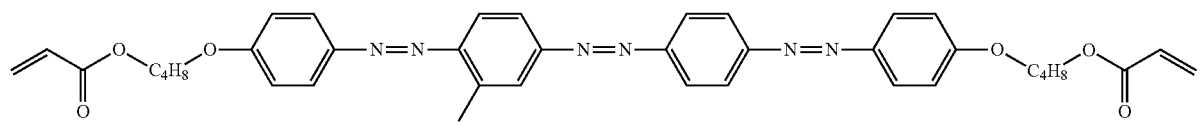
Yellow Azo Dye Y-1
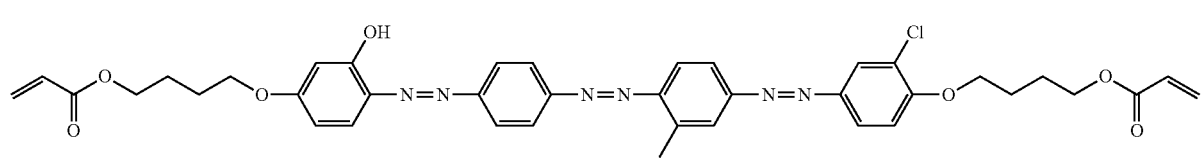 [SMILES: C=CC(=O)OCCCCOc1ccc(N=Nc2ccc(N=Nc3ccc(N=Nc4ccc(OCCCCOC(=O)C=C)c(Cl)c4)cc3C)cc2)c(O)c1]
Yellow Azo Dye Y-2
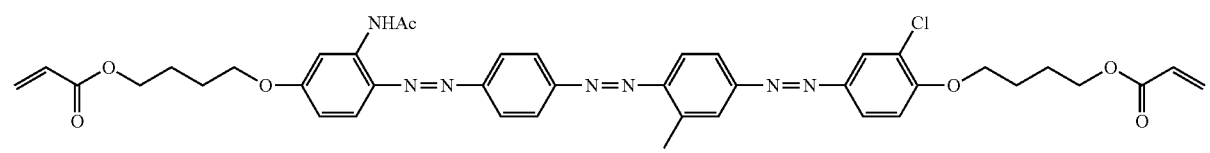 [SMILES: C=CC(=O)OCCCCOc1ccc(N=Nc2ccc(N=Nc3ccc(N=Nc4ccc(OCCCCOC(=O)C=C)c(Cl)c4)cc3C)cc2)c(NC(C)=O)c1]
Yellow Azo Dye Y-4
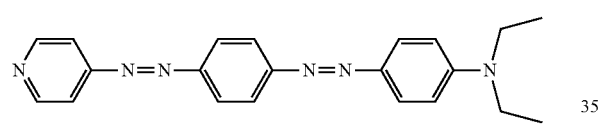
Yellow Azo Dye Y-5
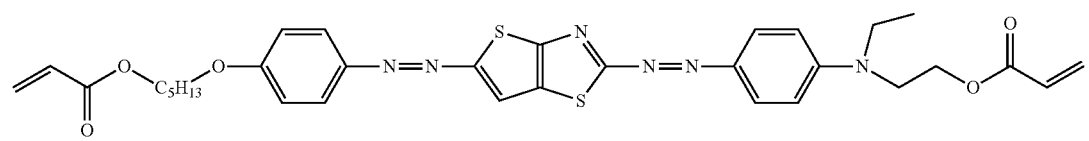
Cyan Azo Dye C-1
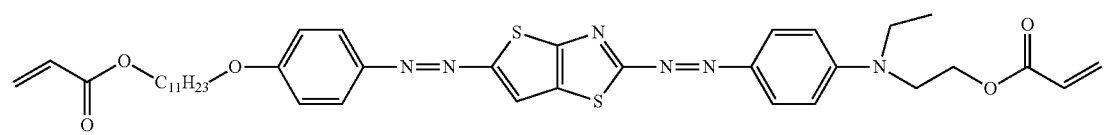
Cyan Azo Dye C-2
Cyan Azo Dye C-3
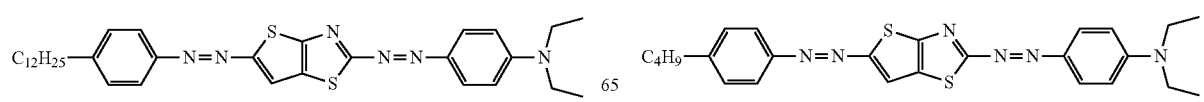

Cyan Azo Dye C-4

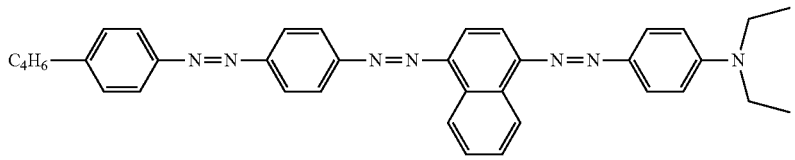

Cyan Azo Dye C-5

Example 13

<Production of Transparent Support 13>

An alignment film coating liquid having the following composition was continuously applied to a triacetyl cellulose (TAC) base (TG40, manufactured by FUJIFILM Corporation) having a thickness of 40 μm using a wire bar #8. Then, the coating liquid was dried for 2 minutes by hot air at 100° C., and thus a transparent support 13 in which a polyvinyl alcohol (PVA) alignment film having a thickness of 0.8 μm was formed on the TAC base was obtained.

A modified polyvinyl alcohol was added to the alignment film coating liquid such that the solid content ratio was 4 mass %.

| Composition of Alignment Film Coating Liquid The following Modified Polyvinyl Alcohol | |
|---|---|
| Water | 70 parts by mass |
| Methanol | 30 parts by mass |

Modified Polyvinyl Alcohol

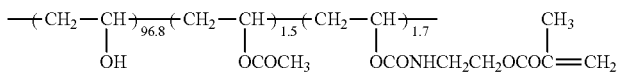

<Formation of Alignment Film 13>

41.6 parts by mass of butoxyethanol, 41.6 parts by mass of dipropylene glycol monomethyl, and 15.8 parts by mass of pure water were added to 1 part by mass of a photo-alignment material E-1 having the following structure, and the obtained solution was filtered under pressure with a 0.45 μm membrane filter to prepare an alignment film forming composition 13. The obtained alignment film forming composition 13 was applied to the PVA alignment film side of the transparent support 13, and dried for 1 minute at 60° C. After that, the obtained coating film was irradiated with linearly polarized ultraviolet rays (illuminance: 4.5 mW, irradiation dose: 500 mJ/cm$^2$) using a polarized ultraviolet exposure device to produce an alignment film 13.

<Formation of Anisotropic Light Absorption Film 13>

The following dichroic azo dye composition 13 was continuously applied to the obtained alignment film 13 using a wire bar #7 to form a coating film 13.

Next, the coating film 13 was heated for 90 seconds at 140° C., and cooled to room temperature (23° C.).

Next, the coating film 13 was heated for 60 seconds at 80° C., and cooled again to room temperature.

Then, the coating film was irradiated with light under an irradiation condition of an illuminance of 28 mW/cm$^2$ using a high-pressure mercury lamp for 60 seconds to produce an anisotropic light absorption film 13 on the alignment film 13.

E-1

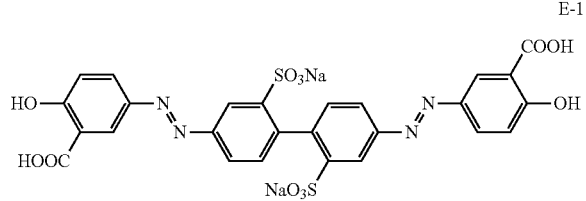

| Composition of Dichroic Azo Dye Composition 13 | |
|---|---|
| Following Polymer Liquid Crystal Compound P-7 (compound of Formula (I)) | 5.940 parts by mass |
| Following Dichroic Azo Dye Y-1 (first dichroic azo dye) | 0.416 parts by mass |
| Following Dichroic Azo Dye C-1 (second dichroic azo dye) | 0.535 parts by mass |
| Following Interface Improver F-1 | 0.059 parts by mass |
| Polymerization Initiator IRGACURE 819 (manufactured by BASF SE) | 0.050 parts by mass |

| Composition of Dichroic Azo Dye Composition 13 | |
|---|---|
| Cyclopentanone | 27.90 parts by mass |
| Tetrahydrofuran | 65.10 parts by mass |

<Formation of Transparent Resin Layer 1>

The following barrier layer forming composition 1 was continuously applied to the anisotropic light absorption film 13 using a wire bar #2, and dried for 90 seconds at 40° C.

Then, the resin composition was cured by irradiation with light under an irradiation condition of an illuminance of 30 mW/cm² using a high-pressure mercury lamp for 10 seconds, and thus a laminate in which a transparent resin layer 1 was formed on the anisotropic light absorption film 13 was produced. In this manner, a laminate of Example 13 was obtained. A cross-section of the transparent resin layer 1 was cut using a microtome cutting machine, and observed by a scanning electron microscope (SEM) to measure a film thickness. The film thickness was about 0.7 μm.

| Barrier Layer Forming Composition 1 | |
|---|---|
| Following CEL2021P (manufactured by Daicel Corporation) | 144 parts by mass |
| IRGACURE 819 (manufactured by BASF SE) | 3 parts by mass |
| CPI-100P (propylene carbonate solution) (manufactured by San-Apro Ltd. A) | 6 parts by mass |
| MEGAFAC RS-90 (manufactured by DIC Corporation) | 0.3 parts by mass |
| Methyl Ethyl Ketone (MEK) | 347 parts by mass |

CEL2021P

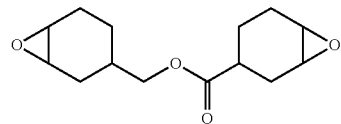 [SMILES: O=C(OCC1CCC2OC2C1)C1CCC2OC2C1]

Barrier Layer Forming Composition 1

Photocationic Polymerization Initiator (CPI-100P)

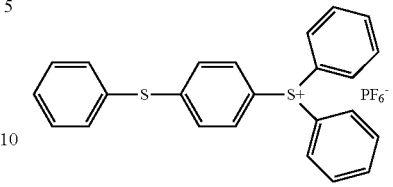

An anisotropic light absorption film was produced on the alignment film 13 in the same manner as in Example 13, except that the kind and the content (parts by mass) of the dichroic azo dye, the kind and the content (parts by mass) of the compound of Formula (I), the kind and the content (parts by mass) of the polymerization initiator, the kind and the content (parts by mass) of the interface improver, and the kind and the content (parts by mass) of the solvent were changed as shown in the following Tables 2A, 2B and 2C in the dichroic azo dye composition 13 of Example 13. In this manner, each laminate was obtained.

<Compound of Formula (I)>

Examples 14 to 21 and Comparative Examples 6 to 8

The compounds of Formula (I) in Tables 2A, 2B and 2C will be collectively shown below.

Each of the following P-1 and P-5 to P-7 is a compound represented by Formula (I) or a polymer thereof described above, and therefore corresponds to the above-described "compound of Formula (I)".

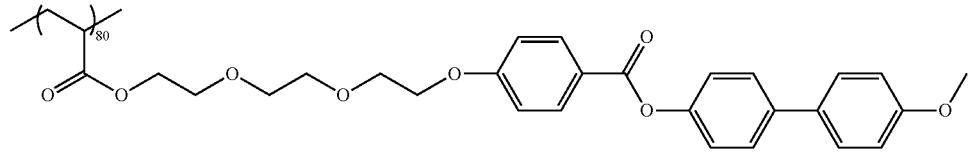

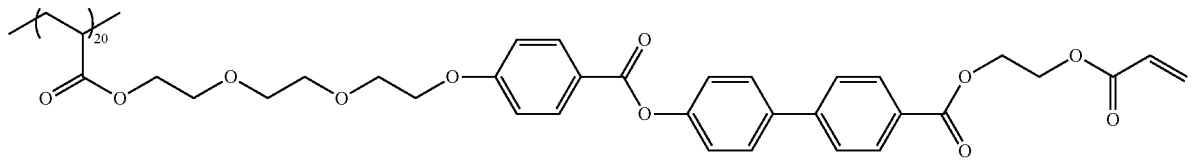

Polymer Liquid Crystal Compound P-1

P-5

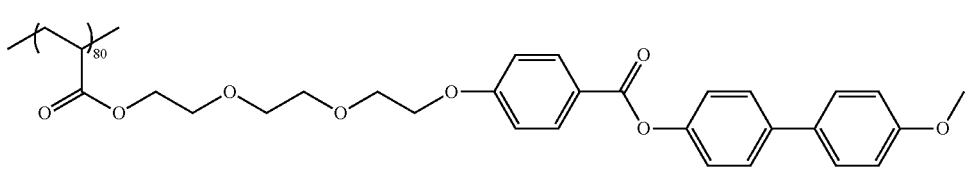

-continued

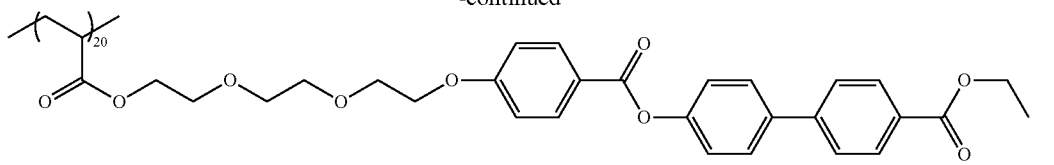

P-6

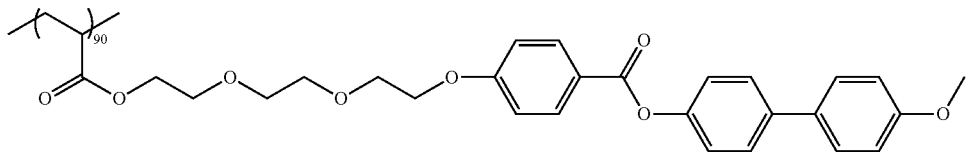

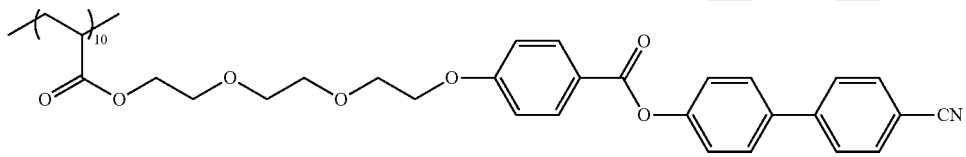

P-7

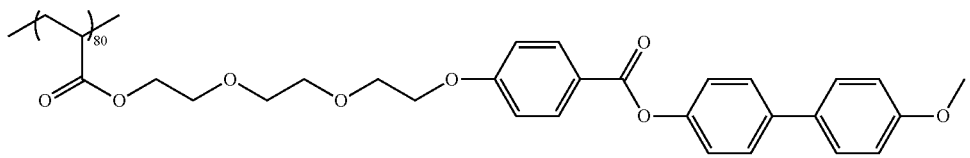

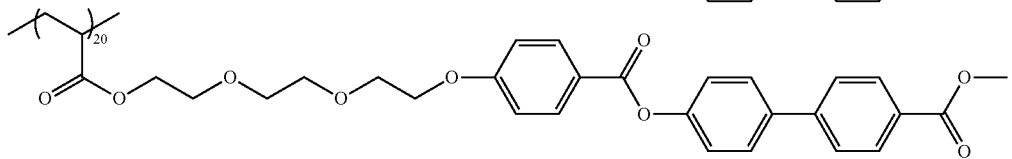

<Dichroic Azo Dye>

The dichroic azo dyes in Tables 2A, 2B and 2C will be collectively shown below. Each of the following Y-1 and Y-2 has a solution absorption maximum wavelength of 400 nm or greater and less than 550 nm as shown in the following Tables 2A, 2B and 2C, and corresponds to the above-described first dichroic azo dye. Each of the following C-1 to C-11 has a solution absorption maximum wavelength of 550 nm or greater and 750 nm or less as shown in the following Tables 2A, 2B and 2C, and corresponds to the above-described second dichroic azo dye.

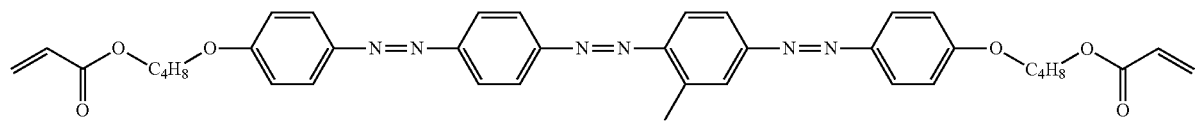

Y-1

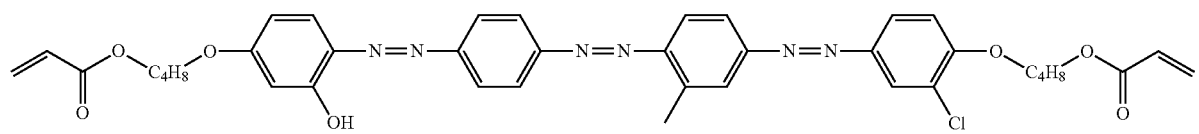

Y-2

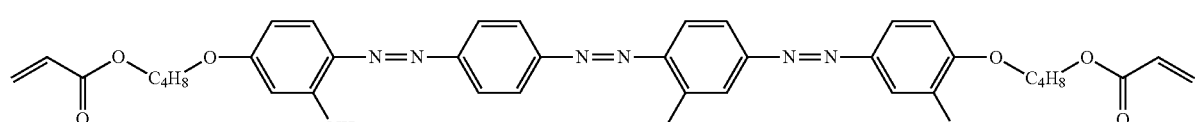

Y-4

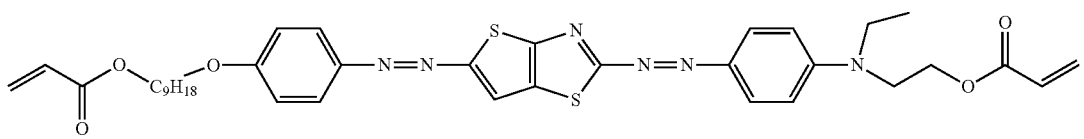

C-1

-continued
C-2
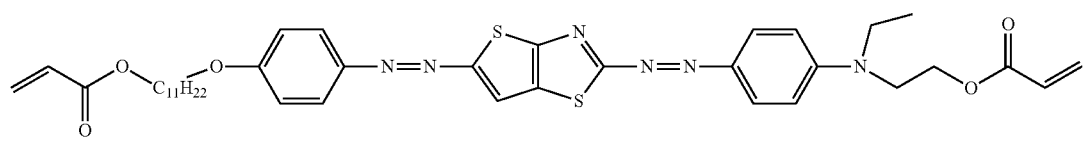
C-3
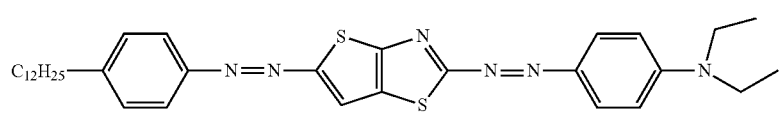
C-4
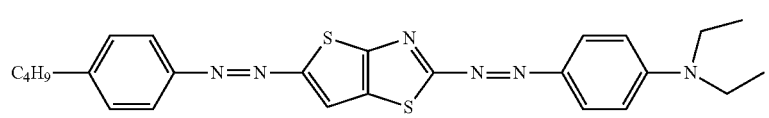
C-5
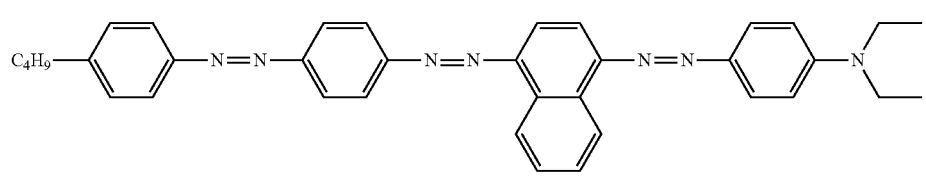
C-6
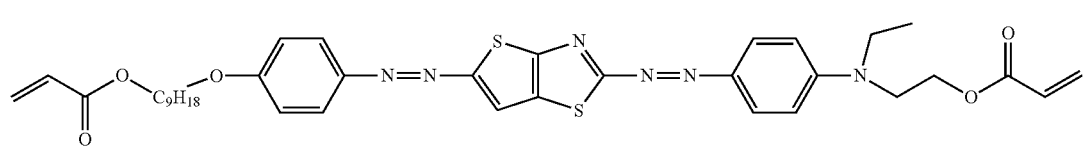
C-7
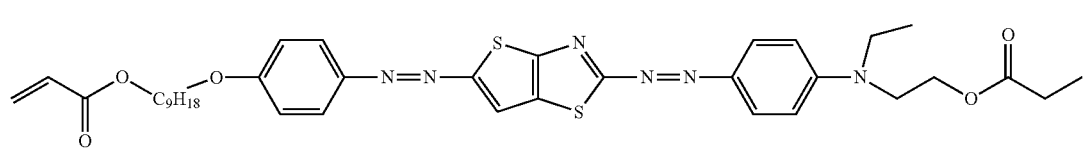
C-8
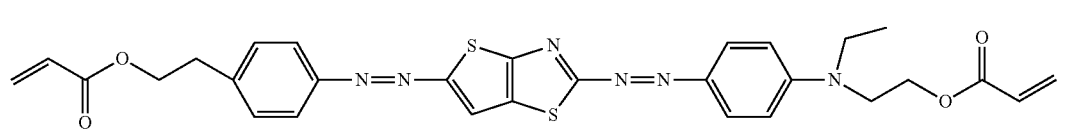
C-9
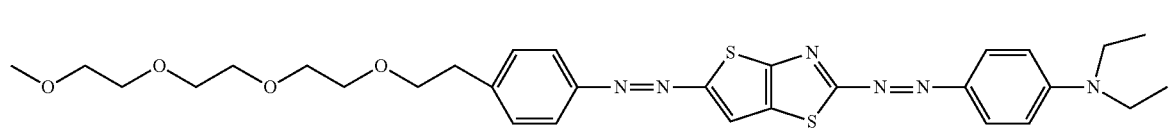
C-10
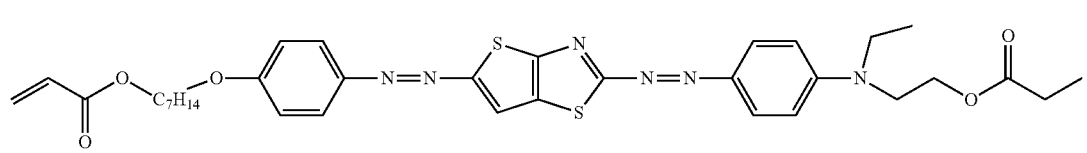
C-11
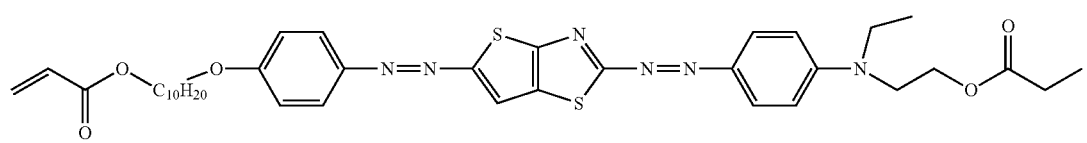

<Interface Improver>
The interface improver in Tables 2A, 2B and 2C will be shown below.

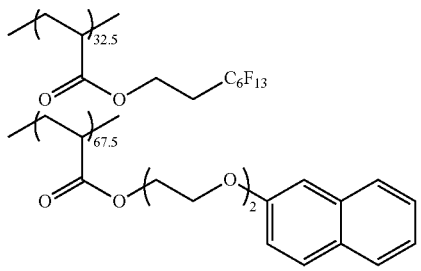

Interface Improver F-1
<Polymerization Initiator>
The polymerization initiators in Tables 2A, 2B and 2C will be collectively shown below.

Irgacure 819: IRGACURE 819 (manufactured by BASF SE)
Irgacure 820: IRGACURE 820 (manufactured by BASF SE)

[Evaluation]
<X-Ray Diffraction>
The obtained anisotropic light absorption films were subjected to X-ray diffraction (XRD) measurement as described above.

As a result, in each of the anisotropic light absorption films of Examples 1 to 21 and Comparative Example 5, the peak 2 was observed, and it was confirmed that the film had the arrangement structure of the second dichroic azo dye therein. In the anisotropic light absorption films of Comparative Examples 1 to 4 and Comparative Examples 6 to 8, a peak other than the peak observed in the XRD spectrum of the film 2 was not shown in the XRD spectrum of the film 1, and it was confirmed that the film did not have any of the arrangement structure of the first dichroic azo dye and the arrangement structure of the second dichroic azo dye.

Tables 2A, 2B and 2C show the azimuthal angles of the peaks 2 observed with regard to the anisotropic light absorption films of Examples 13 to 21 and the half-widths obtained by fitting the peaks observed by phi scan by the Gaussian function.

In a state in which a linear polarizer was inserted on the light source side of an optical microscope (manufactured by Nikon Corporation, product name "ECLIPSE E600 POL"), the laminate of each of the examples and the comparative examples was set on a sample table, and using a multi-channel spectrometer (manufactured by Ocean Optics, Inc., product name "QE65000"), an absorbance of the laminate was measured to calculate an alignment degree by the following formula. The results are shown in Tables 1A, 1B, 2A, 2B and 2C.
<AlignmentDegree>

AlignmentDegree: $S=[(Az0/Ay0)-1]/[(Az0/Ay0)+2]$

Az0: absorbance of laminate with respect to polarization in absorption axis direction
Ay0: absorbance of laminate with respect to polarization in transmission axis direction
<PolarizationDegree>
In a state in which a linear polarizer was inserted on the light source side of an optical microscope (manufactured by Nikon Corporation, product name "ECLIPSE E600 POL"), the laminate of each of the examples and the comparative examples was set on a sample table, and using a multi-channel spectrometer (manufactured by Ocean Optics, Inc., product name "QE65000"), a transmittance of the laminate was measured to calculate a polarization degree by the following formula. The results are shown in Tables 1A and 1B.

PolarizationDegree: $P=\sqrt{[(Ty0-Tz0)/(Ty0+Tz0)]}$

Tz0: transmittance of laminate with respect to polarization in absorption axis direction
Ty0: transmittance of laminate with respect to polarization in transmission axis direction
<Light Resistance Evaluation>
Xenon light was applied by a Super Xenon weather meter "SX-75" (manufactured by Suga Test Instruments Co., Ltd., 60° C.-50% RH conditions) at 150 W/m$_2$ (300 to 400 nm) for 300 hours from the side of the laminate produced as above opposite to the anisotropic light absorption film. After the elapse of a predetermined time, a change in the polarization degree of the laminate was measured. The results thereof are shown in Tables 1A, 1B, 2A, 2B and 2C. A or B is preferable, and A is more preferable for practical use.

A: The change in the polarization degree is less than 5%.
B: The change in the polarization degree is 5% or greater and less than 10%.
C: The change in the polarization degree is 10% or greater.

TABLE 1A

|  | Compound of Formula (I) | Polymerization Initiator | Interface Improver | Solvent | Dichroic Azo Dye | | | | |
|---|---|---|---|---|---|---|---|---|---|
|  |  |  |  |  | Kind | Concentration (mass %) | $\lambda$max (nm) Liquid | $\lambda$max (nm) Film | $\Delta\lambda$max (nm) |
| Example 1 | P-1 | IRGACURE 819 | F-1 | Cyclopentanone THF | Y-1 C-1 | 6.0% 7.7% | 413 577 | 420 630 | 7 53 |
| Example 2 | P-1 | IRGACURE 819 | F-1 | Cyclopentanone THF | Y-1 C-1 | 8.7% 11.2% | 413 577 | 420 630 | 7 53 |
| Example 3 | P-1 | IRGACURE 819 | F-1 | Cyclopentanone THF | Y-1 C-1 | 3.2% 4.1% | 413 577 | 420 602 | 7 25 |
| Example 4 | P-2 | IRGACURE 819 | F-1 | Cyclopentanone THF | Y-1 C-1 | 6.0% 7.7% | 413 577 | 420 630 | 7 53 |
| Example 5 | P-1 | IRGACURE 819 | F-1 | Chloroform | Y-1 C-2 | 6.0% 7.7% | 413 580 | 420 620 | 7 40 |
| Example 6 | P-1 | IRGACURE 819 | F-1 | Chloroform | Y-1 C-3 | 1.7% 2.1% | 413 601 | 420 540 | 7 61 |

TABLE 1A-continued

|  | Compound of Formula (I) | Polymerization Initiator | Interface Improver | Solvent | Dichroic Azo Dye Kind | Concentration (mass %) | λmax (nm) Liquid | λmax (nm) Film | Δλmax (nm) |
|---|---|---|---|---|---|---|---|---|---|
| Example 7 | P-1 | IRGACURE 819 | F-1 | Chloroform | Y-1 | 1.7% | 413 | 420 | 7 |
|  |  |  |  |  | C-4 | 2.1% | 600 | 612 | 12 |
| Example 8 | P-1 | IRGACURE 819 | F-1 | Cyclopentanone THF | Y-2 | 6.0% | 436 | 450 | 14 |
|  |  |  |  |  | C-1 | 7.7% | 577 | 630 | 53 |
| Example 9 | P-1 | IRGACURE 819 | F-1 | Chloroform | Y-4 | 6.0% | 433 | 450 | 17 |
|  |  |  |  |  | C-1 | 7.7% | 577 | 630 | 53 |
| Example 10 | P-1/P-3 (90/10) | IRGACURE 819 | F-1 | Cyclopentanone THF | Y-1 | 6.0% | 413 | 420 | 7 |
|  |  |  |  |  | C-1 | 7.7% | 577 | 655 | 78 |
| Example 11 | P-1/P-4 (90/10) | IRGACURE 819 | F-1 | Cyclopentanone THF | Y-1 | 6.0% | 413 | 420 | 7 |
|  |  |  |  |  | C-1 | 7.7% | 577 | 670 | 93 |
| Example 12 | P-5 | IRGACURE 819 | F-1 | Cyclopentanone THF | Y-1 | 2.6% | 413 | 420 | 7 |
|  |  |  |  |  | C-1 | 11.1% | 577 | 615 | 38 |
| Comparative Example 1 | P-1 | IRGACURE 819 | F-1 | Chloroform | Y-1 | 3.2% | 413 | 420 | 7 |
|  |  |  |  |  | C-5 | 4.1% | 568 | 568 | 0 |
| Comparative Example 2 | P-1 | IRGACURE 819 | F-1 | Chloroform | Y-5 | 3.2% | 520 | 520 | 0 |
|  |  |  |  |  | C-5 | 4.1% | 568 | 568 | 0 |
| Comparative Example 3 | P-1 | IRGACURE 819 | F-1 | Chloroform | Y-1 | 0.5% | 413 | 420 | 7 |
|  |  |  |  |  | C-1 | 0.5% | 577 | 577 | 0 |
| Comparative Example 4 | P-1 | IRGACURE 819 | F-1 | Chloroform | Y-1 | 11.9% | 413 | 420 | 7 |
|  |  |  |  |  | C-3 | 15.3% | 601 | 601 | 0 |
| Comparative Example 5 | P-1 | IRGACURE 819 | F-1 | Chloroform | — | — | — | — | — |
|  |  |  |  |  | C-1 | 6.0% | 577 | 617 | 40 |

TABLE 1B

|  | Log P (Formula (I)) | Log P (dye) | ΔLog P | Ld/Ll | Alignment Degree | Polarization Degree | Light Resistance |
|---|---|---|---|---|---|---|---|
| Example 1 | 4.6 | 9.4 | 4.8 | 3.63 | 0.95 | 99.9 | A |
|  |  | 10.4 | 5.9 | — |  |  |  |
| Example 2 | 4.6 | 9.4 | 4.8 | 3.63 | 0.94 | 99.8 | A |
|  |  | 10.4 | 5.9 | — |  |  |  |
| Example 3 | 4.6 | 9.4 | 4.8 | 3.63 | 0.92 | 99.8 | B |
|  |  | 10.4 | 5.9 | — |  |  |  |
| Example 4 | 4.6 | 9.4 | 4.8 | 3.63 | 0.95 | 99.9 | A |
|  |  | 10.4 | 5.9 | — |  |  |  |
| Example 5 | 4.6 | 9.4 | 4.8 | 3.63 | 0.95 | 99.9 | A |
|  |  | 11.1 | 6.5 | — |  |  |  |
| Example 6 | 4.6 | 9.4 | 4.8 | 3.63 | 0.95 | 99.9 | B |
|  |  | 12.6 | 8.1 | — |  |  |  |
| Example 7 | 4.6 | 9.4 | 4.8 | 3.63 | 0.89 | 99.6 | B |
|  |  | 9.2 | 4.6 | — |  |  |  |
| Example 8 | 4.6 | 8.1 | 3.5 | 3.70 | 0.93 | 99.8 | A |
|  |  | 10.4 | 5.9 | — |  |  |  |
| Example 9 | 4.6 | 5.7 | 1.2 | 2.57 | 0.74 | 97.2 | B |
|  |  | 10.4 | 5.9 | — |  |  |  |
| Example 10 | 4.6 | 9.4 | 4.8 | 3.63 | 0.96 | 99.9 | A |
|  |  | 10.4 | 5.9 | — |  |  |  |
| Example 11 | 4.6 | 9.4 | 4.8 | 3.63 | 0.96 | 99.9 | A |
|  |  | 10.4 | 5.9 | — |  |  |  |
| Example 12 | 4.6 | 9.4 | 4.8 | 3.63 | 0.95 | 79.7 | A |
|  |  | 10.4 | 5.9 | — |  |  |  |
| Comparative Example 1 | 4.6 | 9.4 | 4.8 | 3.63 | 0.85 | 99.2 | C |
|  |  | 12.2 | 7.6 | — |  |  |  |
| Comparative Example 2 | 4.6 | 5.9 | 1.3 | 3.02 | 0.83 | 99.1 | C |
|  |  | 12.2 | 7.6 | — |  |  |  |
| Comparative Example 3 | 4.6 | 9.4 | 4.8 | 3.63 | 0.80 | 98.2 | C |
|  |  | 10.4 | 5.9 | — |  |  |  |
| Comparative Example 4 | 4.6 | 9.4 | 4.8 | 3.63 | 0.82 | 98.7 | C |
|  |  | 12.6 | 8.1 | — |  |  |  |
| Comparative Example 5 | 4.6 | — | — | — | 0.83 | 99.1 | C |
|  |  | 10.4 | 5.9 | — |  |  |  |

In the column of "λmax" of Tables 1A and 1B, the solution absorption maximum wavelengths of the dichroic azo dyes are shown in the column of "Liquid", and the absorption maximum wavelengths of the anisotropic light absorption films are shown in the column of "Film". The fact that two values exist in the column of "Film" means that there are two absorption maximum wavelengths. The value on the upper side represents the absorption maximum wavelength on the low wavelength side, and the value on the lower side represents the absorption maximum wavelength on the long wavelength side.

In Tables 1A and 1B, the differences between the solution absorption maximum wavelengths of the dichroic azo dyes and the absorption maximum wavelengths of the anisotropic light absorption films closer thereto are shown in the column of "Δλmax".

In Tables 1A and 1B, the Log P values of the compounds of Formula (I) are shown in the column of "Log P (Formula (I))", the Log P values of the dichroic azo dyes are shown in the column of "Log P (dye)", and the differences between the Log P values of the compounds of Formula (I) and the Log P values of the dichroic azo dyes are shown in the column of "ΔLog P"

In Tables 1A and 1B, the values of Ld/Ll described above are shown in the column of "Ld/Ll".

TABLE 2A

| | Compound of Formula (I) | | | First Dichroic Azo Dye | | | | | Second Dichroic Azo Dye | | | | λmax (nm) | |
|---|---|---|---|---|---|---|---|---|---|---|---|---|---|---|
| | Kind | Parts by Mass | Log P | Kind | Parts by Mass | λmax | Log P | ΔLog P | Kind | Parts by Mass | Log P | ΔLog P | Liquid | Film |
| Example 13 | P-7 | 5.940 | 4.6 | Y-1 | 0.416 | 413 | 9.4 | 4.8 | C-1 | 0.535 | 10.4 | 5.8 | 577 | 615 |
| Example 14 | P-5 | 5.950 | 4.6 | Y-1 | 0.399 | 413 | 9.4 | 4.8 | C-2 | 0.541 | 11.1 | 6.5 | 578 | 618 |
| Example 15 | P-6 | 5.078 | 4.6 | Y-1 | 0.361 | 413 | 9.4 | 4.8 | C-11 | 0.467 | 10.6 | 6.0 | 578 | 620 |
| Example 16 | P-7 | 4.667 | 4.6 | Y-1 | 0.303 | 413 | 9.4 | 4.8 | C-6 | 0.443 | 10.6 | 6.0 | 578 | 615 |
| Example 17 | P-7 | 4.264 | 4.6 | Y-1 | 0.139 | 413 | 9.4 | 4.8 | C-7 | 0.514 | 10.8 | 6.2 | 577 | 617 |
| Example 18 | P-1 | 4.183 | 4.6 | Y-1 | 0.157 | 413 | 9.4 | 4.8 | C-2 | 0.575 | 11.1 | 6.5 | 578 | 623 |
| Example 19 | P-5 | 4.302 | 4.6 | Y-1 | 0.129 | 413 | 9.4 | 4.8 | C-1 | 0.560 | 10.4 | 5.8 | 577 | 617 |
| Example 20 | P-7 | 4.337 | 4.6 | Y-1 | 0.103 | 413 | 9.4 | 4.8 | C-6 | 0.475 | 10.6 | 6.0 | 578 | 618 |
| Example 21 | P-5 | 3.823 | 4.6 | Y-2 | 0.382 | 413 | 9.4 | 4.8 | C-10 | 0.717 | 9.5 | 4.9 | 578 | 608 |
| Comparative Example 6 | P-1 | 4.324 | 4.6 | Y-1 | 0.130 | 413 | 9.4 | 4.8 | C-8 | 0.476 | 7.5 | 2.9 | 601 | 600 |
| Comparative Example 7 | P-7 | 4.324 | 4.6 | Y-1 | 0.130 | 413 | 9.4 | 4.8 | C-9 | 0.476 | 6.1 | 1.5 | 592 | 594 |
| Comparative Example 8 | P-7 | 4.499 | 4.6 | Y-1 | 0.315 | 413 | 9.4 | 4.8 | C-1 | 0.112 | 10.4 | 5.8 | 577 | 578 |

TABLE 2B

| | Δλmax (nm) | DSC (° C.) | | | Total Dye Concentration | Interface Improver | | Polymerization Initiator | | Solvent | |
|---|---|---|---|---|---|---|---|---|---|---|---|
| | | T1 | T2 | Difference | | Kind | Parts by Mass | Kind | Parts byMass | THF Parts by Mass | Cyclopentanone Parts by Mass |
| Example 13 | 38 | 152 | 123 | 29 | 13.6% | F-1 | 0.059 | Irgacure 819 | 0.050 | 65.100 | 27.900 |
| Example 14 | 40 | 137 | 115 | 22 | 13.4% | F-1 | 0.059 | Irgacure 819 | 0.051 | 65.100 | 27.900 |
| Example 15 | 42 | 146 | 126 | 20 | 13.8% | F-1 | 0.051 | Irgacure 819 | 0.043 | 65.800 | 28.200 |
| Example 16 | 37 | 153 | 140 | 13 | 13.6% | F-1 | 0.047 | Irgacure 819 | 0.040 | 66.150 | 28.350 |
| Example 17 | 40 | 154 | 141 | 13 | 13.0% | F-1 | 0.040 | Irgacure 819 | 0.044 | 66.500 | 28.500 |
| Example 18 | 45 | 137 | 119 | 18 | 14.6% | F-1 | 0.041 | Irgacure 819 | 0.044 | 66.500 | 28.500 |
| Example 19 | 40 | 152 | 131 | 21 | 13.8% | F-1 | 0.005 | Irgacure 819 | 0.005 | 66.500 | 28.500 |
| Example 20 | 40 | 153 | 142 | 11 | 11.6% | F-1 | 0.040 | Irgacure 819 | 0.044 | 66.500 | 28.500 |
| Example 21 | 30 | 160 | 122 | 38 | 22.0% | F-1 | 0.037 | Irgacure 820 | 0.041 | 66.500 | 28.500 |
| Comparative Example 6 | 1 | 181 | 138 | 43 | 12.1% | F-1 | 0.034 | Irgacure 819 | 0.037 | 66.500 | 28.500 |
| Comparative Example 7 | 2 | 153 | 113 | 40 | 12.1% | F-1 | 0.034 | Irgacure 819 | 0.037 | 66.500 | 28.500 |
| Comparative Example 8 | 1 | 153 | Hard to detect | — | 8.5% | F-1 | 0.035 | Irgacure 819 | 0.038 | 66.500 | 28.500 |

TABLE 2C

| | XRD | | | |
|---|---|---|---|---|
| | Azimuthal Angle (°) | Half-Width (°) | Alignment Degree | Light Resistance |
| Example 13 | 30 | 8.3 | 0.955 | A |
| Example 14 | 30 | 8.4 | 0.950 | A |
| Example 15 | 25 | 6.0 | 0.961 | A |
| Example 16 | 10 | 4.9 | 0.965 | A |
| Example 17 | 10 | 4.9 | 0.967 | A |
| Example 18 | 25 | 5.6 | 0.962 | A |
| Example 19 | 30 | 6.7 | 0.954 | A |
| Example 20 | 10 | 5.0 | 0.964 | A |
| Example 21 | 30 | 10.0 | 0.941 | B |
| Comparative Example 6 | There is no peak | There is no peak | 0.899 | C |
| Comparative Example 7 | There is no peak | There is no peak | 0.903 | C |
| Comparative Example 8 | There is no peak | There is no peak | 0.909 | C |

In the column of "λmax" of Tables 2A, 2B and 2C, the solution absorption maximum wavelengths of the second dichroic azo dyes are shown in the column of "Liquid", and the absorption maximum wavelengths of the anisotropic light absorption films (the absorption maximum wavelengths closer to the solution absorption maximum wavelengths of the second dichroic azo dyes) are shown in the column of "Film".

In the column of "DSC" of Tables 2A, 2B and 2C, the melting points (T1) described above are shown in the column of "T1", the transition temperatures (T2) described above are shown in the column of "T2", and the differences between the melting points (T1) and the transition temperatures (T2) are shown in the column of "Difference".

In Tables 2A, 2B and 2C, the total concentrations (solid content ratio) of the first dichroic azo dye and the second dichroic azo dye are shown in the column of "total dye concentration".

As can be seen from Tables 1A, 1B, 2A, 2B and 2C, Examples 1 to 21 in which the film had the arrangement structure of the first dichroic azo dye or the arrangement structure of the second dichroic azo dye therein exhibited a high alignment degree and high light resistance.

In contrast, Comparative Examples 1 to 4 and Comparative Examples 6 to 8 in which the film had neither the arrangement structure of the first dichroic azo dye nor the arrangement structure of the second dichroic azo dye therein, and Comparative Example 5 using only the second dichroic azo dye as a dichroic azo dye had insufficient light resistance.

As shown in Tables 1A, 1B, 2A, 2B and 2C, it was found that in a case where a dichroic azo dye composition is used in which the difference between the solution absorption maximum wavelength of at least one of the first or second dichroic azo dye and the absorption maximum wavelength of the anisotropic light absorption film closer thereto is 10 nm to 100 nm, an anisotropic light absorption film having a high alignment degree and high light resistance is obtained (examples).

Examples 1 and 2 in which the solid content ratio of the first dichroic azo dye and the solid content ratio of the second dichroic azo dye in the composition were each 5.0 mass % or greater exhibited a higher alignment degree and higher light resistance as found from the comparison among Examples 1 to 3 (the comparison among the aspects in which only the polymer liquid crystal compound P1 was used as a compound of Formula (I), the yellow azo dye Y-1 as a first dichroic azo dye, and the cyan azo dye C-1 was used as a second dichroic azo dye).

Examples 1, 4, 5, 8, 10, and 11 in which Ld/Ll of the first dichroic azo dye satisfied Formula (A) exhibited a higher alignment degree, a higher polarization degree, and higher light resistance as found from the comparison among Examples 1, 4, 5, and 8 to 11 (the comparison among the aspects in which the solid content ratio of the first dichroic azo dye was 6.0 mass %, and the solid content ratio of the second dichroic azo dye was 7.7 mass %). Among these, Examples 10 and 11 in which the compound represented by Formula (I) and the polymer of the compound represented by Formula (I) were used in combination as a compound of Formula (I) exhibited a higher alignment degree.

Examples 13 to 20 in which the difference between the melting point (T1) and the transition temperature (T2) was 30° C. or less exhibited a higher alignment degree and higher light resistance as found from the comparison among Examples 13 to 21. Among these, Examples 15 to 18 and 20 in which the difference was 20° C. or less exhibited a higher alignment degree. Among these, Examples 16 to 18 and 20 in which the difference was 18° C. or less exhibited a higher alignment degree. Among these, Examples 16, 17, and 20 in which the difference was 15° C. or less exhibited a higher alignment degree.

Examples 13 to 21 in which the half-width of the peak derived from the arrangement structure of the dichroic azo dye in the XRD spectrum of the anisotropic light absorption film was less than 10.0° exhibited a higher alignment degree and higher light resistance as found from the comparison among Examples 13 to 20. Among these, Examples 13 and 15 to 20 in which the half-width was less than 8.4° exhibited a higher alignment degree. Among these, Examples 15 to 18 and 20 in which the half-width was 6.0° or less exhibited a higher alignment degree. Among these, Examples 16 to 18 and 20 in which the half-width was less than 6.0° exhibited a higher alignment degree. Among these, Examples 16, 17, and 20 in which the half-width was 5.5° or less exhibited a higher alignment degree. Among these, Examples 16 and 17 in which the half-width was less than 5.0° exhibited a higher alignment degree.

Example A

An anisotropic light absorption film was produced on the alignment film 2 in the same manner as in Example 1, except that the alignment film was changed to the following alignment film 2. In this manner, a laminate of Example A was produced.

<Production of Alignment Film>

98 parts by mass of N-methylpyrrolidone was added to 2 parts by mass of SE-130 (manufactured by Nissan Chemical Corporation), and the obtained solution was filtered under pressure with a 0.45 μm membrane filter to obtain an alignment film coating liquid.

The alignment film coating liquid was applied to a polyimide substrate using a bar #4. The applied alignment film coating liquid was dried for 15 minutes at 80° C., and then heated for 1 hour at 250° C. to form a coating film.

The obtained coating film was subjected to a rubbing treatment (rotation speed of roller: 1,000 rotations/2.6 mm of spacer thickness, stage speed: 1.8 m/min) once to produce an alignment film 2 on the polyimide substrate.

Example A was evaluated in the same manner as in Example 1, and almost the same results as in Example 1 were obtained.

Example B

<Synthesis of Polymer CQ-1>

A reaction container comprising a stirrer, a thermometer, a dropping funnel, and a reflux cooling pipe was charged with 100.0 parts by mass of 2-(3,4-epoxycyclohexyl)ethyl-trimethoxysilane, 500 parts by mass of methyl isobutyl ketone, and 10.0 parts by mass of triethylamine, and the mixture was stirred at room temperature. Next, 100 parts by mass of deionized water was added dropwise to the obtained mixture from the dropping funnel for 30 minutes. Then, a reaction was caused for 6 hours at 80° C. during mixing of the mixture under reflux. After the reaction was terminated, the organic phase was taken out and washed with a 0.2 mass % aqueous ammonium nitrate solution until the water after washing became neutral. Thereafter, from the obtained organic phase, the solvent and the water were distilled off under reduced pressure to obtain an epoxy group-containing polyorganosiloxane as a viscous transparent liquid.

$^1$H-NMR (Nuclear Magnetic Resonance) analysis was performed on the epoxy group-containing polyorganosiloxane, and it was confirmed that a peak based on an oxiranyl group was obtained in accordance with a theoretical intensity in the vicinity of a chemical shift (δ)=3.2 ppm, and a side reaction of the epoxy group did not occur during the reaction. A weight-average molecular weight Mw of the epoxy group-containing polyorganosiloxane was 2,200, and the epoxy equivalent was 186 g/mol.

Next, 100 mL of a three-neck flask was charged with 10.1 parts by mass of the epoxy group-containing polyorganosiloxane obtained as described above, 0.5 parts by mass of an acrylic group-containing carboxylic acid (TOAGOSEI CO., LTD., trade name "ARONIX M-5300", ω-carboxy polycaprolactone acrylate (polymerization degree n=2)), 20 parts by mass of butyl acetate, 1.5 parts by mass of a cinnamic acid derivative obtained by the method of Synthesis Example 1 in JP2015-026050A, and 0.3 parts by mass of tetrabutylammonium bromide, and the obtained mixture was stirred for 12 hours at 90° C. After the stirring, the obtained mixture was diluted with the same amount (mass) of butyl acetate, and the diluted mixture was water-washed 3 times. Concentration of the obtained mixture and dilution with butyl acetate were repeated 2 times, and finally, a solution containing a polyorganosiloxane (the following polymer CQ-1) having a photo-aligned group was obtained. A weight-average molecular weight Mw of the polymer CQ-1 was 9,000. In addition, as a result of $^1$H-NMR analysis, a component having a cinnamate group in the polymer CQ-1 was 23.7 mass %.

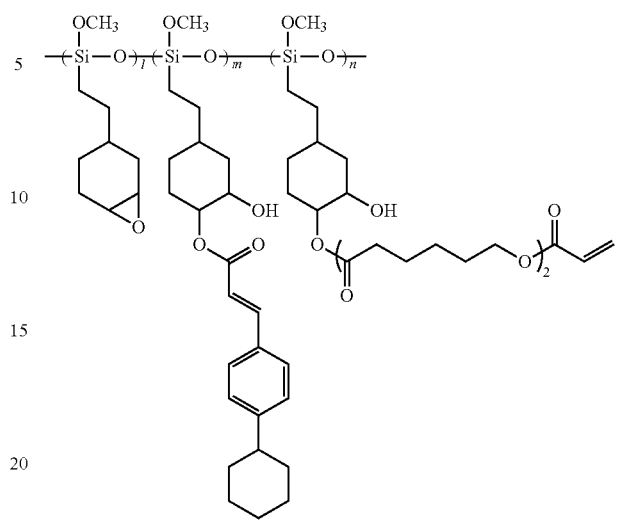

Polymer CQ-1

<Preparation of Photo-Alignment Film Forming Composition 2Q>

The following components were mixed to prepare a photo-alignment film forming composition 2Q.

| | |
|---|---|
| Above Polymer CQ-1 | 10.67 parts by mass |
| Following Low-Molecular-Weight Compound B-1 | 5.17 parts by mass |
| Following Additive PQ-1 (TA-60B, manufactured by San-Apro Ltd.) | 0.53 parts by mass |
| Butyl Acetate | 8287.37 parts by mass |
| Propylene Glycol Monomethyl Ether Acetate | 2071.85 parts by mass |

Low-Molecular-Weight Compound B-1

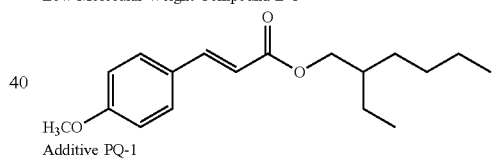

Additive PQ-1

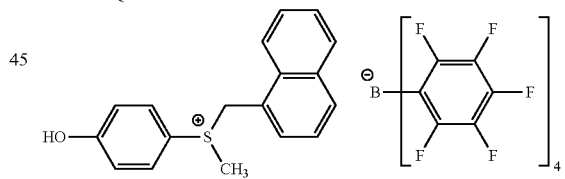

<Preparation of Optically Anisotropic Layer Coating Liquid>

An optically anisotropic layer coating liquid having the following composition was prepared.

| Optically Anisotropic Layer Coating Liquid | |
|---|---|
| Following Liquid Crystalline Compound L-3 | 42.00 parts by mass |
| Following Liquid Crystalline Compound L-4 | 42.00 parts by mass |
| Following Polymerizable Compound A-1 | 16.00 parts by mass |
| Following Low-Molecular-Weight Compound B-1 | 6.00 parts by mass |
| Following Polymerization Initiator S-1 (oxime type) | 0.50 parts by mass |
| Following Leveling Agent G-1 | 0.20 parts by mass |
| HISOLVE MTEM (manufactured by TOHO Chemical Industry Co., Ltd.) | 2.00 parts by mass |

-continued

| Optically Anisotropic Layer Coating Liquid | |
|---|---|
| NK ESTER A-200 (manufactured by Shin-Nakamura Chemical Co., Ltd.) | 1.00 part by mass |
| Methyl Ethyl Ketone | 424.8 parts by mass |

The group adjacent to the acryloyloxy group of the following liquid crystalline compounds L-3 and L-4 represents a propylene group (s group in which a methyl group is substituted by an ethylene group), and each of the following liquid crystalline compounds L-3 and L-4 represents a mixture of position isomers with different methyl group positions.

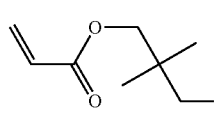
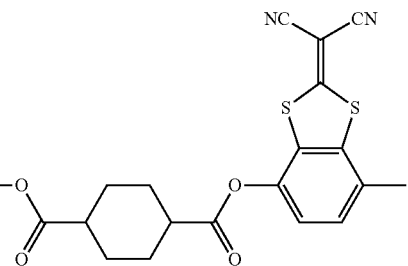

L-3

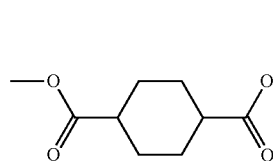
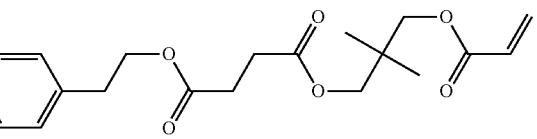

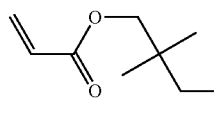
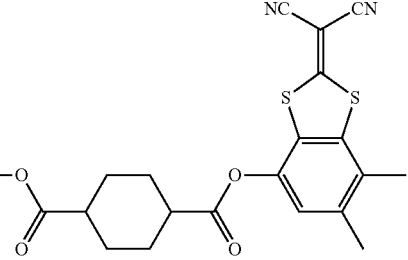

L-4

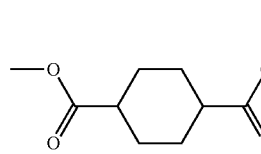
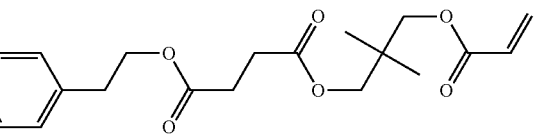

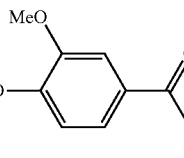
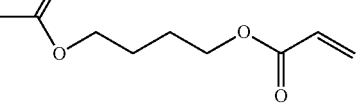

A-1

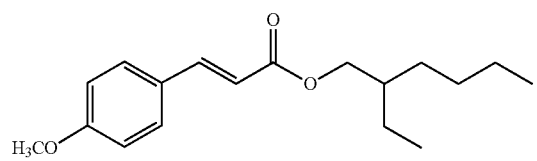 [SMILES: CCCCC(CC)COC(=O)/C=C/c1ccc(OC)cc1]

B-1

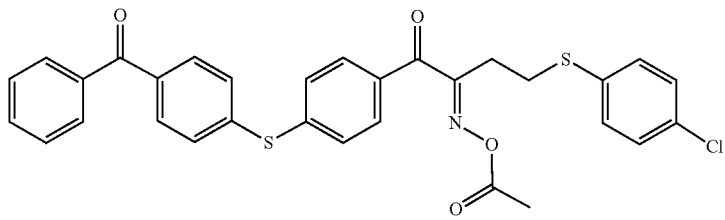

S-1

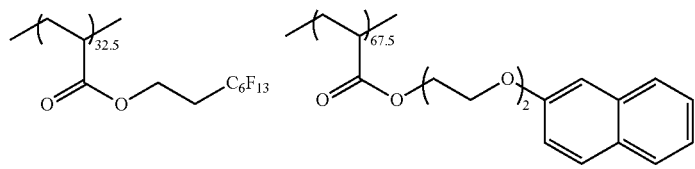

G-1

<Production of Cellulose Acylate Film 1>
(Production of Core Layer Cellulose Acylate Dope)

The following composition was put into a mixing tank and stirred to dissolve components, and a cellulose acetate solution to be used as a core layer cellulose acylate dope was prepared.

| Core Layer Cellulose Acylate Dope | |
|---|---|
| Cellulose Acetate Having Acetyl Substitution Degree of 2.88 | 100 parts by mass |
| Polyester Compound B Described in Examples of JP2015-227955A | 12 parts by mass |
| Following Compound F | 2 parts by mass |
| Methylene Chloride (first solvent) | 430 parts by mass |
| Methanol (second solvent) | 64 parts by mass |

Compound F

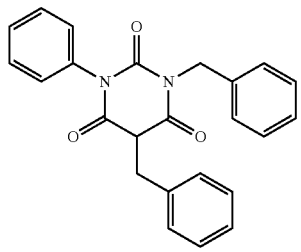 [SMILES: O=C1C(Cc2ccccc2)C(=O)N(c2ccccc2)C(=O)N1Cc1ccccc1]

(Production of Outer Layer Cellulose Acylate Dope)

10 parts by mass of the following matting agent solution was added to 90 parts by mass of the above-described core layer cellulose acylate dope to prepare a cellulose acetate solution to be used as an outer layer cellulose acylate dope.

| Matting Agent Solution | |
|---|---|
| Silica Particles Having Average Particle Size of 20 nm (AEROSIL R972, manufactured by NIPPON AEROSIL CO., LTD.) | 2 parts by mass |
| Methylene Chloride (first solvent) | 76 parts by mass |
| Methanol (second solvent) | 11 parts by mass |
| Above Core Layer Cellulose Acylate Dope | 1 part by mass |

(Production of Cellulose Acylate Film 1)

The core layer cellulose acylate dope and the outer layer cellulose acylate dope were filtered with filter paper having an average pore size of 34 μm and a sintered metallic filter having an average pore size of 10 μm, and then the three layers of the core layer cellulose acylate dope and the outer layer cellulose acylate dopes on both sides of the core layer cellulose acylate dope were simultaneously cast on a drum at 20° C. from an outlet (band casting machine). Next, the film was peeled off in a state in which the solvent content was about 20 mass %, and both ends in a width direction of the film were fixed by a tenter clip. The film was dried while being stretched in a transverse direction at a stretching ratio of 1.1. Then, the film was further dried by being transported between rolls of a heat treatment device, and a cellulose acylate film having a thickness of 40 μm was produced. The cellulose acylate film was used as a cellulose acylate film 1. The in-plane retardation of the obtained cellulose acylate film 1 was 0 nm.

<Production of λ/4 Retardation Film 1>

A photo-alignment film composition 2Q prepared previously was applied to one side of the produced cellulose acylate film 1 by a bar coater.

After the application, the solvent was removed by drying for 1 minute on a hot plate at 120° C., and a photoisomerization composition layer having a thickness of 0.3 μm was formed.

The obtained photoisomerization composition layer was irradiated with polarized ultraviolet rays (10 mJ/cm$^2$, using an ultra-high-pressure mercury lamp), and thus a photo-alignment film was formed.

Next, an optically anisotropic layer coating liquid prepared previously was applied to the photo-alignment film by a bar coater, and a composition layer was formed.

The obtained composition layer was heated to 110° C. once on a hot plate, and then cooled to 60° C. to stabilize the alignment.

Thereafter, the temperature was maintained to 60° C., and the alignment was fixed by ultraviolet irradiation (500 mJ/cm$^2$, using an ultra-high-pressure mercury lamp) under a nitrogen atmosphere (oxygen concentration: 100 ppm) to form an optically anisotropic layer having a thickness of 2.3 μm, and a λ/4 retardation film 1 was produced. The in-plane retardation of the obtained λ/4 retardation film 1 was 140 nm.

<Production of Positive C-Plate Film 2>

A commercially available triacetyl cellulose film "Z-TAC" (manufactured by FUJIFILM Corporation) was used as a temporary support (this is referred to as a cellulose acylate film 2).

A surface temperature of the cellulose acylate film 2 was increased to 40° C. by passing the film through a dielectric heating roll at a temperature of 60° C., and then an alkaline solution having the following composition was applied to one side of the film at a coating rate of 14 ml/m² using a bar coater, heated to 110° C., and transported for 10 seconds under a steam-type far-infrared heater manufactured by NORITAKE CO., LIMITED.

Next, pure water was applied using the same bar coater at 3 ml/m².

Next, water washing by a fountain coater and draining by an air knife were repeated three times, and then the film was transported to a drying zone at 70° C. for 10 seconds and dried to produce an alkali-saponified cellulose acylate film 2.

| Composition of Alkaline Solution (parts by mass) | |
| --- | --- |
| Potassium Hydroxide | 4.7 parts by mass |
| Water | 15.8 parts by mass |
| Isopropanol | 63.7 parts by mass |
| Fluorine-Containing Surfactant SF-1 ($C_{14}H_{29}O(CH_2CH_2O)_{20}H$) | 1.0 part by mass |
| Propylene Glycol | 14.8 parts by mass |

The above-described alkali-saponified cellulose acylate film 2 was used, and an alignment film forming coating liquid having the following composition was continuously applied thereto using a wire bar #8. The liquid was dried for 60 seconds by hot air at 60° C., and further dried for 120 seconds by hot air at 100° C. to form an alignment film.

Composition of Alignment Film Forming Coating Liquid

| Composition of Alignment Film Forming Coating Liquid | |
| --- | --- |
| Polyvinyl Alcohol (manufactured by KURARAY CO., LTD., PVA103) | 2.4 parts by mass |
| Isopropyl Alcohol | 1.6 parts by mass |
| Methanol | 36 parts by mass |
| Water | 60 parts by mass |

The following coating liquid N was applied to the cellulose acylate film 2 having the alignment film produced as described above. After aging for 60 seconds at 60° C., the film was irradiated with 1,000 mJ/cm² of ultraviolet rays using an air-cooling metal halide lamp (manufactured by EYE GRAPHICS Co., Ltd.) of 70 mW/cm² in the air to fix the alignment state. Accordingly, the polymerizable rod-like liquid crystal compound was vertically aligned, and a positive C-plate film 2 was produced. Rth at a wavelength of 550 nm was −60 nm.

| Composition of Optically Anisotropic Film Coating Liquid N | |
| --- | --- |
| Following Liquid Crystalline Compound L-1 | 80 parts by mass |
| Following Liquid Crystalline Compound L-2 | 20 parts by mass |
| Following Vertical Alignment Agent (S01) | 1 part by mass |
| Ethylene Oxide-Modified Trimethylolpropane Triacrylate (V#360, manufactured by OSAKA ORGANIC CHEMICAL INDUSTRY LTD.) | 8 parts by mass |
| IRGACURE 907 (manufactured by BASF SE) | 3 parts by mass |
| KAYACURE DETX (manufactured by Nippon Kayaku Co., Ltd.) | 1 part by mass |
| Following Compound B03 | 0.4 parts by mass |
| Methyl Ethyl Ketone | 170 parts by mass |
| Cyclohexanone | 30 parts by mass |

L-1

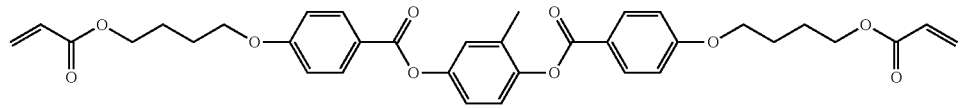 [SMILES: C=CC(=O)OCCCCOc1ccc(C(=O)Oc2ccc(OC(=O)c3ccc(OCCCCOC(=O)C=C)cc3)c(C)c2)cc1]

L-2

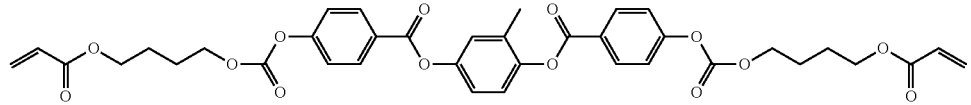 [SMILES: C=CC(=O)OCCCCOC(=O)Oc1ccc(C(=O)Oc2ccc(OC(=O)c3ccc(OC(=O)OCCCCOC(=O)C=C)cc3)c(C)c2)cc1]

S01

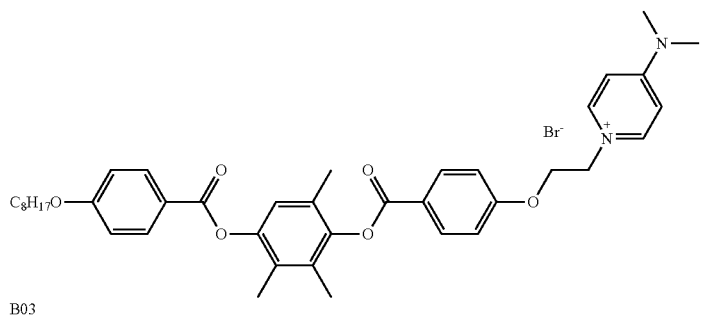

B03

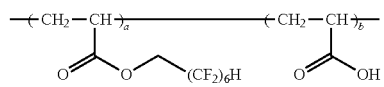

\<Production of Circularly Polarizing Plate\>

The barrier layer (transparent resin layer 1) side of the laminate produced in Example 13 was stuck to the side of the cellulose acylate film 1 of the λ/4 retardation film 1 via a pressure sensitive adhesive to produce a circularly polarizing plate.

Similarly, the optically anisotropic film (the film formed using the coating liquid N) side of the positive C-plate film 2 produced as described above was transferred on the optically anisotropic layer side of the λ/4 retardation film 1 via a pressure sensitive adhesive, and the cellulose acylate film 2 was removed. Then, the barrier layer (transparent resin layer 1) side of the laminate produced in Example 13 was stuck to the side of the cellulose acylate film 1 of the λ/4 retardation film 1 via a pressure sensitive adhesive to produce another circularly polarizing plate.

GALAXY S5 manufactured by Samsung Electronics Co., Ltd. mounted with an organic EL panel (organic EL display element) was disassembled to peel off a touch panel with a circularly polarizing plate from the organic EL display device, and the circularly polarizing plate was peeled off from the touch panel to isolate the organic EL display element, the touch panel, and the circularly polarizing plate, respectively. Next, the isolated touch panel was stuck again to the organic EL display element. This was stuck onto the touch panel such that the side of the λ/4 retardation film 1 or the side of the positive C-plate film 2 of the circularly polarizing plate produced as described above was on the panel side, and an organic EL display device was produced.

The produced organic EL display device was evaluated in the same manner as in the above-described examples, and it was confirmed that almost the same effects as in Example 13 described above were exhibited. In addition, organic EL display devices were produced according to the same procedure as in Example B, except that the laminates of Examples 14 to 21 and Comparative Examples 6 to 8 were used instead of the laminate of Example 13. The organic EL display devices were evaluated in the same manner, and almost the same tendencies were seen.

EXPLANATION OF REFERENCES

1: anisotropic light absorption film
2: alignment film
3: substrate
10: laminate

What is claimed is:

1. An anisotropic light absorption film which is formed from a composition having a first dichroic azo dye, a second dichroic azo dye, and a polymer liquid crystal compound including a repeating unit represented by Formula (1),
   wherein the polymer liquid crystal compound contains a repeating unit A in which T1 in Formula (1) is an alkoxy group and a repeating unit B in which T1 in Formula (1) is a group other than an alkoxy group,
   wherein the ratio A/B of the content of the repeating unit A to the content of the repeating unit B is 50/50 to 95/5,
   wherein the first dichroic azo dye has a solution absorption peak wavelength of 400 nm or greater and less than 550 nm,
   wherein the second dichroic azo dye has a solution absorption peak wavelength of 550 nm or greater and 750 nm or less,
   wherein the second dichroic azo dye is represented by Formula (II),
   wherein the film has an arrangement structure of the first dichroic azo dye or an arrangement structure of the second dichroic azo dye therein,
   wherein the polymer liquid crystal compound including the repeating unit represented by Formula (1) is horizontally aligned, and
   wherein a half-width of a peak derived from the arrangement structure of the second dichroic azo dye in φ scanning is less than 10.0° in X-ray diffraction measurement in an in-plane direction of the anisotropic light absorption film, Formula (1)

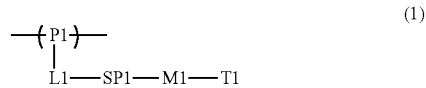

in Formula (1), P1 represents a main chain of the repeating unit, L1 represents a single bond or a divalent linking group, SP1 represents a spacer group, M1 represents a mesogenic group, and T1 represents a terminal group, Formula (II)

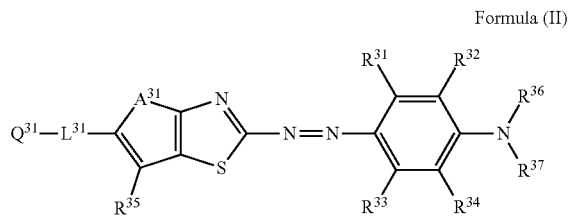

in Formula (II), $R^{31}$ to $R^{35}$ each independently represent a hydrogen atom or a substituent; $R^{36}$ and $R^{37}$ each independently represent a hydrogen atom or an alkyl group which may have a substituent; $Q^{31}$ represents an aromatic hydrocarbon group, an aromatic heterocyclic group, or a cyclohexane ring group which may have a group represented by Q-L-* as a substituent, wherein Q represents a hydrogen atom, an alkyl group, or R—CO—O—* wherein R represents an alkyl group, L represents a single bond, a divalent aliphatic hydrocarbon group, a divalent aromatic hydrocarbon group, an alkyleneoxy group, —O—, —S—, —SO$_2$—, —SO$_3$—, —N(R)—, —CO—, —NH—, —COO—, —CONR—, —Si(R)(R')—, or combinations thereof, and * represents a bonding position, wherein R and R' each represent an alkyl group; $L^{31}$ represents —N=N—; and $A^{31}$ represents an oxygen atom or a sulfur atom, and $R^{36}$, and $R^{37}$ may have a radically polymerizable group.

2. The anisotropic light absorption film according to claim 1,
   wherein a difference between the solution absorption peak wavelength of at least one of the first or second dichroic azo dye and an absorption peak wavelength of the anisotropic light absorption film is 10 nm to 100 nm, in a case where the film has at least two absorption peak wavelengths, the difference is a difference between the solution absorption peak wavelength of the dichroic azo dye and the absorption peak wavelength of the film closer thereto, and a solid content ratio of components providing a solution absorption peak wavelength at 400 nm to 750 nm in the composition is 2 mass % to 20 mass %, the components are the first dichroic azo dye and the second dichroic azo dye, wherein the solid content ratio refers to the mass % in a case where the total solid content which is components other than the solvent is 100 mass %.

3. The anisotropic light absorption film according to claim 1,
wherein a difference between the solution absorption peak wavelength of the second dichroic azo dye and the absorption peak wavelength of the anisotropic light absorption film is 10 nm to 100 nm, in a case where the film has at least two absorption peak wavelengths, the difference is a difference between the solution absorption peak wavelength of the second dichroic azo dye and the absorption peak wavelength of the film closer thereto.

4. The anisotropic light absorption film according to claim 1,
wherein the anisotropic light absorption film has at least two absorption peak wavelengths, and
the at least two absorption peak wavelengths are 400 nm or greater and less than 550 nm, and 550 nm or greater and 750 nm or less, respectively.

5. The anisotropic light absorption film according to claim 1,
wherein the second dichroic azo dye forms a crystal structure in the film.

6. The anisotropic light absorption film according to claim 1,
wherein a difference between a melting point T1 of the second dichroic azo dye and a transition temperature T2 is 30° C. or less,
wherein the transition temperature T2 is measured by calorimetric measurement of a sample obtained by casting a composition containing the polymer liquid crystal compound including the repeating unit represented by Formula (1) and the second dichroic azo dye on a glass, the transition temperature T2 is a transition temperature corresponding to the second dichroic azo dye among transition temperatures observed in a spectrum of the calorimetric measurement.

7. The anisotropic light absorption film according to claim 1,
wherein a film thickness is 0.3 µm or greater and 5 µm or less.

8. The anisotropic light absorption film according to claim 1,
wherein a difference between a Log P value of at least one of the first or second dichroic azo dye in which a difference between the solution absorption peak wavelength of the dichroic azo dye and an absorption peak wavelength of the anisotropic light absorption film is 10 nm to 100 nm, and a Log P value of the polymer liquid crystal compound including the repeating unit represented by Formula (1) is 5 or greater and 8 or less.

9. The anisotropic light absorption film according to claim 1,
wherein the first dichroic azo dye is represented by Formula (III),

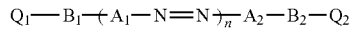

Formula (III)

in Formula (III), n represents an integer of 2 to 5, and repeating unit structures of -($A_1$-N=N)— repeated two or more times may be the same or different,
at least one of $Q_1$ or $Q_2$ represents a radically polymerizable group, and the other represents hydrogen, an alkyl group having 1 to 20 carbon atoms, an alkoxy group having 1 to 20 carbon atoms, an alkyl ester having 1 to 20 carbon atoms, or an amine group,
$A_1$ and $A_2$ may be the same or different, and each of them represents a substituted or unsubstituted arylene having 6 to 40 carbon atoms, or a substituted or unsubstituted heteroarylene having 4 to 30 carbon atoms,
$B_1$ and $B_2$ may be the same or different, and each of them represents a divalent functional group having a combination of one or more selected from the group consisting of a single bond, —(C=O)O—, —O(C=O)—, a substituted or unsubstituted alkylene having 1 to 20 carbon atoms, a substituted or unsubstituted arylene having 6 to 40 carbon atoms, a substituted or unsubstituted heteroarylene having 4 to 30 carbon atoms, a substituted or unsubstituted alkylene oxide having 1 to 20 carbon atoms, —O—, —S—, —NR1-, and -PR1-, and
R1 represents hydrogen or an alkyl group having 1 to 20 carbon atoms.

10. The anisotropic light absorption film according to claim 9,
wherein the first dichroic azo dye represented by Formula (III) satisfies Formula (A-1) when n is 2 in Formula (III), the first dichroic azo dye represented by Formula (III) satisfies Formula (A-2) when n is 3 in Formula (III), the first dichroic azo dye represented by Formula (III) satisfies Formula (A-3) when n is 4 in Formula (III), $$Ld/Ll>3.2 \qquad \text{Formula (A-1)}$$

$$Ld/Ll>3.6 \qquad \text{Formula (A-2)}$$

$$Ld/Ll>4.0 \qquad \text{Formula (A-3)}$$

in Formula (A-1) to (A-3), Ld represents a molecular length of a molecular major axis of the first dichroic azo dye, and L1 represents a molecular length in a direction orthogonal to the molecular major axis of the dichroic azo dye.

11. A laminate comprising:
the anisotropic light absorption film according to claim 1; and
an alignment film.

12. The laminate according to claim 11,
wherein the alignment film contains one or both of a polyamic acid and a polyimide compound.

13. The laminate according to claim 11,
wherein the alignment film is a photo-alignment film containing a photoactive compound having an azo group as a photoactive group.

14. A laminate comprising:
the anisotropic light absorption film according to claim 1; and
a substrate.

15. A laminate comprising:
the laminate according to claim 11; and
a substrate,
wherein the substrate is disposed on a side of the alignment film opposite to the anisotropic light absorption film.

16. The anisotropic light absorption film according to claim 2, wherein a difference between the solution absorption peak wavelength of the second dichroic azo dye and the absorption peak wavelength of the anisotropic light absorption film is 10 nm to 100 nm.

17. The anisotropic light absorption film according to claim 2,
wherein the anisotropic light absorption film has at least two absorption peak wavelengths, and
the at least two absorption peak wavelengths are 400 nm or greater and less than 550 nm, and 550 nm or greater and 750 nm or less, respectively.

18. The anisotropic light absorption film according to claim 3,
wherein the anisotropic light absorption film has at least two absorption peak wavelengths, and
the at least two absorption peak wavelengths are 400 nm or greater and less than 550 nm, and 550 nm or greater and 750 nm or less, respectively.

19. The anisotropic light absorption film according to claim 1,
wherein the composition further has an interface improver for horizontally aligning the polymer liquid crystal compound including the repeating unit represented by Formula (1).

20. An anisotropic light absorption film which is formed from a composition having a first dichroic azo dye, a second dichroic azo dye, and a compound represented by Formula (I) or a polymer thereof,
wherein:
the first dichroic azo dye has a solution absorption peak wavelength of 400 nm or greater and less than 550 nm,
the second dichroic azo dye has a solution absorption peak wavelength of 550 nm or greater and 750 nm or less,
the second dichroic azo dye is represented by Formula (II),
the film has an arrangement structure of the first dichroic azo dye or an arrangement structure of the second dichroic azo dye therein,
the solid content ratio of the first dichroic azo dye and the second dichroic azo dye is 2 mass % or more and less than 20 mass %,
the compound represented by Formula (I) or the polymer thereof is horizontally aligned, and
a half-width of a peak derived from the arrangement structure of the second dichroic azo dye in φ scanning is less than 10.0° in X-ray diffraction measurement in an in-plane direction of the anisotropic light absorption film, Q5-B5-A5-B6-A6-B8-Q6    Formula (I)

in Formula (I), at least one of Q5 or Q6 represents a radically polymerizable group, and the other represents a hydrogen atom, an alkyl group having 1 to 20 carbon atoms, a cycloalkyl group having 3 to 12 carbon atoms, an aryl group having 6 to 40 carbon atoms, an alkoxy group having 1 to 20 carbon atoms, an alkyl ester having 1 to 20 carbon atoms, —CN, —NO₂, a halogen atom, or an amine group substituted or unsubstituted by one or two alkyl groups having 1 to 6 carbon atoms,
A5 and A6 may be the same or different, and each of them represents a substituted or unsubstituted arylene group having 6 to 40 carbon atoms, a substituted or unsubstituted heteroarylene group having 4 to 30 carbon atoms, or a substituted or unsubstituted cyclohexyl group having 6 to 40 carbon atoms, and
B5, B6, and B8 may be the same or different, each of them represents a divalent functional group having a combination of one or more selected from the group consisting of a single bond, —(C=O)O—, —O(C=O)—, a substituted or unsubstituted alkylene group having 1 to 20 carbon atoms, a substituted or unsubstituted arylene group having 6 to 40 carbon atoms, a substituted or unsubstituted heteroarylene group having 4 to 30 carbon atoms, a substituted or unsubstituted cyclohexyl group having 6 to 40 carbon atoms, a substituted or unsubstituted alkylene oxide group having 1 to 20 carbon atoms, —O—, —S—, —NR3-, and -PR3-, and R3 represents a hydrogen atom or an alkyl group having 1 to 20 carbon atoms,

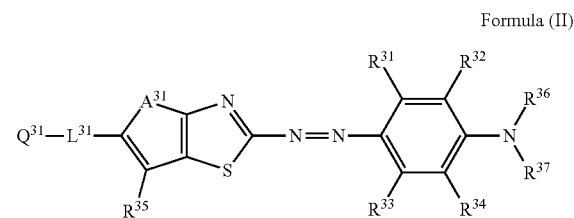

Formula (II)

in Formula (II), $R^{31}$ to $R^{35}$ each independently represent a hydrogen atom or a substituent; $R^{36}$ and $R^{37}$ each independently represent a hydrogen atom or an alkyl group which may have a substituent; $Q^{31}$ represents an aromatic hydrocarbon group, an aromatic heterocyclic group, or a cyclohexane ring group which may have a group represented by Q-L-* as a substituent, wherein Q represents a hydrogen atom, an alkyl group, or R—CO—O—* wherein R represents an alkyl group, L represents a single bond, a divalent aliphatic hydrocarbon group, a divalent aromatic hydrocarbon group, an alkyleneoxy group, —O—, —S—, —SO₂—, —SO₃—, —N(R)—, —CO—, —NH—, —COO—, —CONR—, —Si(R)(R')—, or combinations thereof, and * represents a bonding position, wherein R and R' each represent an alkyl group; $L^{31}$ represents —N=N—; and $A^{31}$ represents an oxygen atom or a sulfur atom, and $R^{36}$, and $R^{37}$ may have a radically polymerizable group.

21. The anisotropic light absorption film according to claim 1,
wherein in Formula (1), SP1 includes at least one selected from the group consisting of an oxyethylene structure, an oxypropylene structure, a polysiloxane structure, and a fluorinated alkylene structure.

22. The anisotropic light absorption film according to claim 1,
wherein in Formula (1), SP1 is a group represented by *—(CH₂—CH₂O)$_{n1}$—*, n1 represents an integer of 1 to 20, and * represents a bonding position to L1 or M1 in Formula (1).

* * * * *